US011367246B2

(12) United States Patent
Moloney et al.

(10) Patent No.: US 11,367,246 B2
(45) Date of Patent: Jun. 21, 2022

(54) OPERATIONS USING SPARSE VOLUMETRIC DATA

(71) Applicant: Movidius Ltd., Schiphol-Rijk (NL)

(72) Inventors: David Macdara Moloney, Dublin (IE); Jonathan David Byrne, Ashbourne (IE)

(73) Assignee: MOVIDIUS LTD., Schiphol-Rijk (NL)

( * ) Notice: Subject to any disclaimer, the term of this patent is extended or adjusted under 35 U.S.C. 154(b) by 0 days.

(21) Appl. No.: 16/326,694

(22) PCT Filed: Aug. 19, 2017

(86) PCT No.: PCT/US2017/047694
§ 371 (c)(1),
(2) Date: Feb. 19, 2019

(87) PCT Pub. No.: WO2018/035505
PCT Pub. Date: Feb. 22, 2018

(65) Prior Publication Data
US 2019/0180409 A1    Jun. 13, 2019

Related U.S. Application Data

(60) Provisional application No. 62/377,471, filed on Aug. 19, 2016.

(51) Int. Cl.
*G06T 15/08* (2011.01)
*G06T 17/00* (2006.01)
(Continued)

(52) U.S. Cl.
CPC .............. *G06T 15/08* (2013.01); *G01C 21/20* (2013.01); *G01C 21/30* (2013.01); *G05D 1/0214* (2013.01);
(Continued)

(58) Field of Classification Search
CPC ....... G06T 15/08; G01C 21/20; G05D 1/0214
See application file for complete search history.

(56) References Cited

U.S. PATENT DOCUMENTS 7,301,538 B2 * 11/2007 Buyanovskiy .......... G06T 15/06
345/426
9,754,405 B1 * 9/2017 Young ................... G06T 17/005
(Continued)

FOREIGN PATENT DOCUMENTS

WO    2013057077 A2    4/2013
WO    2018035506 A1    2/2018
(Continued)

OTHER PUBLICATIONS

PCT International Preliminary Report on Patentability in PCT International Application Serial No. PCT/US2017/047694 dated Feb. 19, 2019.
(Continued)

*Primary Examiner* — Sarah Lhymn
(74) *Attorney, Agent, or Firm* — Alliance IP, LLC

(57) ABSTRACT

A volumetric data structure models a particular volume representing the particular volume at a plurality of levels of detail. A first entry in the volumetric data structure includes a first set of bits representing voxels at a first level of detail, the first level of detail includes the lowest level of detail in the volumetric data structure, values of the first set of bits indicate whether a corresponding one of the voxels is at least partially occupied by respective geometry, where the volumetric data structure further includes a number of second entries representing voxels at a second level of detail higher than the first level of detail, the voxels at the second level of detail represent subvolumes of volumes represented by voxels at the first level of detail, and the number of second entries corresponds to a number of bits in the first set of bits (Continued)

with values indicating that a corresponding voxel volume is occupied.

17 Claims, 55 Drawing Sheets

(51) Int. Cl.
| | |
|---|---|
| *G06T 19/00* | (2011.01) |
| *G05D 1/02* | (2020.01) |
| *G01C 21/20* | (2006.01) |
| *G06T 17/05* | (2011.01) |
| *G06N 3/04* | (2006.01) |
| *G01C 21/30* | (2006.01) |
| *G06V 20/13* | (2022.01) |
| *G06V 20/64* | (2022.01) |
| *G06F 9/30* | (2018.01) |
| *G06T 15/06* | (2011.01) |
| *G06T 1/20* | (2006.01) |
| *G06F 17/16* | (2006.01) |

(52) U.S. Cl.
CPC ....... *G05D 1/0274* (2013.01); *G06F 9/30029* (2013.01); *G06F 17/16* (2013.01); *G06N 3/04* (2013.01); *G06N 3/0454* (2013.01); *G06T 1/20* (2013.01); *G06T 15/06* (2013.01); *G06T 17/005* (2013.01); *G06T 17/05* (2013.01); *G06T 19/00* (2013.01); *G06T 19/006* (2013.01); *G06V 20/13* (2022.01); *G06V 20/64* (2022.01); *G06N 3/0481* (2013.01); *G06T 2200/04* (2013.01); *G06T 2200/28* (2013.01); *G06T 2210/08* (2013.01); *G06T 2210/36* (2013.01); *G06T 2219/004* (2013.01)

(56) References Cited

U.S. PATENT DOCUMENTS

| | | | |
|---|---|---|---|
| 10,078,333 B1* | 9/2018 | Bajracharya | B25J 9/1697 |
| 2008/0024494 A1* | 1/2008 | Poopathy | G06T 15/08 345/424 |
| 2008/0024515 A1* | 1/2008 | Yang | G06T 15/06 345/592 |
| 2010/0104199 A1 | 4/2010 | Zhang et al. | |
| 2011/0228055 A1 | 9/2011 | Sharp | |
| 2015/0109298 A1 | 4/2015 | Panteleev et al. | |
| 2015/0294500 A1 | 10/2015 | Tucker et al. | |
| 2019/0180499 A1 | 6/2019 | Caulfield et al. | |
| 2019/0188899 A1 | 6/2019 | Moloney et al. | |

FOREIGN PATENT DOCUMENTS

| | | |
|---|---|---|
| WO | 2018035507 A1 | 2/2018 |
| WO | 2018035508 A1 | 2/2018 |

OTHER PUBLICATIONS

PCT International Search Report and Written Opinion in PCT International Application Serial No. PCT/US2017/047694 dated Jan. 18, 2019.
Cozzi, Patrick et al. "OpenGL Insights," Jul. 23, 2012, XP55675474, Available online at https://www.seas.upenn.edu/-pcozzi/OpenGLInsights/OpenGLInsights-SparseVoxelization.pdf [18 pages].
EPO Extended European Search Report and Written Opinion in EP Application Serial No. 17842249.9 dated Mar. 19, 2020 [10 pages].
He, Ruoqi et al., "Pathfinding in 3D Space—A*, Theta*, Lazy Theta* in Octree Structure," Ecole Polythechique Universite, Mar. 8, 2016 (15 pages).
Xu, Xiaofan et al., "Convolutional Neural Network for 3D Object Recognition using Volumetric Representation," Movidius Ltd., 2016 First International Workshop on Sensing, Processing and Learning for Intelligent Machines (SPLINE), IEEE, Jul. 6, 2016 (5 pages).
EPO; Office Action issued in EP Patent Application No. 17842249.9, dated May 28, 2021; 4 pages.

* cited by examiner

OPERATIONS USING SPARSE VOLUMETRIC DATA

RELATED APPLICATIONS

This application is a national stage application under 35 U.S.C. § 371 of PCT International Application Serial No. PCT/US2017/047694, filed on Aug. 19, 2017 and entitled OPERATIONS USING SPARSE VOLUMETRIC DATA, which application claims benefit to U.S. Provisional Patent Application Ser. No. 62/377,471, filed Aug. 19, 2016. The disclosures of the prior applications are considered part of and are incorporated by reference in the disclosure of this Application.

TECHNICAL FIELD

This disclosure relates in general to the field of computer systems and, more particularly, to computer vision and augmented or mixed reality systems.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIG. 30 illustrates example operations involving an example volumetric data structure;

DETAILED DESCRIPTION OF EXAMPLE EMBODIMENTS

Figure 1:
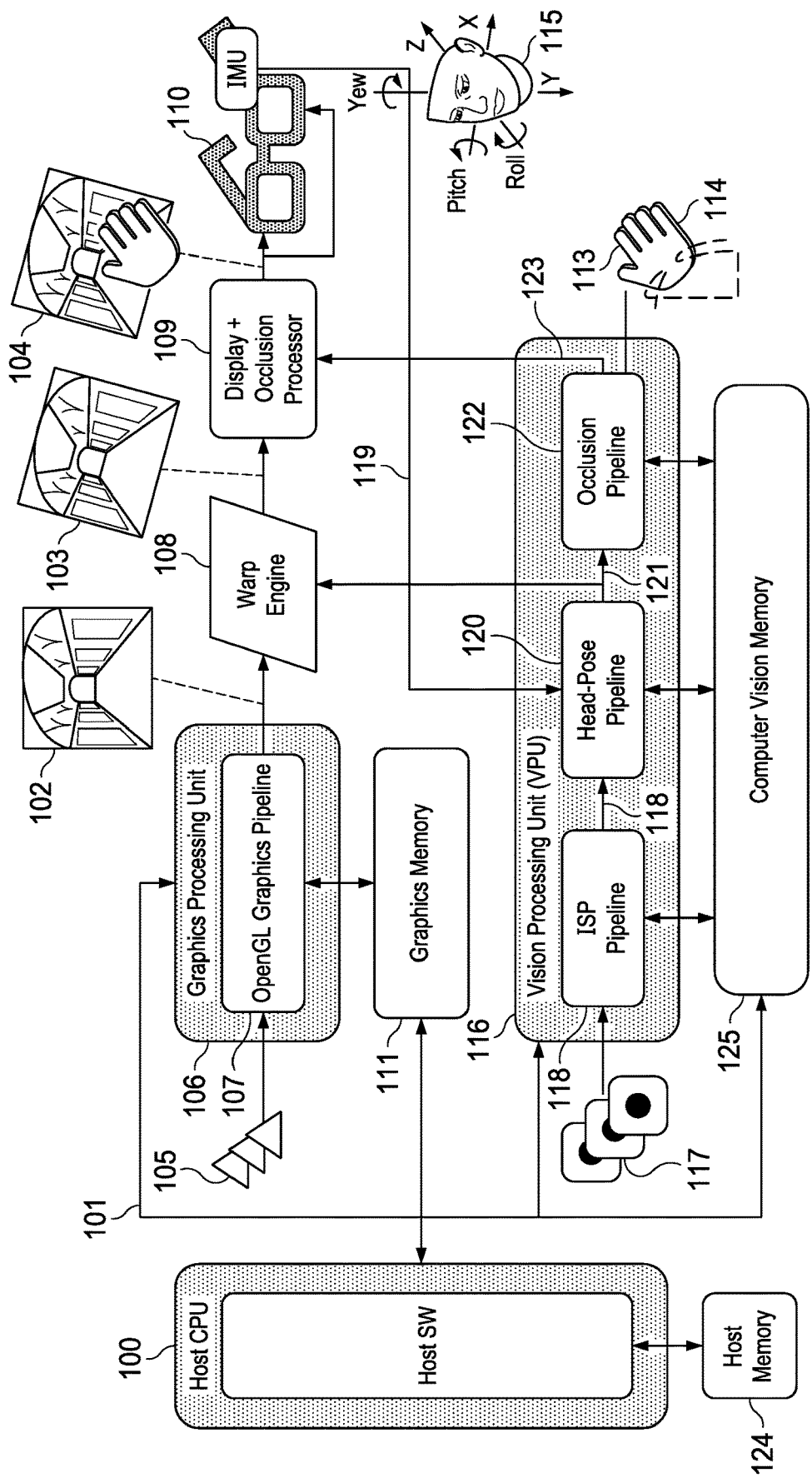
FIG. 1 illustrates a conventional augmented or mixed reality rendering system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

A variety of technologies are emerging based on and incorporating augmented reality, virtual reality, mixed reality, autonomous devices, and robots, which may make use of data models representing volumes of three-dimensional space and geometry. The description of various real and virtual environments using such 3D or volumetric data has traditionally involved large data sets, which some computing systems have struggled to process in a desirable manner. Further, as devices, such as drones, wearable devices, virtual reality systems, etc., grow smaller, the memory and processing resources of such devices may also be constrained. As an example, AR/VR/MR applications may demand high-frame rates for the graphical presentations generated using supporting hardware. However, in some applications, the GPU and computer vision subsystem of such hardware may need to process data (e.g., 3D data) at high rates, such as up to 130 fps (7 msecs), in order to produce desirable results (e.g., to generate a believable graphical scene with frame rates that produce a believable result, prevent motion sickness of the user due to excessive latency, among other example goals. Additional application may be similarly challenged to satisfactorily process data describing large volumes, while meeting constraints in processing, memory, power, application requirements of the corresponding system, among other example issues.

In some implementations, computing systems may be provided with logic to generate and/or use sparse volumetric data, defined according to a format. For instance, a defined volumetric data-structure may be provided to unify computer vision and 3D rendering in various systems and applications. A volumetric representation of an object may be captured using an optical sensor, such as a stereoscopic camera or depth camera, for example. The volumetric representation of the object may include multiple voxels. An improved volumetric data structure may be defined that enables the corresponding volumetric representation to be subdivided recursively to obtain a target resolution of the object. During the subdivision, empty space in the volumetric representation, which may be included in one or more of the voxels, can be culled from the volumetric representation (and supporting operations). The empty space may be an area of the volumetric representation that does not include a geometric property of the object.

Accordingly, in an improved volumetric data structure, individual voxels within a corresponding volume may be tagged as "occupied" (by virtue of some geometry being present within the corresponding volumetric space) or as "empty" (representing that the corresponding volume consists of empty space). Such tags may additionally be interpreted as designating that one or more of its corresponding subvolumes is also occupied (e.g., if the parent or higher level voxel is tagged as occupied) or that all of its subvolumes are empty space (i.e., in the case of the parent, or higher level voxel being tagged empty). In some implementations, tagging a voxel as empty may allow the voxel and/or its corresponding subvolume voxels to be effectively removed from the operations used to generate a corresponding volumetric representation. The volumetric data structure may be according to a sparse tree structure, such as according to a sparse sexaquaternary tree (SST) format. Further, such an approach to a sparse volumetric data structure may utilize comparatively less storage space than is traditionally used to store volumetric representations of objects. Additionally, compression of volumetric data may increase the viability of transmission of such representations and enable faster processing of such representations, among other example benefits.

The volumetric data-structure can be hardware accelerated to rapidly allow updates to a 3D renderer, eliminating delay that may occur in separate computer vision and graphics systems. Such delay can incur latency, which may induce motion sickness in users among other additional disadvantages when used in AR, VR, MR, and other applications. The capability to rapidly test voxels for occupancy of a geometric property in an accelerated data-structure allows for construction of a low-latency AR, VR, MR, or other system, which can be updated in real time.

In some embodiments, the capabilities of the volumetric data-structure may also provide intra-frame warnings. For example, in AR, VR, MR, and other applications, when a user is likely to collide with a real or synthetic object in an imaged scene, or in computer vision applications for drones or robots, when such devices are likely to collide with a real or synthetic object in an imaged scene, the speed of processing provided by the volumetric data structure allows for warning of the impending collision.

Embodiments of the present disclosure may relate to the storage and processing of volumetric data in applications such as robotics, head-mounted displays for augmented and mixed reality headsets as well as phones and tablets. Embodiments of the present disclosure represent each volumetric element (e.g., voxel) within a group of voxels, and optionally physical quantities relating to the voxel's geometry, as a single bit. Additional parameters related to a group of 64 voxels may be associated with the voxels, such as corresponding red-green-blue (RGB) or other coloration encodings, transparency, truncated signed distance function (TSDF) information, etc. and stored in an associated and optional 64-bit data-structure (e.g., such that two or more bits are used to represent each voxel). Such a representation scheme may realize a minimum memory requirement. Moreover, representing voxels by a single bit allows for the performance of many simplified calculations to logically or mathematically combine elements from a volumetric representation. Combining elements from a volumetric representation can include, for example, OR-ing planes in a volume to create 2D projections of 3D volumetric data, and calculating surface areas by counting the number of occupied voxels in a 2.5D manifold, among others. For comparisons XOR logic may be used to compare 64-bit sub-volumes (e.g., 4^3 sub-volumes), and volumes can be inverted, where objects can be merged to create hybrid objects by ORing them together, among other examples.

FIG. 1 illustrates a conventional augmented or mixed reality system consisting of parallel graphics rendering and computer-vision subsystems with a post-rendering connection apparatus to account for changes due to rapid head movement and changes in the environment which can produce occlusions and shadows in the rendered graphics. In one example implementation, a system may include a host processor 100 supported by host memory 124 to control the execution of a graphics pipeline, computer vision pipeline, and post-rendering correction apparatus by interconnection via bus 101, on-chip network on-chip, or other interconnection. The interconnection allows the host processor 100 running appropriate software to control the execution of the graphics processing unit (GPU) 106, associated graphics memory 111, computer vision pipeline 116, and associated computer vision memory 124. In one example, rendering of graphics using the GPU 106 via an OpenGL graphics shader 107 (e.g., operating on a triangle list 105) may take place at a slower rate than the computer vision pipeline. As a result, post rendering correction via a warp engine 108 and display/occlusion processor 109 may be performed to account for changes in head pose and occluding scene geometry that may have occurred since the graphics was rendered by the GPU 106. The output of the GPU 106 is time-stamped so that it can be used in conjunction with the correct control signals 121 and 123 from the head pose pipeline 120 and occlusion pipeline 123 respectively to produce the correct graphics output to take account of any changes in head pose 119 and occluding geometry 113, among other examples.

In parallel with the GPU 106, a plurality of sensors and cameras (e.g., including active and passive stereo cameras for depth and vision processing 117) may be connected to the computer vision pipeline 116. The computer vision pipeline 116 may include one or more of at least three stages, each of which may contain multiple stages of lower level processing. In one example, the stages in the computer vision pipeline 116 may be the image signal processing (ISP) pipeline 118, head-pose pipeline 120, and occlusion pipeline 122. The ISP pipeline 118 may take the outputs of the input camera sensors 117 and condition them so they can be used for subsequent head-pose and occlusion processing. The head-pose pipeline 120 may take the output of the ISP pipeline 118 and use it together with the output 119 of the inertial measurement unit (IMU) in the headset 110 to compute a change in head-pose since the corresponding output graphics frame was rendered by the GPU 106. The output 121 of the head-pose pipeline (HPP) 120 may be applied to the warp engine 108 along with a user specified mesh to distort the GPU output 102 so that it matches the updated head-pose position 119. The occlusion pipeline 122 may take the output of head-pose pipeline 121 and look for new objects in the visual field such as a hand 113 (or other example object) entering the visual field which should produce a corresponding shadow 114 on the scene geometry. The output 123 of the occlusion pipeline 122 may be used by the display and occlusion processor 109 to correctly overlay the visual field on top of the output 103 of the warp engine 108. The display and occlusion processor 109 produces a shadow mask for synthetic shadows 114 using the computed head-pose 119, and the display and occlusion processor 109 may composite the occluding geometry of the hand 113 on top of the shadow mask to produce a graphical shadow 114 on top of the output 103 of the warp engine 108 and produce the final output frame(s) 104 for display on the augmented/mixed reality headset 110, among other example use cases and features.

Figure 2:
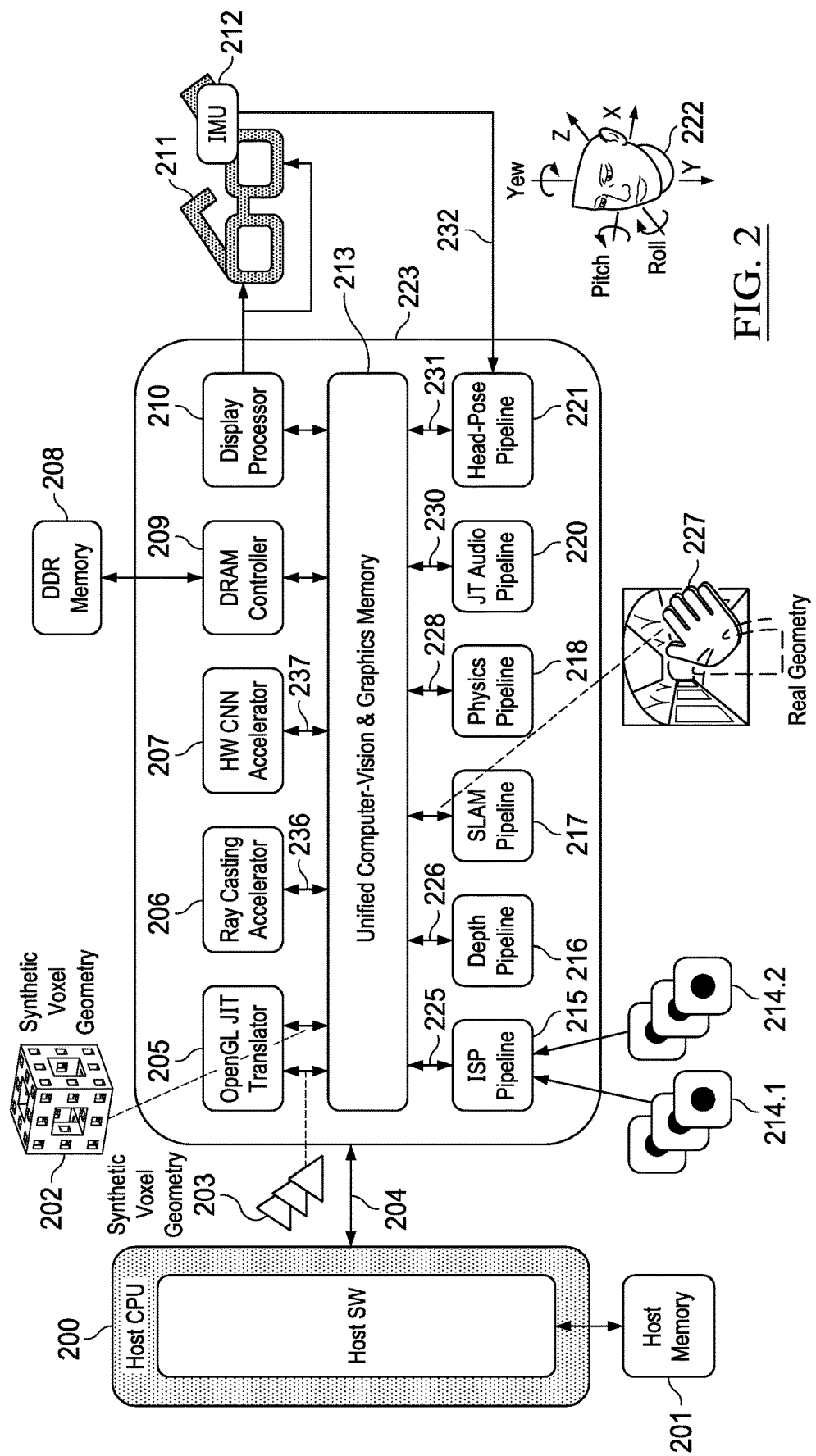
FIG. 2 illustrates a voxel-based augmented or mixed reality rendering system in accordance with some embodiments.

FIG. 2 illustrates a voxel-based augmented or mixed reality rendering system in accordance with some embodiments of the present disclosure. The apparatus depicted in FIG. 2 may include a host system composed on host CPU 200 and associated host memory 201. Such a system may communicate via a bus 204, on-chip network or other communications mechanism, with the unified computer vision and graphics pipeline 223 and associated unified computer vision and graphics memory 213 containing the real and synthetic voxels to be rendered in the final scene for display on a head-mounted augmented or mixed reality display 211. The AR/MR display 211 may also contain a plurality of active and passive image sensors 214 and an inertial measurement unit (IMU) 212, which is used to measure changes to head pose 222 orientation.

In the combined rendering pipeline, synthetic geometry may be generated starting from a triangle list 204 which is processed by an OpenGLJiT (Just-in-Time) translator 205 to produce synthetic voxel geometry 202. The synthetic voxel geometry may be generated, for instance, by selecting a main plane of a triangle from a triangle list. 2D rasterization of each triangle in the selected plane may then be performed (e.g., in the X and Z direction). The third coordinate (e.g., Y) may be created as an attribute to be interpolated across the triangle. Each pixel of the rasterized triangle may result in the definition of a corresponding voxel. This processing can be performed by either a CPU or GPU. When performed by a GPU, each rasterized triangle may be read back from the GPU to create a voxel where the GPU drew a pixel, among other example implementations. For instance, a synthetic voxel may be generated using a 2D buffer of lists, where each entry of the list stores the depth information of a polygon rendered at that pixel. For instance, a model can be rendered using an orthographic viewpoint (e.g., top-down). For example, every (x, y) provided in an example buffer may represent the column at (x, y) in a corresponding voxel volume (e.g., from (x,y,0) to (x,y,4095)). Each column may then be rendered from the information as 3D scanlines using the information in each list.

Continuing with the example of FIG. 2, in some implementations the synthetic voxel geometry 202 may be combined with measured geometry voxels 227 constructed using a simultaneous localization and mapping (SLAM) pipeline 217. The SLAM pipeline may use active sensors and/or passive image sensors 214 (e.g., 214.1 and 214.2) which are first processed using an image signal processing (ISP) pipeline 215 to produce an output 225, which may be converted into depth images 226 by a depth pipeline 216. Active or passive image sensors 214 (214.1 and 214.2) may include active or passive stereo sensors, structured light sensors, time-of-flight sensors, among other examples. For instance, the depth pipeline 216 can process either depth data from a structured light or time-of-flight sensor 214.1 or alternately a passive stereo sensors 214.2. In one example implementation, stereo sensors 214.2 may include a passive pair of stereo sensors, among other example implementations.

Depth images generated by the depth pipeline 215 may be processed by a dense SLAM pipeline 217 using a SLAM algorithm (e.g., Kinect Fusion) to produce a voxelized model of the measured geometry voxels 227. A ray-tracing accelerator 206 may be provided that may combine the measured geometry voxels 227 (e.g., real voxel geometry) with the synthetic voxel geometry 202 to produce a 2D rendering of the scene for output to a display device (e.g., a head mounted display 211 in a VR or AR application) via a display processor 210. In such an implementation, a complete scene model may be constructed from real voxels of measured geometry voxels 227 and synthetic geometry 202. As a result, there is no requirement for warping of 2D rendered geometry (e.g., as in FIG. 1). Such an implementation may be combined with head-pose tracking sensors and corresponding logic to correctly align the real and measured geometry. For instance, an example head-pose pipeline 221 may process head-pose measurements 232 from an IMU 212 mounted in the head mounted display 212 and the output 231 of the head-pose measurement pipeline may be taken into account during rendering via the display processor 210.

In some examples, a unified rendering pipeline may also use the measured geometry voxels 227 (e.g., a real voxel model) and synthetic geometry 202 (e.g., a synthetic voxel model) in order to render audio reverberation models and model the physics of a real-world, virtual, or mixed reality scene. As an example, a physics pipeline 218 may take the measured geometry voxels 227 and synthetic geometry 202 voxel geometry and compute the output audio samples for left and right earphones in a head mounted display (HMD) 211 using the ray casting accelerator 206 to compute the output samples 230 using acoustic reflection coefficients built into the voxel data-structure. Similarly, the unified voxel model consisting of 202 and 227 may also be used to determine physics updates for synthetic objects in the composite AR/MR scene. The physics pipeline 218 takes the composite scene geometric as inputs and computes collisions using the ray-casting accelerator 206 before computing updates 228 to the synthetic geometry 202 for rendering and as a basis for future iterations of the physics models.

In some implementations, a system, such as the system shown in FIG. 2, may be additionally provided with one or more hardware accelerators to implement and/or utilize convolutional neural networks (CNNs) that can process either RGB video/image inputs from the output of the ISP pipeline 215, volumetric scene data from the output of the SLAM pipeline 217, among other examples. Neural network classifiers can run either exclusively using the hardware (HW) convolutional neural network (CNN) accelerator 207 or in a combination of processors and HW CNN accelerator 207 to produce an output classification 237. The availability of a HW CNN accelerator 207 to do inference on volumetric representations may allow groups of voxels in the measured geometry voxels 227 to be labelled as belonging to a particular object class, among other example uses.

Labeling voxels (e.g., using a CNN and supporting hardware acceleration) may allow those objects to which those voxels belong to be recognized by the system as corresponding to the known object and the source voxels can be removed from the measured geometry voxels 227 and replaced by a bounding box corresponding to the object and/or information about the object's origin, object's pose, an object descriptor, among other example information. This may result in a much more semantically meaningful description of the scene that can be used, for example, as an input by a robot, drone, or other computing system to interact with objects in the scene, or an audio system to look up the sound absorption coefficient of objects in the scene and reflect them in the acoustic model of the scene, among other example uses.

One or more processor devices and hardware accelerators may be provided to implement the pipelines of the example system shown and described in FIG. 2. In some implementations, all of the hardware and software elements of the combined rendering pipeline may share access to a DRAM controller 209 which in turn allows data to be stored in a shared DDR memory device 208, among other example implementations.

Figure 3:
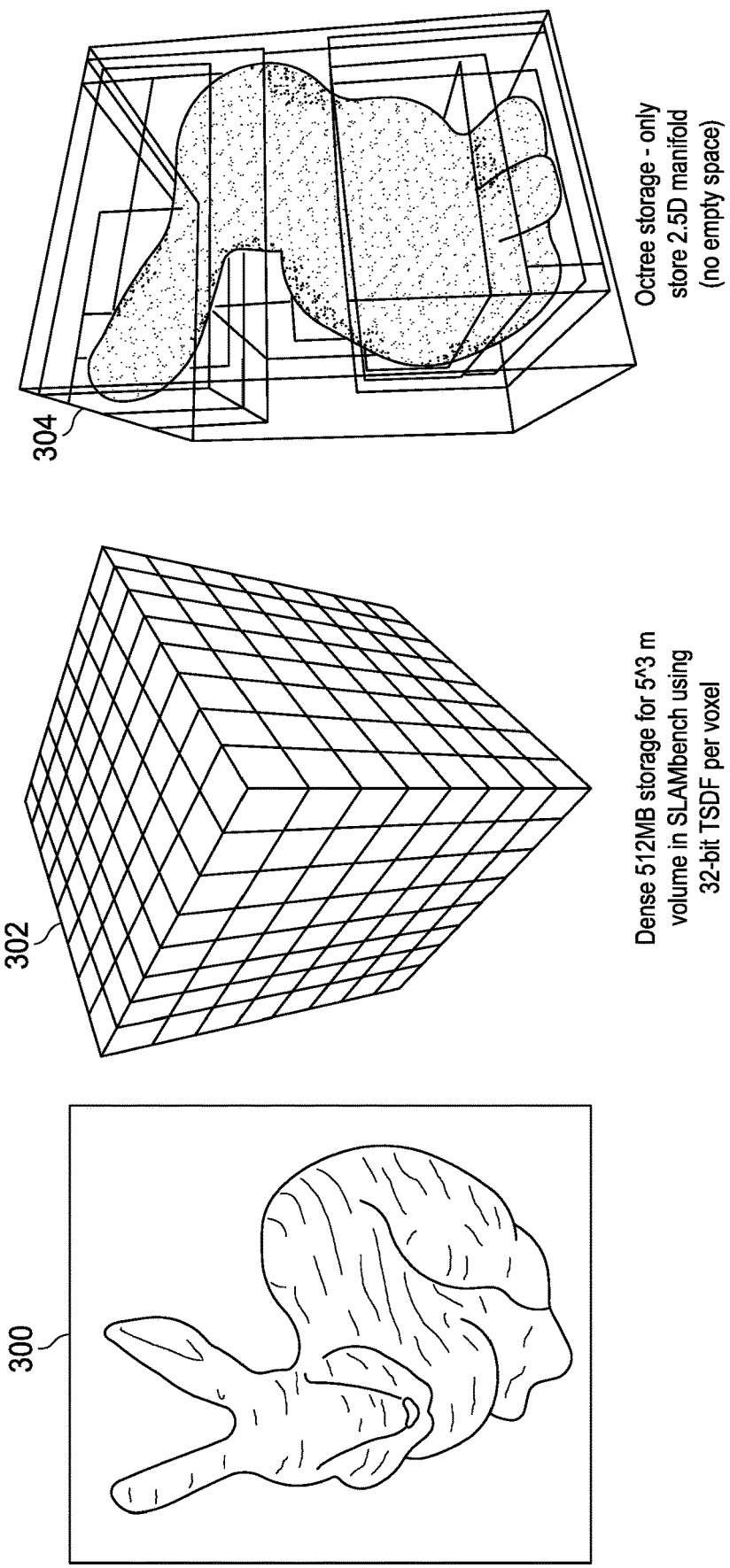
FIG. 3 illustrates the difference between dense and sparse volumetric representations in accordance with some embodiments.

FIG. 3 is presented to illustrate a difference between dense and sparse volumetric representations in accordance with some embodiments. As shown in the example of FIG. 3, a real world or synthetic object 300 (e.g., a statue of a rabbit) can be described in terms of voxels either in a dense manner as shown in 302 or in a sparse manner as shown in 304. The advantage of the dense representation such as 302 is uniform speed of access to all voxels in the volume, but the downside is the amount of storage that may be required. For example, for a dense representation, such as a 512^3 element volume (e.g., corresponding to a 5 m in 1 cm resolution for a volume scanned using a Kinect sensor), 512 Mbytes to store a relatively small volume with a 4 Byte truncated signed distance function (TSDF) for each voxel. An octree representation 304 embodying a sparse representation, on the other hand, may store only those voxels for which there is actual geometry in the real world scene, thereby reducing the amount of data needed to store the same volume.

Figure 4:
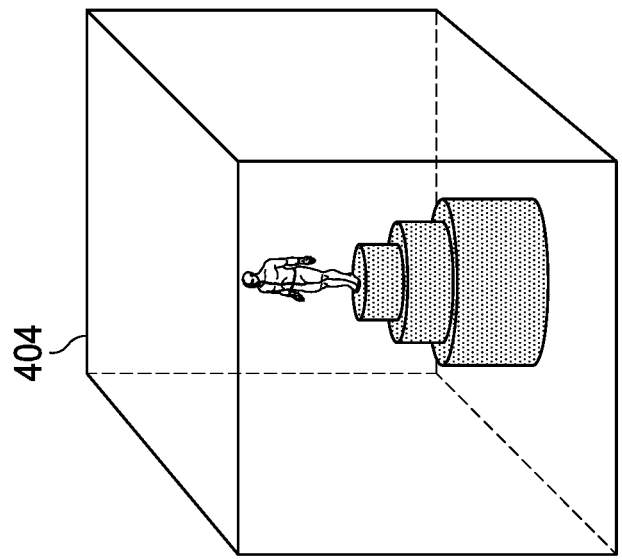
FIG. 4 illustrates a composite view of a scene in accordance with some embodiments.
Figure 4:
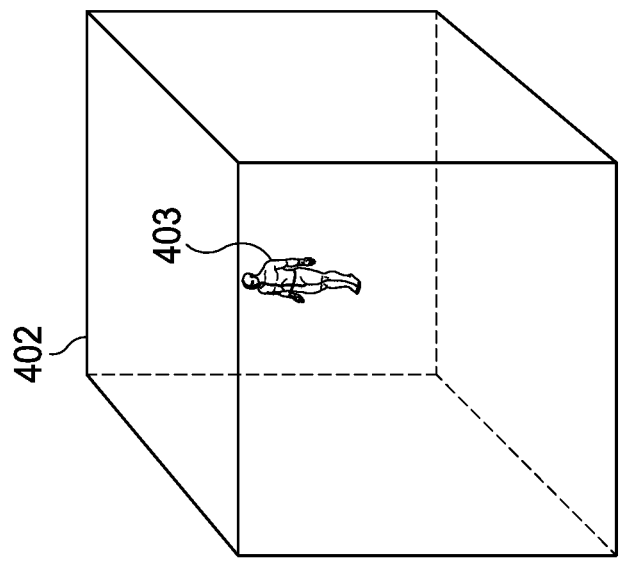
Figure 4:
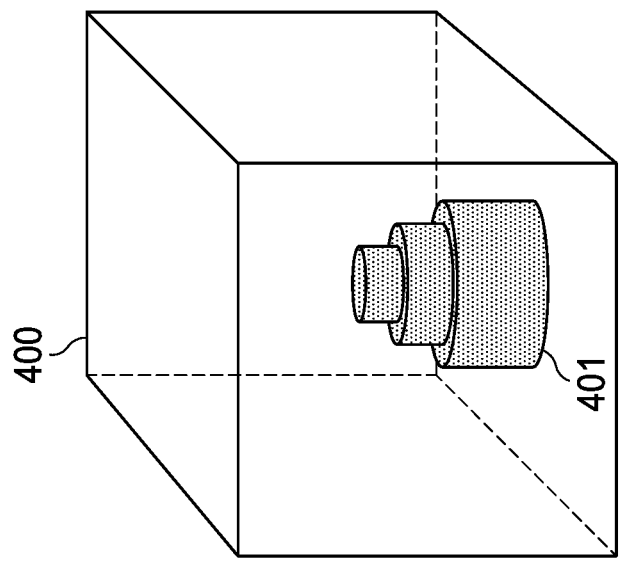
Figure 5:
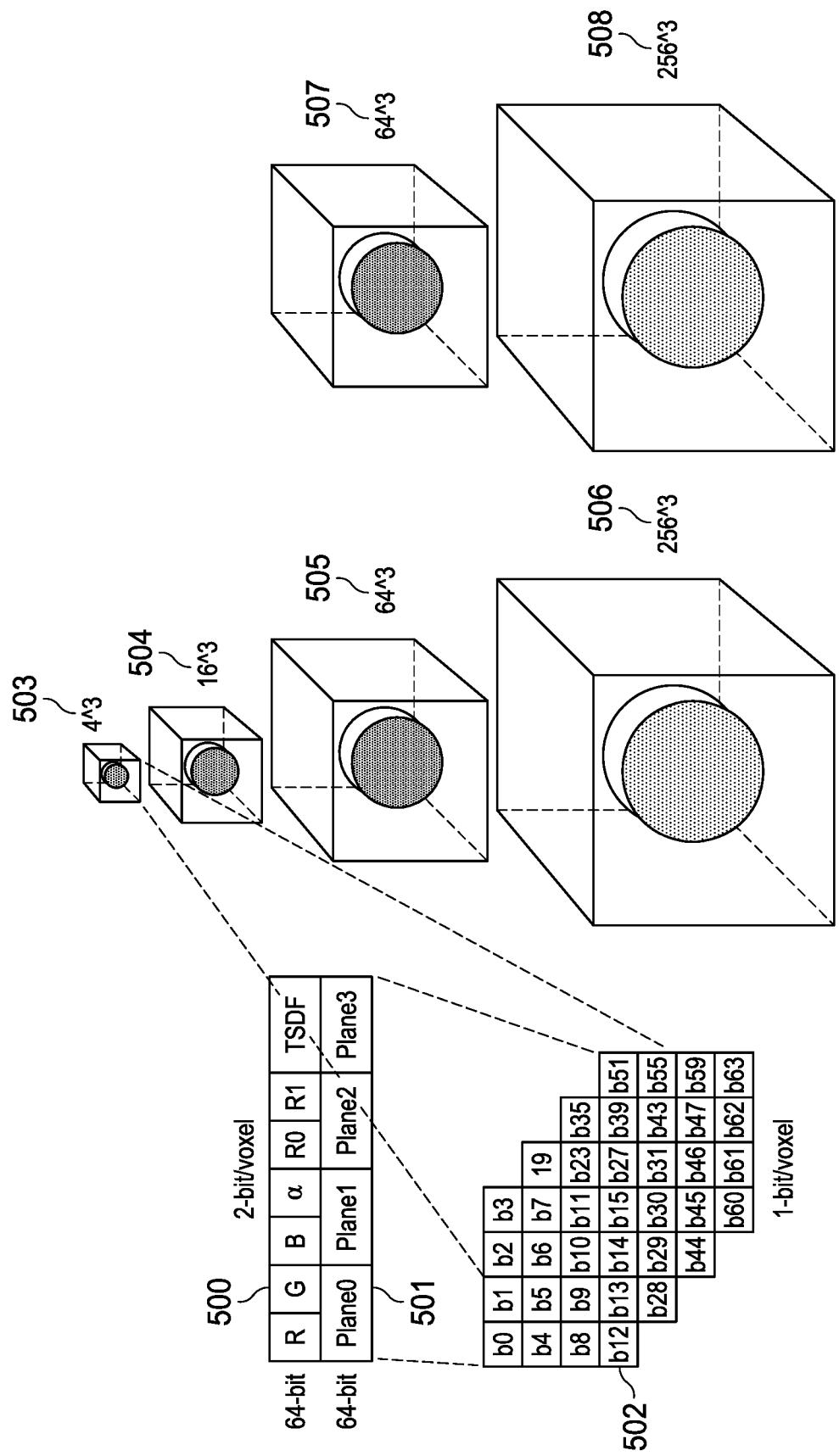
FIG. 5 illustrates the level of detail in an example element tree structure in accordance with some embodiments.

Turning to FIG. 4, a composite view of an example scene is illustrated in accordance with some embodiments. In particular, FIG. 4 shows how a composite view of a scene 404 can be maintained, displayed or subject to further processing using parallel data structures to represent synthetic voxels 401 and real world measured voxels 403 within equivalent bounding boxes 400 and 402 respectively for the synthetic and real-world voxel data. FIG. 5 illustrates the level of detail in a uniform 4^3 element tree structure in accordance with some embodiments. In some implementations, as little as 1 bit may be utilized to describe each voxel in the volume using an octree representation, such as represented in the example of FIG. 5. However, a disadvantage of octree based techniques may be the number of indirect memory accesses utilized to access a particular voxel in the octree. In the case of a sparse voxel octree, the same geometry may be implicitly represented at multiple levels of detail advantageously allowing operations such as ray-casting, game-physics, CNNs, and other techniques to allow empty parts of a scene to be culled from further calculations leading to an overall reduction in not only storage required, but also in terms of power dissipation and computational load, among other example advantages.

In one implementation, an improved voxel descriptor (also referred to herein as "volumetric data structure") may be provided to organize volumetric information as a 4^3 (or 64-bit) unsigned integer, such as shown in 501 with a memory requirement of 1 bit per voxel. In this example, 1-bit per voxel is insufficient to store a truncated signed distance function value (compared with TSDFs in SLAMbench/KFusion which utilize 64-bits). In the present example, an additional (e.g., 64-bit) field 500 may be included in the voxel descriptor. This example may be further enhanced such that while the TSDF in 64-bit field 500 is 16-bits, an additional 2-bits of fractional resolution in x, y and z may be provided implicitly in the voxel descriptor 501 to make the combination of the voxel TSDF in 64-bit field 500 and voxel location 501 equivalent to a much higher resolution TSDF, such as used in SLAMbench/KFusion or other examples. For instance, the additional data in the 64-bit field 500 (voxel descriptor) may be used to store subsampled RGB color information (e.g., from the scene via passive RGB sensors) with one byte each, and an 8-bit transparency value alpha, as well as two 1-byte reserved fields R1 and R2 that may be application specific and can be used to store, for example, acoustic reflectivity for audio applications, rigidity for physics applications, object material type, among other examples.

As shown in FIG. 5, the voxel descriptor 501 can be logically grouped into four 2D planes, each of which contain 16 voxels 502. These 2D planes (or voxel planes) may describe each level of an octree style structure based on successive decompositions in ascending powers of 4, as represented in FIG. 5. In this example implementation, the 64-bit voxel descriptor is chosen because it is a good match for a 64-bit bus infrastructure used in a corresponding system implementation (although other voxel descriptor sizes and formats may be provided in other system implementations and sized according to the bus or other infrastructure of the system). In some implementations, a voxel descriptor may be sized to reduce the number of memory accesses used to obtain the voxel. For instance, a 64-bit voxel descriptor may be used to reduce the number of memory accesses necessary to access a voxel at an arbitrary level in the octree by a factor of 2 compared to a traditional octree which operates on 2^3 elements, among other example considerations and implementations.

In one example, an octree can be described starting from a 4^3 root volume 503, and each non-zero entry in which codes for the presence of geometry in the underlying layers 504, 505 and 506 are depicted in the example 256^3 volume. In this particular example, four memory accesses may be used in order to access the lowest level in the octree. In cases where such overhead is too high, an alternate approach may be adopted to encode the highest level of the octree as a larger volume, such as 64^3, as shown in 507. In this case, each non-zero entry in 507 may indicate the presence of an underlying 4^3 octree in the underlying 256^3 volume 508. The result of this alternate organization is that only two memory accesses are required to access any voxel in the 256^3 volume 508 compared to the alternate formulation shown in 503, 504 and 505. This latter approach is advantageous in the case that the device hosting the octree structure has a larger amount of embedded memory, allowing only the lower and less frequently accessed parts of the voxel octree 508 in external memory. This approach may cost more in terms of storage, for instance, where the full, larger (e.g., 64^3) volume is to be stored in on-chip memory, but the tradeoff may allow faster memory access (e.g., 2×) and much lower power dissipation, among other example advantages.

Figure 6:
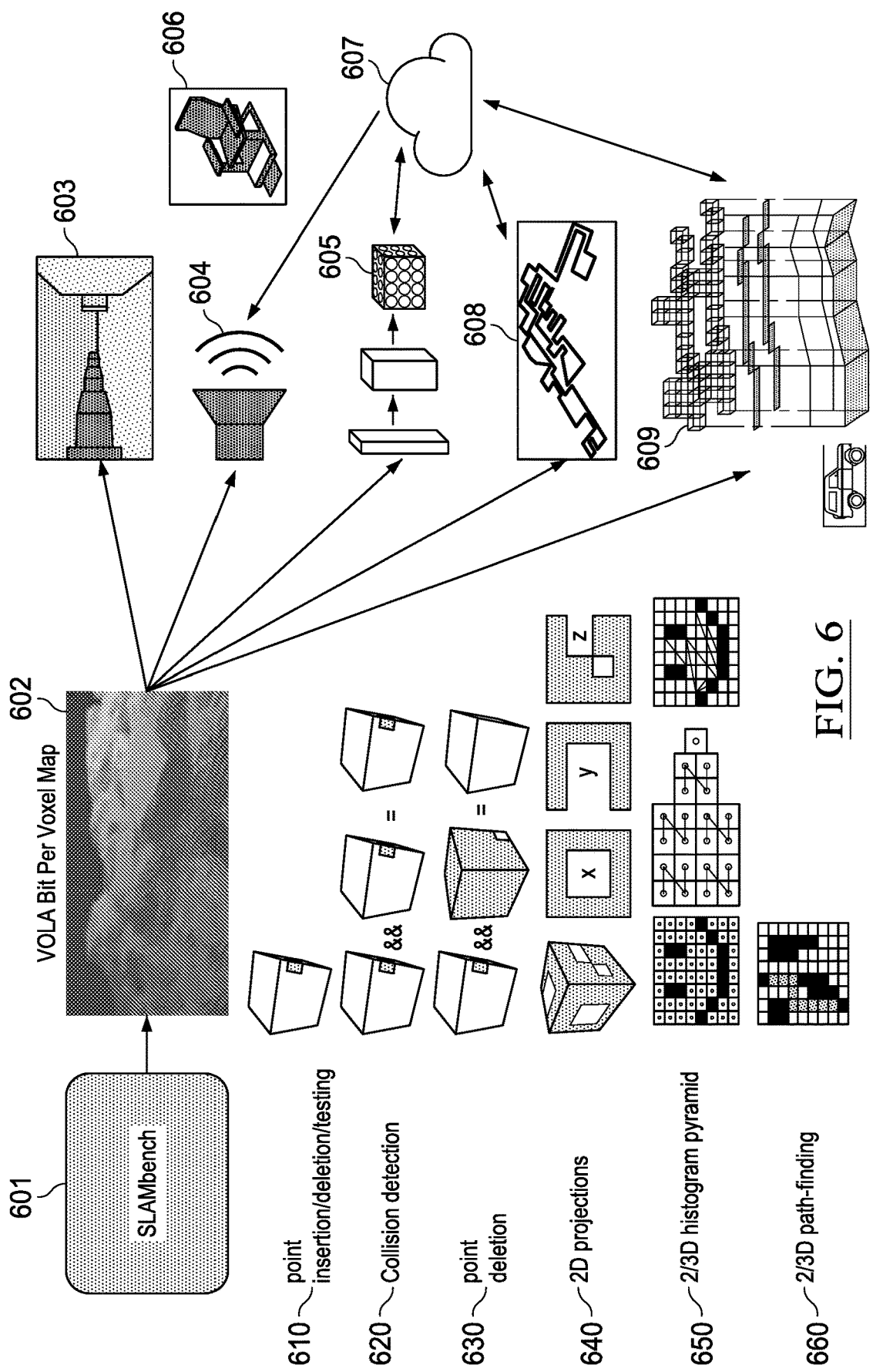
FIG. 6 illustrates applications which can utilize the data-structure and voxel data of the present application in accordance with some embodiments.

Turning to FIG. 6, a block diagram is shown illustrating example applications which may utilize the data-structure and voxel data of the present application in accordance with some embodiments. In one example, such as that shown in FIG. 5, additional information may be provided through an example voxel descriptor 500. While the voxel descriptor may increase the overall memory utilized to 2 bits per voxel, the voxel descriptor may enable a wide range of applications, which can make use of the voxel data, such as represented in FIG. 6. For instance, a shared volumetric representation 602, such as generated using a dense SLAM system 601 (e.g., SLAMbench), can be used in rendering the scene using graphic ray-casting or ray-tracing 603, used in audio ray-casting 604, among other implementations. In still other examples, the volumetric representation 602 can also be used in convolutional neural network (CNN) inference 605, and can be backed up by cloud infrastructure 607. In some instances, cloud infrastructure 607 can contain detailed volumetric descriptors of objects such as a tree, piece of furniture, or other object (e.g., 606) that can be accessed via inference. Based on inferring or otherwise identifying the object, corresponding detailed descriptors may be returned to the device, allowing voxels of volumetric representation 602 to be replaced by bounding box representations with pose information and descriptors containing the properties of the objects, among other example features.

In still other embodiments, the voxel models discussed above may be additionally or alternatively utilized in some systems to construct 2D maps of example environments 608 using 3D-to-2D projections from the volumetric representation 602. These 2D maps can again be shared via communicating machines via cloud infrastructure and/or other network-based resources 607 and aggregated (e.g., using the same cloud infrastructure) to build higher quality maps using crowd-sourcing techniques. These maps can be shared by the cloud infrastructure 607 to connected machines and devices. In still further examples, 2D maps may be refined for ultra-low bandwidth applications using projection followed by piecewise simplification 609 (e.g., assuming fixed width and height for a vehicle or robot). The simplified path may then only have a single X,Y coordinate pair per piecewise linear segment of the path, reducing the amount of bandwidth required to communicate the path of the vehicle 609 to cloud infrastructure 607 and aggregated in that same cloud infrastructure 607 to build higher quality maps using crowd-sourcing techniques. These maps can be shared by cloud infrastructure 607 to connected machines and devices.

In order to enable these different applications, in some implementations, common functionality may be provided, such as through a shared software library, which in some embodiments may be accelerated using hardware accelerators or processor instruction set architecture (ISA) extensions, among other examples. For instance, such functions may include the insertion of voxels into the descriptor, the deletion of voxels, or the lookup of voxels 610. In some implementations, a collision detection function 620 may also be supported, as well as point/voxel deletion from a volume 630, among other examples. As introduced above, a system may be provided with functionality to quickly generate 2D projections 640 in X-, Y- and Z-directions from a corresponding volumetric representation 602 (3D volume) (e.g., which may serve as the basis for a path or collision determination). In some cases, it can also be advantageous to be able to generate triangle lists from volumetric representation 602 using histogram pyramids 650. Further, a system may be provided with functionality for fast determination of free paths 660 in 2D and 3D representations of a volumetric space 602. Such functionality may be useful in a range of applications. Further functions may be provided, such as elaborating the number of voxels in a volume, determining the surface of an object using a population counter to count the number of 1 bits in the masked region of the volumetric representation 602, among other examples.

Figure 7:
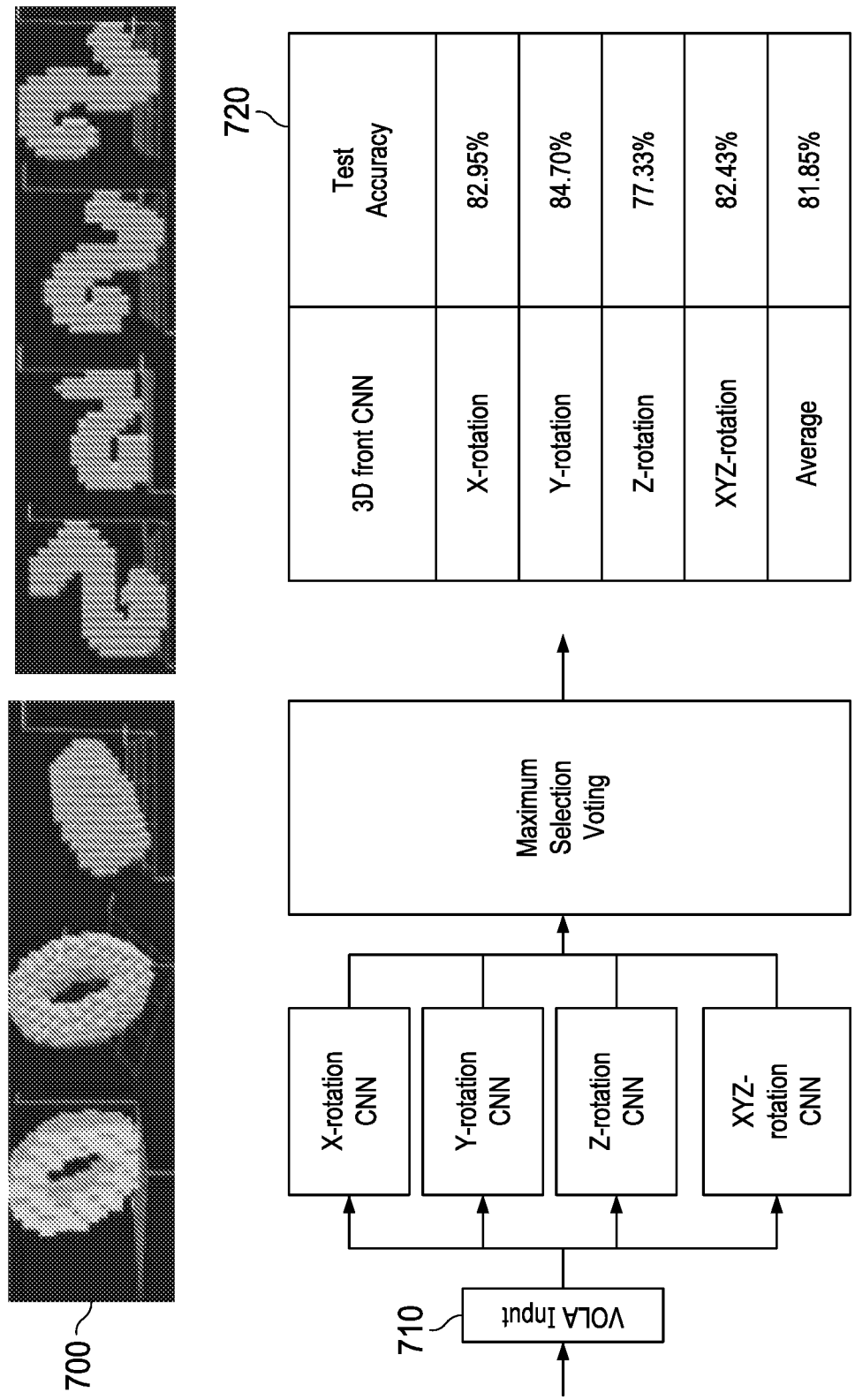
FIG. 7 illustrates an example network used to recognize 3D digits in accordance with some embodiments.

Turning to the simplified block diagram of FIG. 7, an example network is illustrated including systems equipped with functionality to recognize 3D digits in accordance with at least some embodiments. For instance, one of the applications shown in FIG. 6 is the volumetric CNN application 605, which is described in more detail in FIG. 7 where an example network is used to recognize 3D digits 700 generated from a data set, such as the Mixed National Institute of Standards and Technology (MNIST) dataset. Digits within such a data set may be used to train a CNN based convolutional network classifier 710 by applying appropriate rotations and translations in X, Y and Z to the digits before training. When used for inference in an embedded device, the trained network 710 can be used to classify 3D digits in the scene with high accuracy even where the digits are subject to rotations and translations in X, Y and Z 720, among other examples. In some implementations, the operation of the CNN classifier can be accelerated by the HW CNN accelerator 207 shown in FIG. 2. As the first layer of the neural network performs multiplications using the voxels in the volumetric representation 602, these arithmetic operations can be skipped as multiplication by zero is always zero and multiplication by a data value A by one (voxel) is equal to A.

Figure 8:
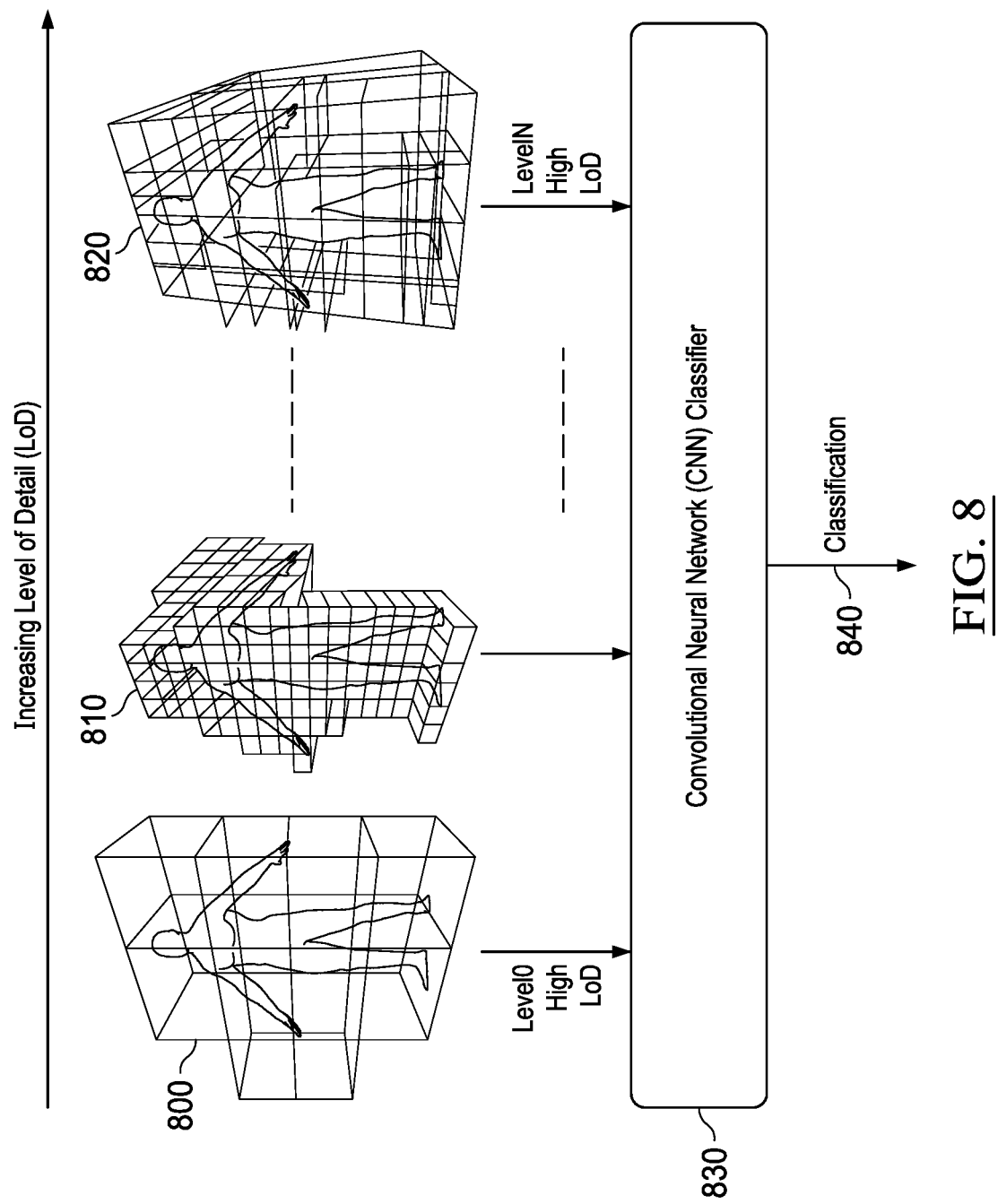
FIG. 8 illustrates multiple classifications performed on the same data structure using implicit levels of detail in accordance with some embodiments.

FIG. 8 illustrates multiple classifications performed on the same data structure using implicit levels of detail. A further refinement of the CNN classification using volumetric representation 602 may be that, as the octree representation contains multiple levels of detail implicitly in the octree structure as shown in FIG. 5, multiple classifications can be performed on the same data structure using the implicit levels of detail 800, 810 and 820 in parallel using a single classifier 830 or multiple classifiers in parallel, such as shown in FIG. 8. In traditional systems, comparable parallel classification may be slow due to the required image resizing between classification passes. Such resizing may be foregone in implementations applying the voxel structures discussed herein, as the same octree may contain the same information at multiple levels of detail. Indeed, a single training dataset based on volumetric models can cover all of the levels of detail rather than resized training datasets, such as would be required in conventional CNN networks.

Figure 9:
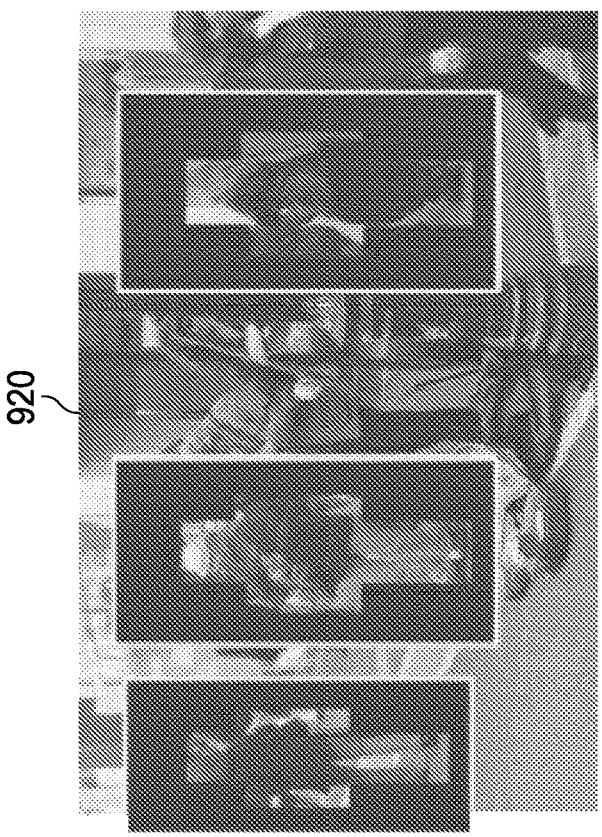
FIG. 9 illustrates operation elimination by 2D convolutional neural networks in accordance with some embodiments.
Figure 9:
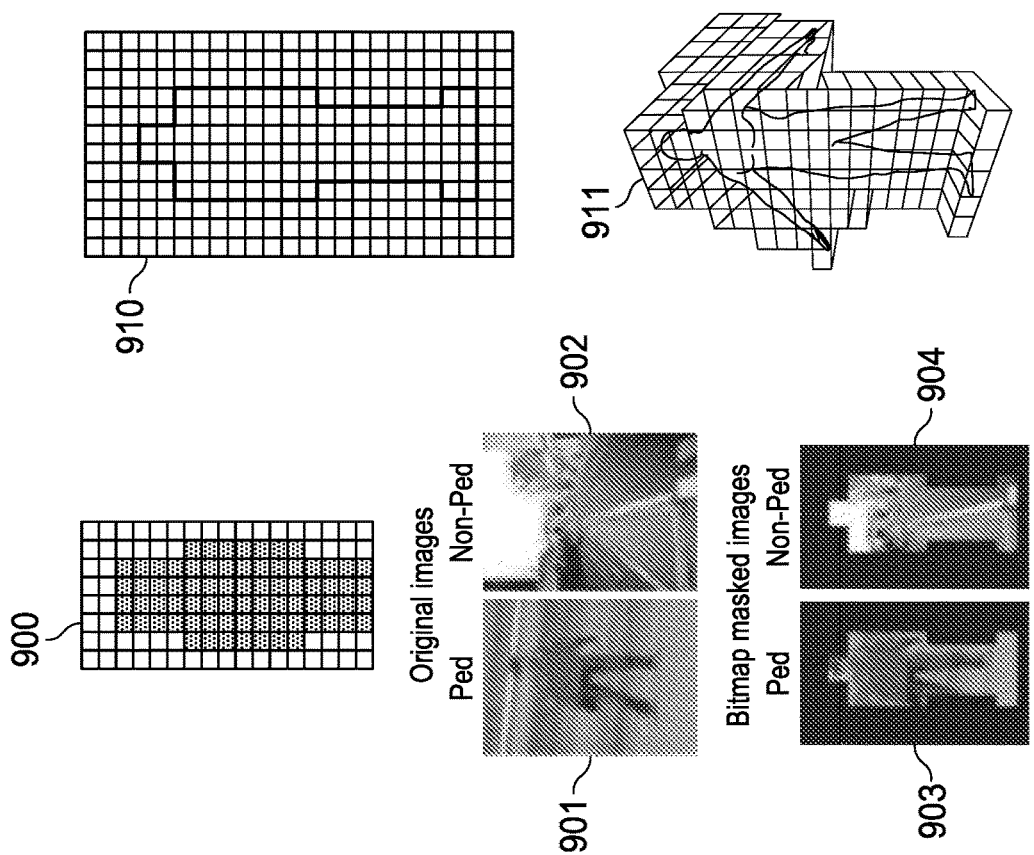

Turning to the example of FIG. 9, an example operation elimination is illustrated by 2D CNNs in accordance with some embodiments. Operation elimination can be used on 3D volumetric CNNs, as well as on 2D CNNs, such as shown in FIG. 9. For instance, in FIG. 9, in a first layer, a bitmap mask 900 can be used to describe the expected "shape" of the input 910 and may be applied to an incoming video stream 920. In one example, operation elimination can be used not only on 3D volumetric CNNs, but also on 2D volumetric CNNs. For instance, in a 2D CNN of the example of FIG. 9, a bitmap mask 900 may be applied to a first layer of the CNN to describe the expected "shape" of the input 910 and may be applied to input data of the CNN, such as an incoming video stream 820. As an example, the effect of applying bitmap masks to images of pedestrians for training or inference in CNN networks is shown in FIG. 9 where 901 represents an original image of a pedestrian 901, with 903 representing the corresponding version with bitmap mask applied. Similarly, an image containing no pedestrian is shown in 902 and the corresponding bitmap masked version in 904. The same method can be applied to any kind of 2D or 3D object in order to reduce the number of operations required for CNN training or inference through knowledge of the expected 2D or 3D geometry expected by the detector. An example of a 3D volumetric bitmap is shown in 911. The use of 2D bitmaps for inference in a real scene is shown in 920.

In the example implementation of FIG. 9, a conceptual bitmap is shown (at 900) while the real bitmap is generated by averaging a series of training images for a particular class of object 910. The example shown is two dimensional, however similar bitmap masks can also be generated for 3D objects in the proposed volumetric data format with one bit per voxel. Indeed the method could also potentially be extended to specify expected color range or other characteristics of the 2D or 3D object using additional bits per voxel/pixel, among other example implementations.

Figure 10:
FIG. 10 illustrates the experimental results from analysis of example test images in accordance with some embodiments.

FIG. 10 is a table illustrating results of an example experiment involving the analysis of 10,000 CIFAR-10 test images in accordance with some embodiments. In some implementations, operation elimination can be used to eliminate intermediate calculations in 1D, 2D, and 3D CNNs due to Rectified Linear Unit (ReLU) operations which are frequent in CNN networks such as LeNet 1000, shown in FIG. 10. As shown in FIG. 10, in an experiment using 10,000 CIFAR-10 test images, the percentage of data-dependent zeroes generated by the ReLU units may reach up to 85%, meaning that in the case of zeroes, a system may be provided that recognizes the zeros and, in response, does not fetch corresponding data and perform corresponding multiplication operations. In this example, the 85% represents the percentage of ReLU dynamic zeros generated from the Modified National Institute of Standards and Technology database (MNIST) test dataset. The corresponding operation eliminations corresponding to these zero may serve to reduce power dissipation and memory bandwidth requirements, among other example benefits.

Trivial operations may be culled based on a bitmap. For instance, the use of such a bitmap may be according to the principles and embodiments discussed and illustrated in U.S. Pat. No. 8,713,080, titled "Circuit for compressing data and a processor employing the same," which is incorporated by reference herein in its entirety. Some implementations, may provide hardware capable of using such bitmaps, such as systems, circuitry, and other implementations discussed and illustrated in U.S. Pat. No. 9,104,633, titled "Hardware for performing arithmetic operations," which is also incorporated by reference herein in its entirety.

Figure 11:
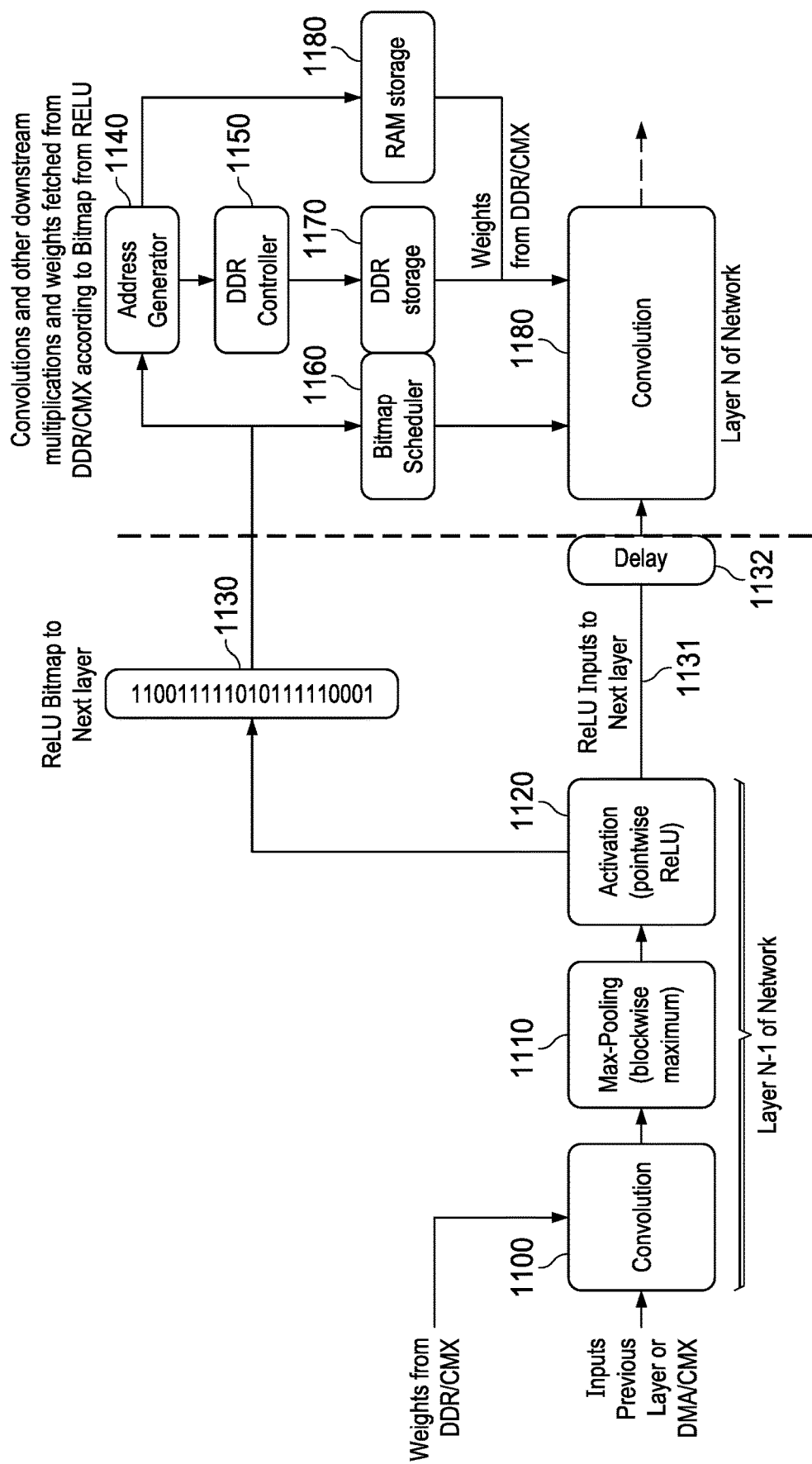
FIG. 11 illustrates hardware for culling operations in accordance with some embodiments.

FIG. 11 illustrates hardware that may be incorporated into a system to provide functionality for culling trivial operations based on a bitmap in accordance with some embodiments. In this example, a multi-layer neural network is provided, which includes repeated convolutional layers. The hardware may include one or more processors, one or more microprocessors, one or more circuits, one or more computers, and the like. In this particular example, a neural network includes an initial convolutional processing layer 1100, followed by pooling processing 1110, and finally an activation function processing, such as rectified linear unit (ReLU) function 1120. The output of the ReLU unit 1120, which provides ReLU output vector 1131, may be connected to a following convolutional processing layer 1180 (e.g., possibly via delay 1132), which receives ReLU output vector 1131. In one example implementation, a ReLU bitmap 1130 may also be generated in parallel with the connection of the ReLU unit 1120 to the following convolution unit 1180, the ReLU bitmap 1130 denoting which elements in the ReLU output vector 1131 are zeroes and which are non-zeroes.

In one implementation, a bitmap (e.g., 1130) may be generated or otherwise provided to inform enabled hardware of opportunities to eliminate operations involved in calculations of the neural network. For instance, the bits in the ReLU bitmap 1130 may be interpreted by a bitmap scheduler 1160, which instructs the multipliers in the following convolutional unit 1180 to skip zero entries of the ReLU output vector 1131 where there are corresponding binary zeroes in the ReLU bitmap 1130, given that multiplication by zero will always produce zero as an output. In parallel, memory fetches from the address generator 1140 for data/weights corresponding to zeroes in the ReLU bitmap 1130 may also be skipped as there is little value in fetching weights that are going to be skipped by the following convolution unit 1180. If weights are to be fetched from an attached DDR DRAM storage device 1170 via a DDR controller 1150, the latency may be so high that it is only possible to save some on-chip bandwidth and related power dissipation. On the other hand, if weights are fetched from on-chip RAM 1180 storage, it may be possible to bypass/skip the entire weight fetch operation, particularly if a delay corresponding to the RAM/DDR fetch delay 1132 is added at the input to the following convolution unit 1180.

Figure 12:
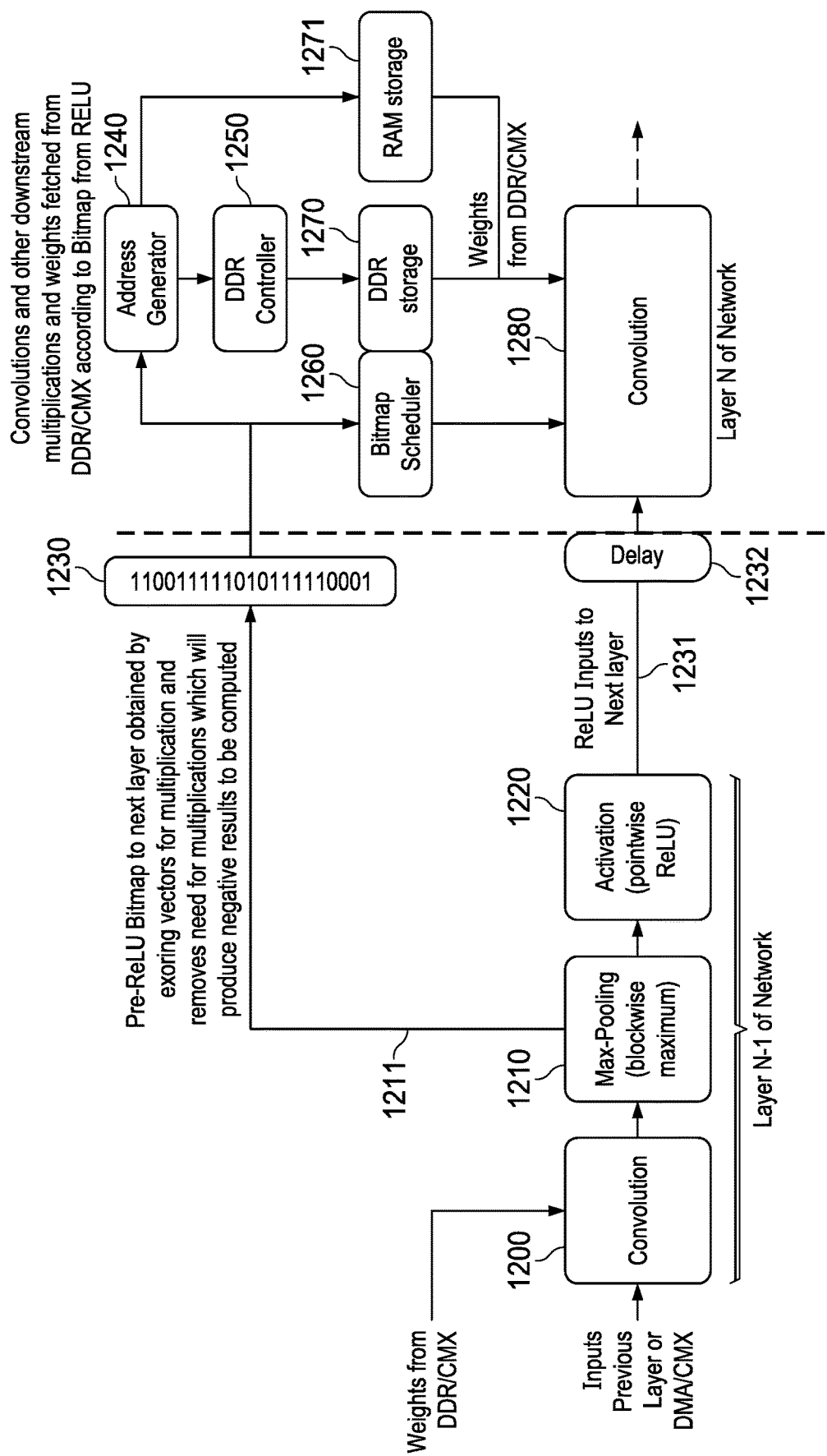
FIG. 12 illustrates a refinement to the hardware for culling operations in accordance with some embodiments.

Turning to FIG. 12, a simplified block diagram is presented to illustrate a refinement to example hardware equipped with circuitry and other logic for culling trivial operations (or performing operation elimination) in accordance with some embodiments. As shown in the example of FIG. 12, additional hardware logic may be provided to predict the sign of the ReLU unit 1220 input in advance from the preceding Max-Pooling unit 1210 or convolution unit 1200. Adding sign-prediction and ReLU bitmap generation to the Max-pooling unit 1210 may allow the ReLU bitmap information to be predicted earlier from a timing point of view to cover delays that may occur through the address generator 1240, through external DDR controller 1250 and DDR storage 1270 or internal RAM storage 1271. If the delay is sufficiently low, the ReLU bitmap can be interpreted in the address generator 1240 and memory fetches associated with ReLU bitmap zeroes can be skipped completely, because the results of the fetch from memory can be determined never to be used. This modification to the scheme of FIG. 11 can save additional power and may also allow the removal of the delay stage (e.g., 1132, 1232) at the input to the following convolution unit 1280 if the delays through the DDR access path (e.g., 1240 to 1250 to 1270) or RAM access path (e.g., 1240 to 1271) are sufficiently low so as not to warrant a delay stage 1232, among other example features and functionality.

Figure 13:
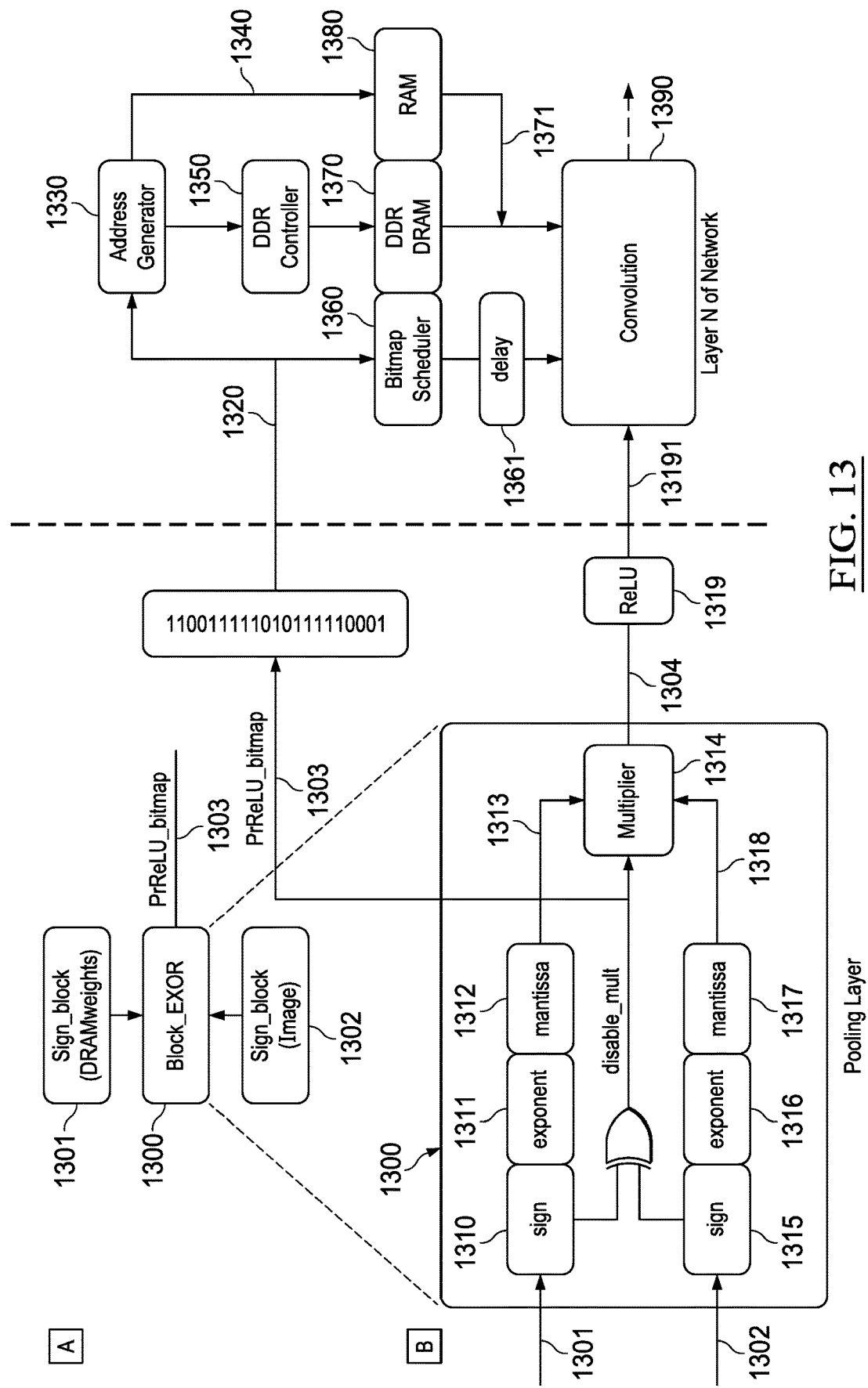
FIG. 13 illustrates hardware in accordance with some embodiments.

FIG. 13 is another simplified block diagram illustrating example hardware in accordance with some embodiments. For instance, CNN ReLU layers can produce high numbers of output zeroes corresponding to negative inputs. Indeed, negative ReLU inputs can be predictively determined by looking at the sign input(s) to the previous layers (e.g., the pooling layer in the example of FIG. 13). Floating-point and integer arithmetic can be explicitly signed in terms of the most significant bit (MSB) so a simple bit-wise exclusive OR (XOR) operation across vectors of inputs to be multiplied in a convolution layer can predict which multiplications will produce output zeroes, such as shown in FIG. 13. The resulting sign-predicted ReLU bitmap vector can be used as a basis for determining a subset of multiplications and associated coefficient reads from memory to eliminate, such as in the manner described in other examples above.

Providing for the generation of ReLU bitmaps back into the previous pooling or convolutional stages (i.e., stages before the corresponding ReLU stage) may result in additional power. For instance, sign-prediction logic may be provided to disable multipliers when they will produce a negative output that will be ultimately set to zero by the ReLU activation logic. For instance, this is shown where the two sign bits 1310 and 1315 of the multiplier 1314 inputs 1301 and 1302 are logically combined by an XOR gate to form a PreReLU bitmap bit 1303. This same signal can be used to disable the operation of the multiplier 1314, which would otherwise needlessly expend energy generating a negative output which would be set to zero by the ReLU logic before being input for multiplication in the next convolution stage 1390, among other examples.

Note that the representation of 1300, 1301, 1302, and 1303 (notation A) shows a higher level view of that shown in the representation donated B in FIG. 13. In this example, the input to block 1302 may include two floating-point operand. Input 1301 may include an explicit sign-bit 1310, a Mantissa 1311 including a plurality of bits, and an exponent again including a plurality of bits 1312. Similarly, input 1302 may likewise include a sign 1315, mantissa 1317, and exponent 1316. In some implementations, the mantissas, and exponents may have different precisions, as the sign of the result 1303 depends solely upon the signs of 1301 and 1302, or 1310 and 1315 respectively. In fact, neither 1301 nor 1302 need be floating point numbers, but can be in any integer or fixed point format as long as they are signed numbers and the most significant bit (MSB) is effectively the sign bit either explicitly or implicitly (e.g., if the numbers are one- or twos-complement, etc.).

Continuing with the example of FIG. 13, the two sign inputs 1310 and 1315 may be combined using an XOR (sometimes denoted alternatively herein as ExOR or EXOR) gate to generate a bitmap bit 1303, which may then be processed using hardware to identify down-stream multiplications that may be omitted in the next convolution block (e.g., 1390). The same XOR output 1303 can also be used to disable the multiplier 1314 in the event that the two input numbers 1313 (e.g., corresponding to 1301) and 1318 (e.g., corresponding to 1302) have opposite signs and will produce a negative output 1304 which would be set to zero by the ReLU block 1319 resulting in a zero value in the RELU output vector 13191 which is to be input to the following convolution stage 1390. Accordingly, in some implementations, the PreReLU bitmap 1320 may, in parallel, be transmitted to the bitmap scheduler 1360, which may schedules the multiplications to run (and/or omit) on the convolution unit 1390. For instance, for every zero in the bitmap 1320, a corresponding convolution operation may be skipped in the convolution unit 1390. In parallel, the bitmap 1320 may be consumed by an example address generator 1330, which controls the fetching of weights for use in the convolution unit 1390. A list of addresses corresponding to 1s in the bitmap 1320 may be compiled in the address generator 1330 and controls either the path to DDR storage 1370 via the DDR controller 1350, or else controls the path to on chip RAM 1380. In either case, the weights corresponding to ones in the PreReLU bitmap 1320 may be fetched and presented (e.g., after some latency in terms of clock cycles to the weight input 1371) to the convolution block 1390, while fetches of weights corresponding to zeros may be omitted, among other examples.

As noted above, in some implementations, a delay (e.g., 1361) may be interposed between the bitmap scheduler 1360 and the convolution unit 1390 to balance the delay through the address generator 1330, DDR controller 1350, and DDR 1350, or the path through address generator 1330 and internal RAM 1380. The delay may enable convolutions driven by the bitmap scheduler to line up correctly in time with the corresponding weights for the convolution calculations in the convolution unit 1390. Indeed, from a timing point of view, generating a ReLU bitmap earlier than at the output of the ReLU block 1319 can allow additional time to be gained, which may be used to intercept reads to memory (e.g., RAM 1380 or DDR 1370) before they are generated by the address generator 1330, such that some of the reads (e.g., corresponding to zeros) may be foregone. As memory reads may be much higher than logical operations on chip, excluding such memory fetches may result in very significant energy savings, among other example advantages.

In some implementations, if there is still insufficient saving in terms of clock cycles to cover the DRAM access times, a block oriented technique may be used to read groups of sign-bits (e.g., 1301) from DDR ahead of time. These groups of sign bits may be used along with blocks of signs from the input images or intermediate convolutional layers 1302 in order to generate blocks of PreReLU bitmaps using a set of (multiple) XOR gates 1300 (e.g., to calculate the differences between sign bits in a 2D or 3D convolution between 2D or 3D arrays/matrices, among other examples). In such an implementation, an additional 1-bit of storage in DDR or on-chip RAM may be provided to store the signs of each weight, but this may allow many cycles of latency to be covered in such a way as to avoid ever reading weights from DDR or RAM that are going to be multiplied by zero from a ReLU stage. In some implementations, the additional 1-bit of storage per weight in DDR or on-chip RAM can be avoided as signs are stored in such a way that they are independently addressable from exponents and mantissas, among other example considerations and implementations.

In one example, a system may be further enhanced to utilize DDR accesses, which may have a natural burst access for maximal data-transfer rate. Saving energy by skipping individual DDR weight accesses may not be feasible in this content as they may be shorter than a burst. Accordingly, in some instances, bursts may be skipped in cases where all bitmap bits corresponding to a particular burst transaction are zero. However, this may not occur frequently and hence, the resulting power and bandwidth savings may be limited. In still other implementations, a register programmable threshold may be set for the number of bitmap bits in a burst so that the burst will be skipped completely if more than N bits in the bitmap burst are zero. This may have the effect of slightly degrading overall CNN classification accuracy, but may be acceptable in the interests of saving energy.

Figure 14:
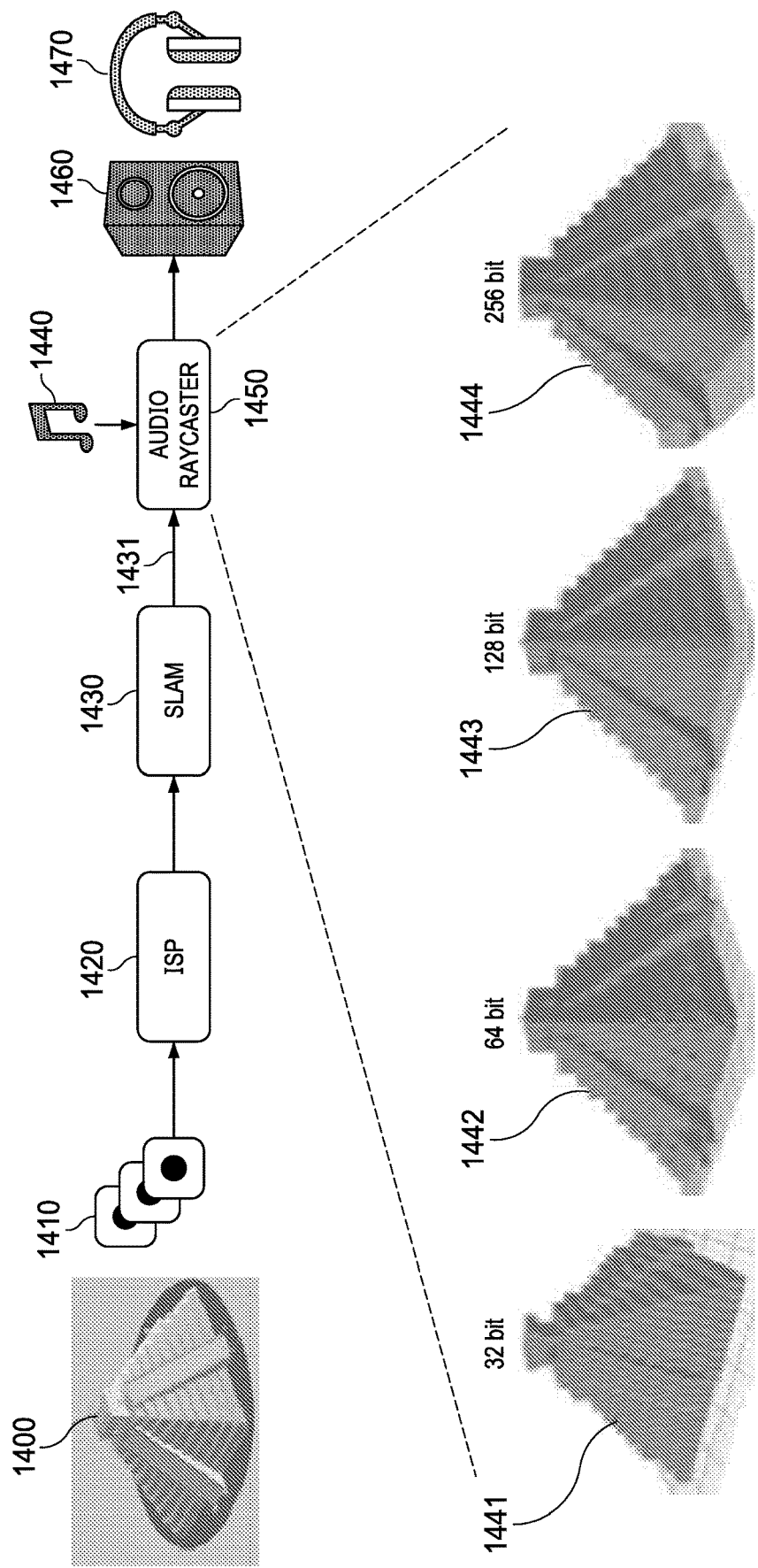
FIG. 14 illustrates use of example volumetric data to synthesize an audio stream in accordance with some embodiments.

FIG. 14 illustrates how volumetric data (e.g., according to a format, such as described above) may be used to synthesize an audio stream in accordance with some embodiments. A challenge present in some augmented reality (AR) and mixed reality (MR) systems is addressing inconsistencies in the AR/MR presentation in order to make the experience more realistic and immersive. This may include combining imagery (e.g., virtual with virtual, virtual with real, etc.), such as described above. Volumetric data may also be used to enhance audio presentations within AR and MR applications. For instance, the diagram shown in FIG. 14 illustrates the example use of volumetric data (e.g., formatted such as discussed above) to synthesize an audio stream for loudspeakers 1460, headphones 1470, or other speakers by creating a reverberation model from the volumetric model using an audio ray-caster 1450 and passing live or pre-recorded audio 1440 through the audio ray-caster generated model to generate output waveforms corresponding to the volumetric model. In the particular example of FIG. 14, a plurality of image sensors 1410 may be provided, which are connected to an ISP pipeline 1420 (such as previously described), the outputs of which are fed into a SLAM pipeline 1430 (such as previously described). The image sensors 1410 can include passive stereo pairs, structured light or time-of-flight active IR cameras, among other examples.

A plurality of audio models can be generated from an octree-based volumetric model 1431 at differing levels of detail (for speed of rendering) as shown in 1441, 1442, 1443 and 1444 in ascending level of detail and bits. Indeed, the same volumetric model can be used to generate models for different loudspeaker positions so multiple loudspeakers including stereo and surround-sound can be supported, including stereo pairs and headphones. The models can be generated on the fly as complete models, or indeed can be built using reusable slides of geometry that can be combined opportunely and dynamically using a final summation-stage that takes into account the rays which can contribute to the sound field based on the listener's current position in the scene modeled by the volumetric model.

Figure 15:
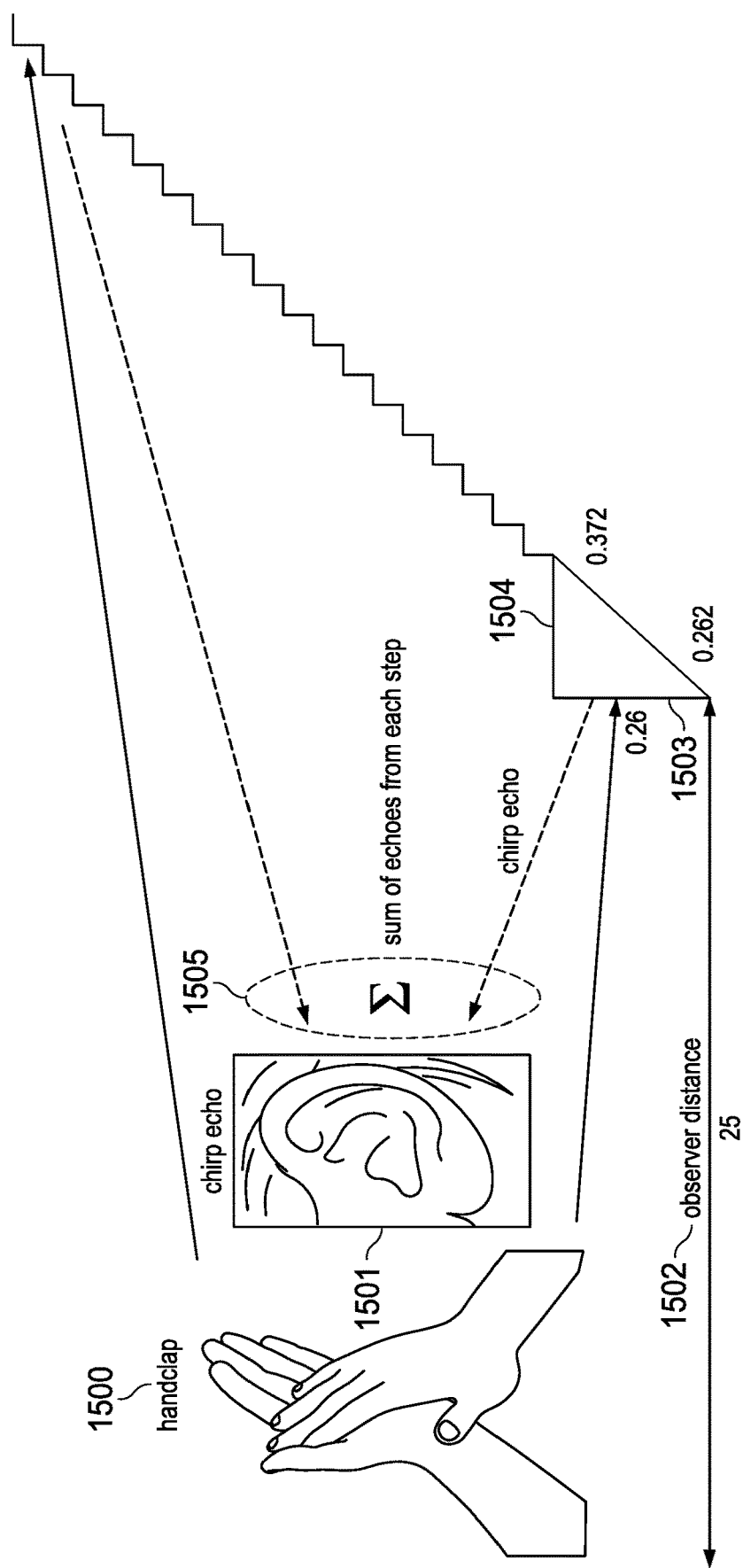
FIG. 15 illustrates an example of a reusable reverberation filter element in accordance with some embodiments.

FIG. 15 shows an example of such a reusable reverberation filter element based on geometry according to some embodiments. In the particular example of FIG. 15, a cross-sectional view of the example pyramid structure 1400 of FIG. 14 is considered. The pyramid may be modeled by an octree based volumetric model, and the volumetric model may be utilized to generate an audio reverberation model consistent with the dimensions and characteristics of the pyramid structure 1400. In this example, generation of the audio reverberation model may be primarily based on the height 1503 and depth of the steps 1504, as well as the observer distance and orientation relative to the first step 1502 of the pyramid. A reverberation may be modeled for this first step as well as all of the other steps in the pyramid. These modeled reverberations may be summed back at listener's ear (e.g., via speakers 1505 connected to the reverberation modeling circuitry or other logic). The input to the reverberation model may be a particular noise (e.g., a handclap, voice, or other audio), including an audio stream from a live environment captured via a microphone, a pre-recorded audio stream, or other sound 1500.

Figure 16:
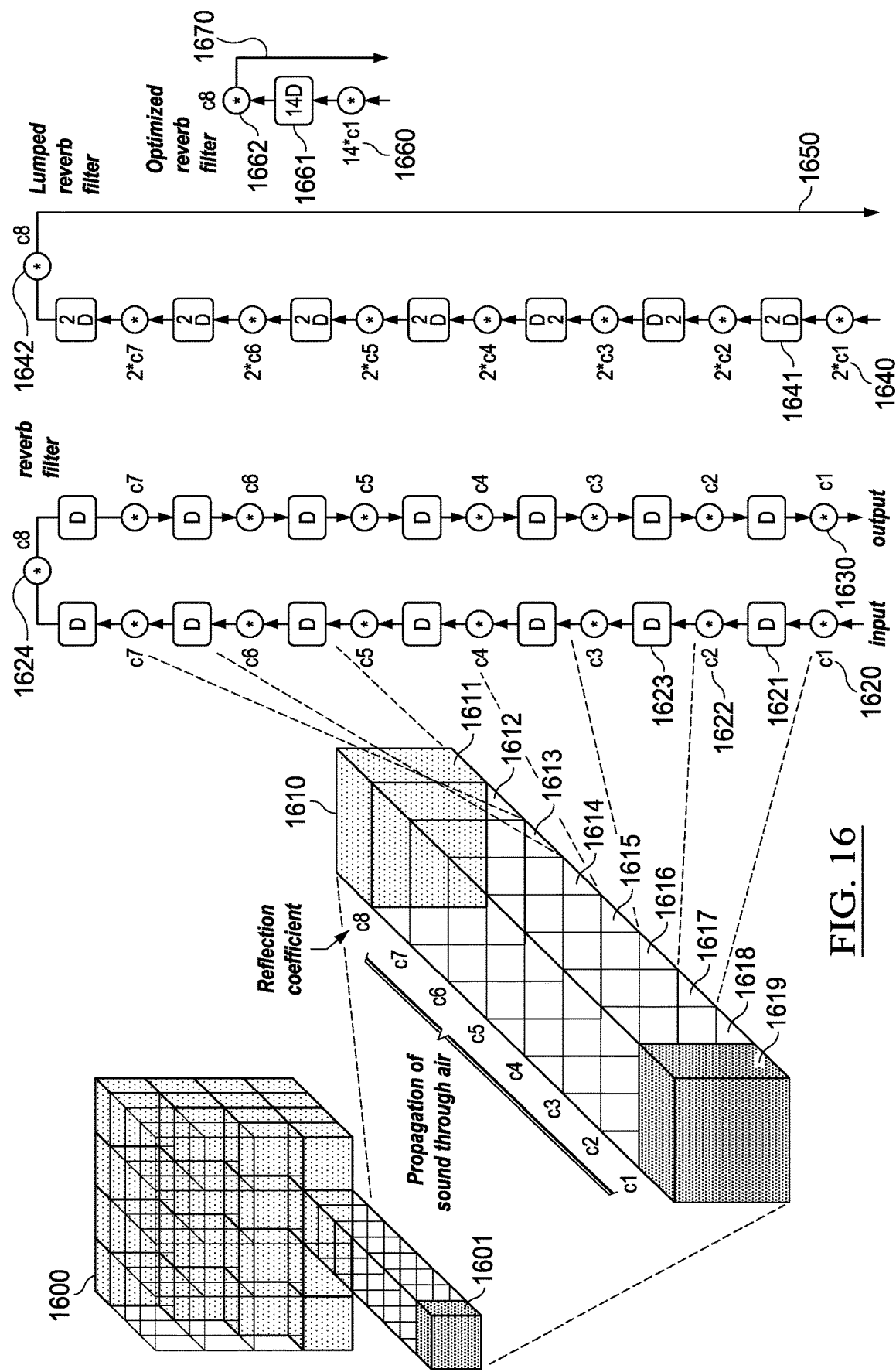
FIG. 16 illustrates the construction of the FIR reverberation filter in accordance with some embodiments.

FIG. 16 illustrates the example generation of a finite impulse response (FIR) reverberation filter from an example volumetric model according to some embodiments based on a 4×4 volumetric cube 1600 and a determined observer position 1601. From the point of view of one of the rays, the propagation of the sound wave may be modeled by considering its propagation through each voxel volume 1619 to 1612, with a system modeling attenuation of the sound wave by a propagation coefficient corresponding to the passage of sound through air. Continuing with this example, the modeled sound may be modeled as reflecting off a first portion 1610 of a volumetric model (e.g., the first step 1611 of the pyramid model in the example of FIGS. 14-15) with the reflection coefficient corresponding to the material of the object modeled by the voxel 1610. For instance, in the previous example, voxel 1610 may represent the surface of a limestone pyramid, with the volumetric model or associated data specifying that a reflection coefficient for limestone (e.g., the material of the pyramid surface) be used to determine how the sound would reflect off of the pyramid. Continuing with this example, propagation of the modeled (and now attenuated) attenuated, reflected wave may be further modeled to re-traverse the voxels (e.g., 1612-1618) back to the observer position 1619, where the signal may be further modeled based on the reflection and the attenuation of the media (e.g., air, wall, water, glass, etc.) modeled by the voxels (e.g., 1612-1618), among other examples.

Figure 17:
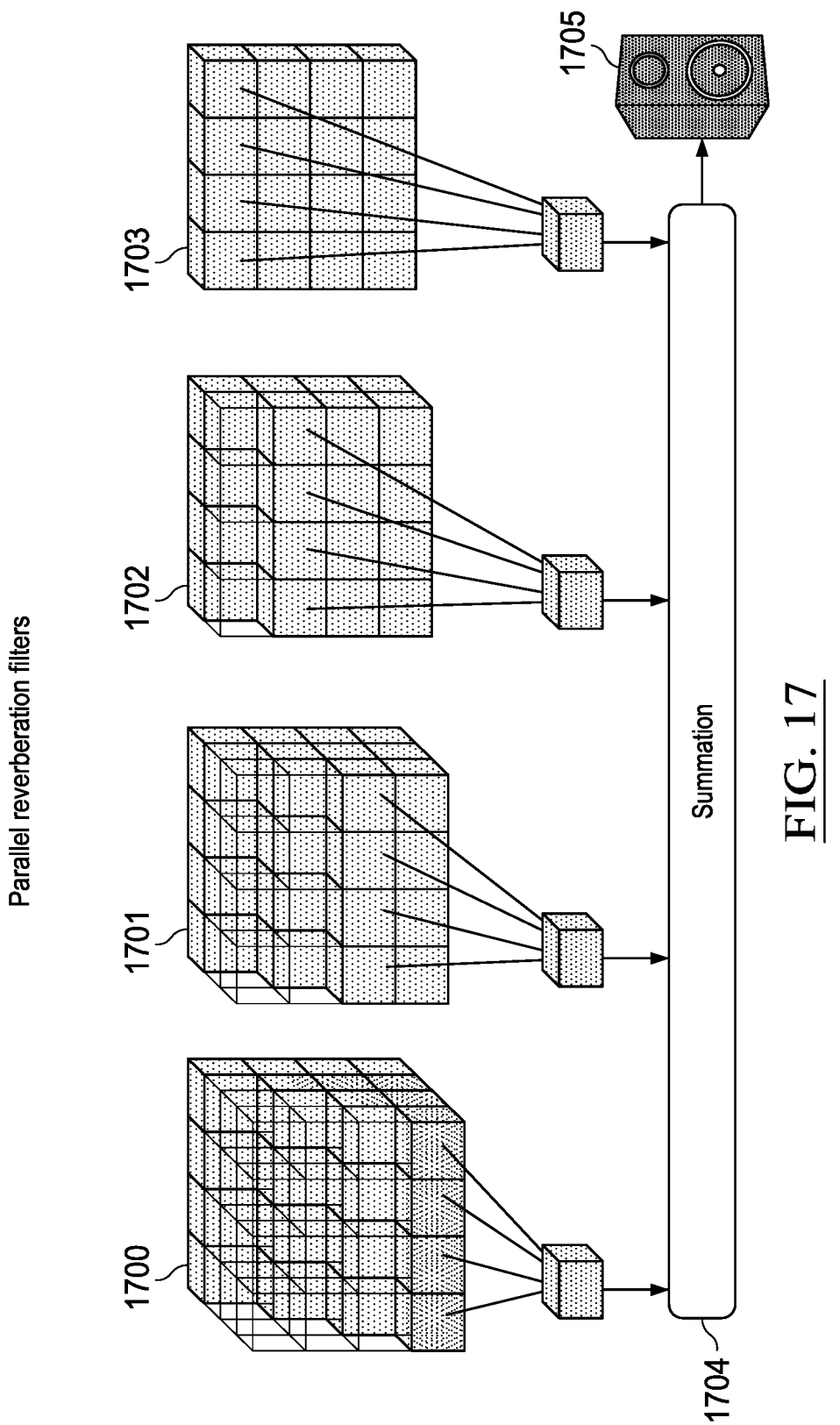
FIG. 17 shows a vectorized implementation of the FIR reverberation filter in accordance with some embodiments.

In one embodiment, the structure illustrated in FIG. 16 may be directly transcribed as an FIR filter where the input audio samples enter 1620, are multiplied by the propagation through the first voxel c1 (1620), and pass through a delay stage (1 voxel) 1621 before being attenuated by the propagation coefficient for one voxel 1622, and so on until the final output sample exits the FIR filter at 1630. That all voxel coefficients are equal allows a lumped version of the FIR filter to be built where half the number of delays and multipliers are used with each delay element 1641 twice as long and each multiplier coefficient 1640 twice as large with the exception of the reflection coefficient from the stone pyramid which is unchanged 1642. In other words, in such instances, N reflection coefficients could be summed and a lumped multiplication performed rather than performing each multiplication separately. Such summation can be done statically for each reflection (e.g., determined through ray casting against a geometry modeled by a volumetric data structure). For instance, all of the delays 1661 and all propagation coefficients 1660 may be lumped into a fully optimized FIR filter with a 14D delay element and 14×C1 propagation coefficient, however, this approach may not be vectorizable, which could present inefficiencies on a vector processor or vectorized hardware. For a vectorized implementation of the FIR reverberation filter the same 4×4 volume can be ray-traced in horizontal strips each four elements wide in four vector operations 1700-1703 before summing the four vectorized outputs in 1704 and outputting the output samples to a loudspeaker or headphones 1705, such as shown in the example diagram of FIG. 17. Accordingly, FIG. 17 shows a vectorized implementation of the FIR reverberation filter according to some embodiments.

Figure 18:
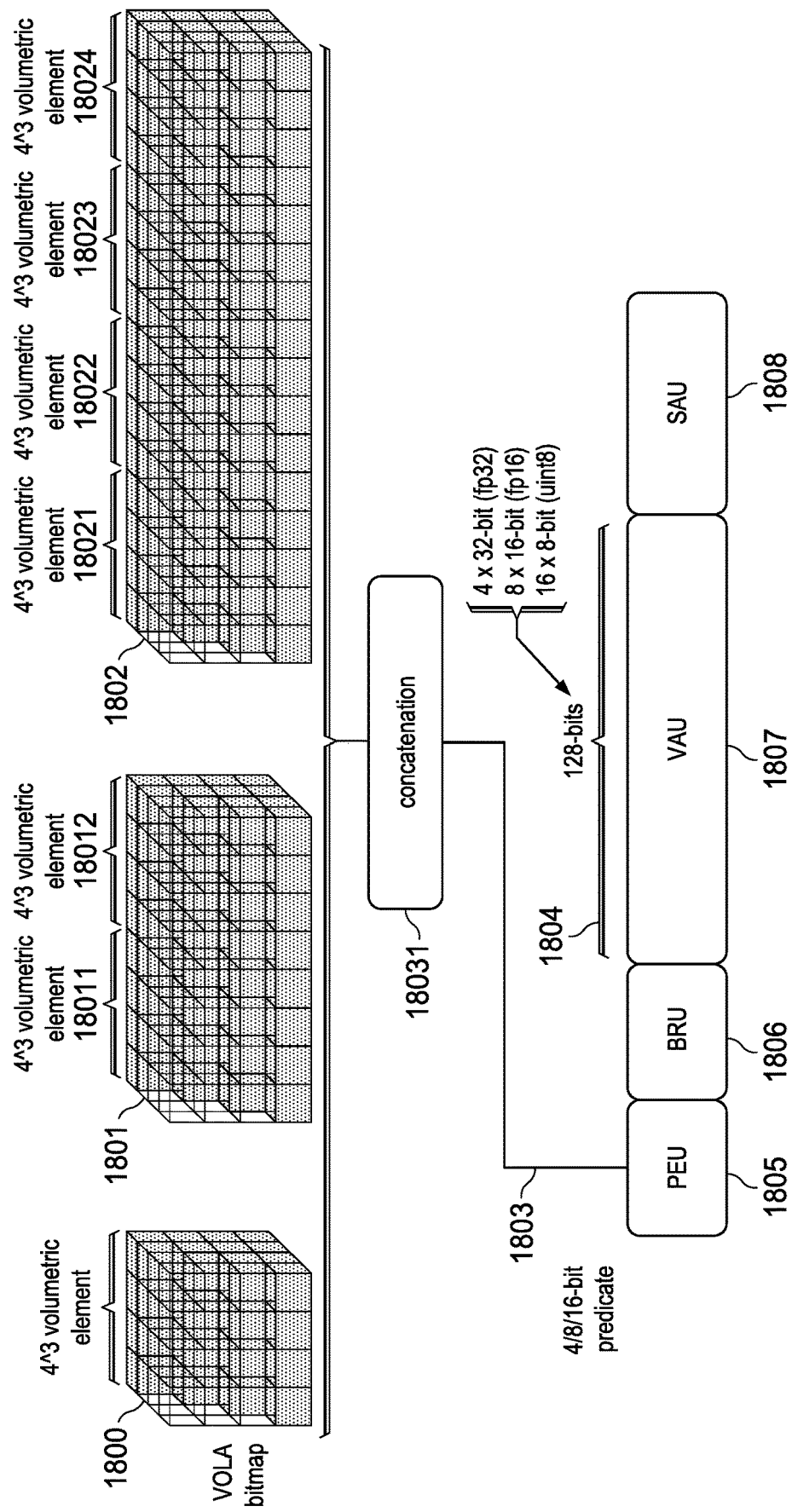
FIG. 18 shows ray-casting using vectorized processing in accordance with some embodiments.

Turning to FIG. 18, a diagram is shown illustrating ray-casting using vectorized processing according to some embodiments with predicated execution where the processor has at least four functional units; a predicated execution (PEU) 1805, which can perform per-lane predicated operations on a vector arithmetic unit (VAU) 1807 at one of three possible arithmetic precisions (fp32, fp16 or uint8) and a scalar arithmetic unit (SAU) 1808, all of which are under the control of a branch and repeat unit (BRU) which steps through the number of voxels (depth) in the volume, one vector at a time. In some implementations, in terms of vector arithmetic, 16-bit floating-point operands may be sufficient for MP3 audio (with 32-bit floating point (fp32) being optional), thereby allowing the throughput to be doubled through the VAU 1807. In fact in principle a fractional representation with unsigned integer (e.g., u8) multiplication by reciprocal of dividend can also be utilized in many cases, allowing the VAU throughput to be almost quadrupled with respect to an fp32 mode, among other possible example implementations.

The input to the predication unit 1803 may be constructed by selecting a bit-vector from the volumetric data-structure read from memory, which, as previously described, may be constructed from 4^3 voxel sub-volumes each represented by 64-bit integers. In the case of fp32 arithmetic, 4-bit wide vectors may be selected row by row from the 4^3 volumetric information in 1800. In the case of 16-bit arithmetic two 4-bit vectors from two sub-volumes of 1801, namely 18011 and 18012, may be concatenated by a concatenation unit 18031 to make an 8-bit predication vector 1803. Finally, in the case of 8-bit arithmetic, a 16-bit predication vector 1802 may be constructed by the concatenation unit 18031 by concatenating four 4-bit vectors from sub-volumes of 1802, namely 18021, 18022, 18023 and 18024, and so on. Irrespective of the arithmetic representation, per-lane predication allows vectorization to be used across the voxel geometry with 4, 8 or 16 voxels to be evaluated in parallel across the vector in a single cycle.

In one example implementation, the predication of the VAU 1807 by the PEU 1805 operates on the volumetric data in 4, 8 or 16 voxels wide chunks on 1803 as follows:

Bitmap 0—FIR reverberation summed along ray for propagation of audio signal through air;

Bitmap 1—Stopping criterion and reflection coefficient multiplication;

Exit—loop & stop propagating when all ones encountered across vector maintained by ORing each of the bitmap 1 bits with the previous contents of a register and stopping the loop when the register contains all ones.

A further optimization in the ray-casting process may be implemented by decomposing the 2D interpolation required for ray-tracing at an angle across voxels from the point of origin. The 2D interpolation in X and Y dimensions across the voxel volume can be decomposed into separate common y-component common across a vector with a second x-component which depends on distance from center of voxel.

Voxel representations, such as discussed herein, may be utilized to enhance ray-casting operations, not just for audio, but for other applications as well. In some instances, ray-casting used in physics or light propagation may differs from ray-casting for audio in that there may be no attenuation of the signal through the medium of air, although for fluids the same ray-casting mechanism can be used for physics or light propagation as was previously outlined for air. Accordingly, the predication mechanism for light/physics ray-casting with air as a medium may be implemented, for instance, as follows:

Bitmap 0—do nothing as negligible attenuation through medium (in audio case FIR outputs updated);

Bitmap 1—multiply by light reflectivity (object rigidity) coefficient and copy color (force) to output buffer;

Exit—loop & stop propagating when all ones encountered across a vector maintained by ORing each of the bitmap 1 bits with the previous contents of a register and stopping the loop when the register contains all ones.

Figure 19:
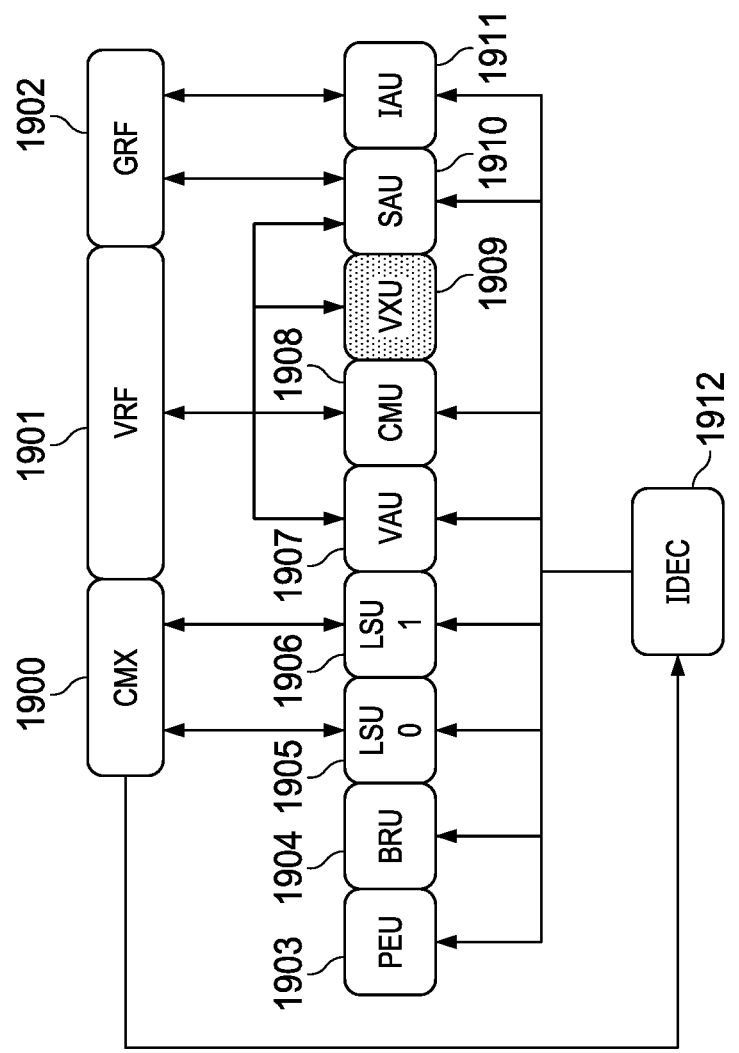
FIG. 19 depicts an example multi-slot vector processor in accordance with some embodiments.

FIG. 19 is a simplified block diagram representing an example multislot vector processor (e.g., a very long instruction word (VLIW) vector processor) in accordance with some embodiments. In this example the vector processor may include multiple (e.g., 9) functional units (e.g., 1903-1911), which may be fed by a multi-ported memory system 1900, backed up by a vector register file (VRF) 1901 and general register file (GRF) 1902. The processor contains an instruction decoder (IDEC) 1912, which decodes instructions and generates control signals which control the functional units 1903-1911. The functional units 1903-1911 are the predicated execution unit (PEU) 1903, branch and repeat unit (BRU) 1904, load store port units (e.g., LSU0 1905 and LSU1 1906), a vector arithmetic unit (VAU) 1907, scalar arithmetic unit (SAU) 1910, compare and move unit (CMU) 1908, integer arithmetic unit (IAU) 1911, and a volumetric acceleration unit (VXU) 1909. In this particular implementation, the VXU 1909 may accelerate operations on volumetric data, including both storage/retrieval operations, logical operations, and arithmetic operations. While the VXU circuitry 1909 is shown in the example of FIG. 19 as a unitary component, it should be appreciated that the functionality of the VXU (as well as an of the other functional units 1903-1911) may be distributed among multiple circuitry. Further, in some implementations, the functionality of the VXU 1909 may be distributed, in some implementations, within one or more of the other functional units (e.g., 1903-1908, 1910, 1911) of the processor, among other example implementations.

Figure 20:
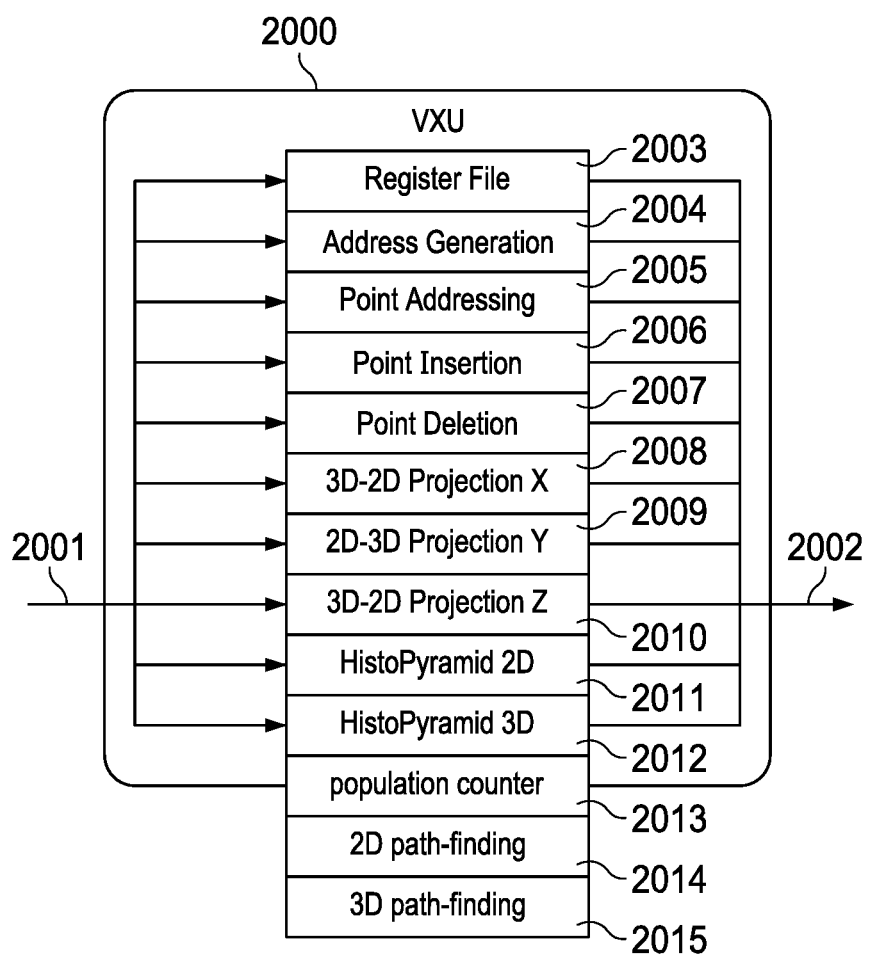
FIG. 20 illustrates an example volumetric acceleration hardware in accordance with some embodiments.

FIG. 20 is a simplified block diagram illustrating an example implementation of a VXU 2000 in accordance with some embodiments. For instance, VXU 2000 may provide at least one 64-bit input port 2001 to accept inputs from either the vector register file 1901 or general register file 1902. This input may be connected to a plurality of functional units including a register file 2003, address generator 2004, point addressing logic 2005, point insertion logic 2006, point deletion logic 2007, 3D to 2D projection logic in X dimension 2008, 3D to 2D projection logic in Y dimension 2009, 3D to 2D projection logic in X dimension 2010, 2D histogram pyramid generator 2011, 3D histopyramid generator 2012, population counter 2013, 2D path-finding logic 2014, 3D path-finding logic 2015 and possibly additional functional units to operate on 64-bit unsigned integer volumetric bitmaps. The output from the block 2002 can be written back to either the vector register file VRF 1901 or general register file GRF 1902 register files.

Figure 21:
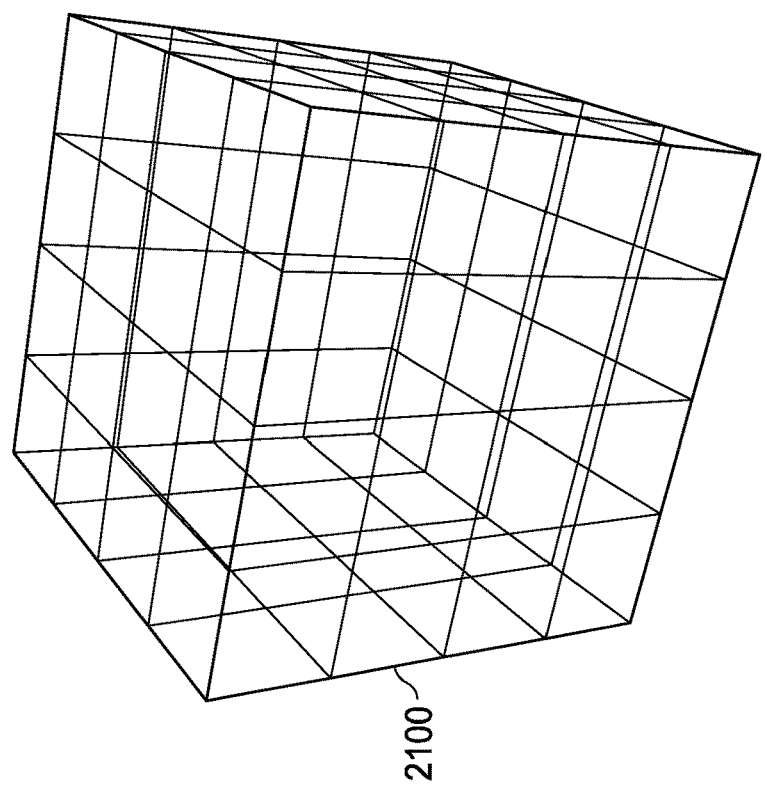
FIG. 21 illustrates the organization of a voxel cube in accordance with some embodiments.
Figure 21:
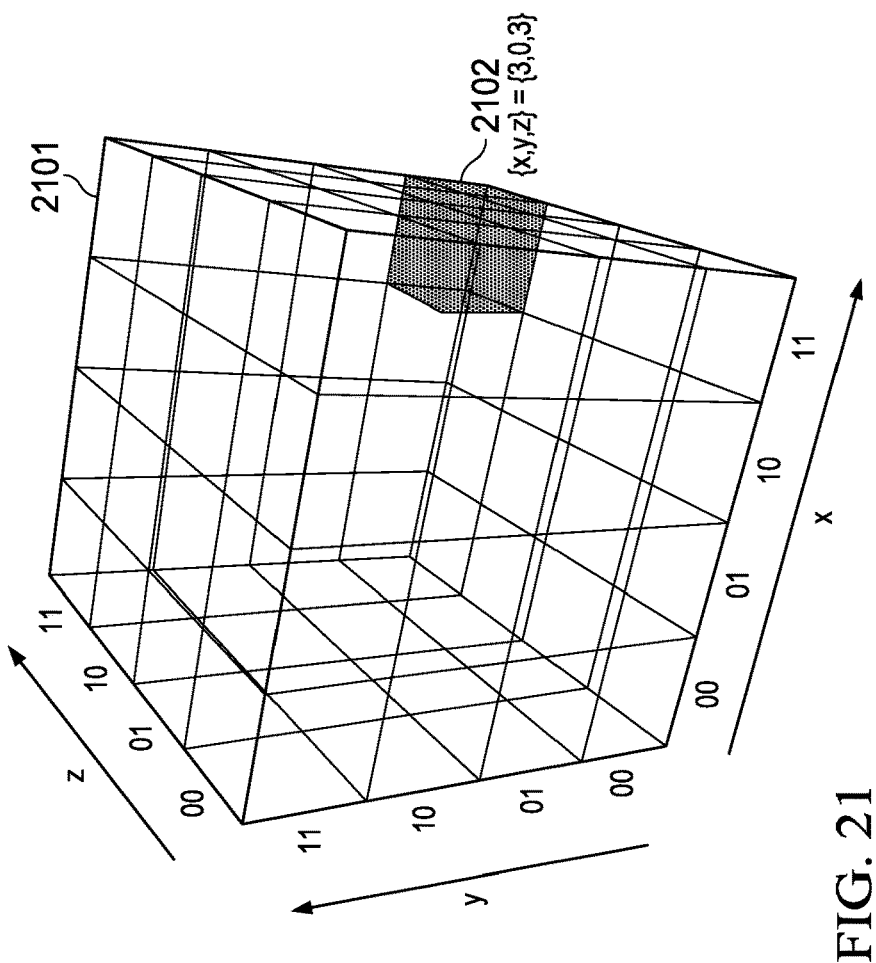
Figure 22:
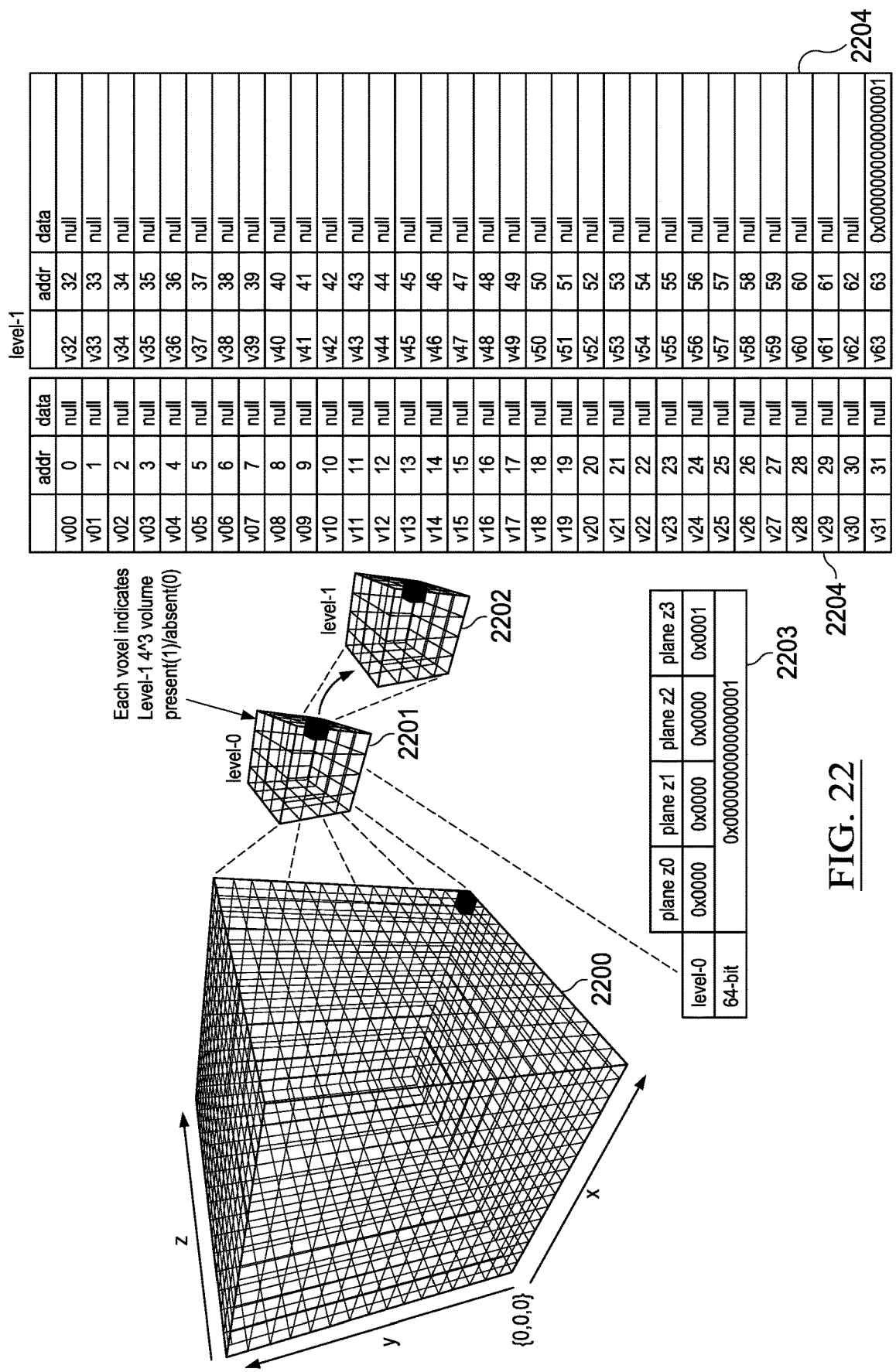
FIG. 22 illustrates a two-level sparse voxel tree in accordance with some embodiments.

Turning to the example of FIG. 21, a representation of the organization of a 4^3 voxel cube 2100 is represented. A second voxel cube 2101 is also represented. In this example, a voxel cube may be defined in data as a 64-bit integer 2102, in which each single voxel within the cube is represented by a single corresponding bit in the 64-bit integer. For instance, the voxel 2012 at address {x,y,z}={3,0,3} may be set to "1" to indicate the presence of geometry at that coordinate within the volumetric space represented by the voxel cube 2101. Further, in this example, all other voxels (beside voxel 2102) may corresponding to "empty" space, and may be set to "0" to indicate the absence of physical geometry at those coordinates, among other examples. Turning to FIG. 22, an example two-level sparse voxel tree 2200 is illustrated in accordance with some embodiments. In this example, only a single "occupied" voxel is included within a volume (e.g., in location {15,0,15}). The upper level-0 of the tree 2201 in this case contains a single voxel entry {3,0,3}. That voxel in turn points to the next level of the tree 2202 which contains a single voxel in element {3,0,3}. The entry in the datastructure corresponding to level 0 of the sparse voxel tree is a 64-bit integer 2203 with one voxel set as occupied. The set voxel means that an array of 64-bit integers is then allocated in level 1 of the tree corresponding to the voxel volume set in 2203. In the level 1 sub-array 2204 only one of the voxels is set as occupied with all other voxels set as unoccupied. As the tree, in this example, is a two level tree, level 1 represents the bottom of the tree, such that the hierarchy terminates here.

Figure 23:
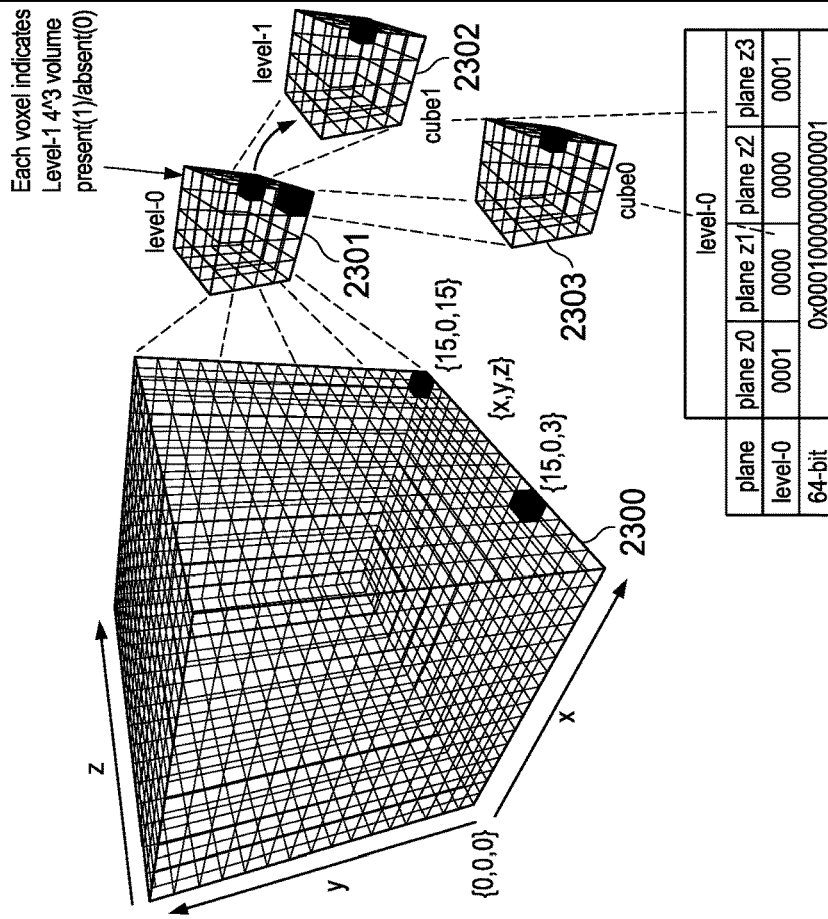
FIG. 23 illustrates a two-level sparse voxel tree in accordance with some embodiments.

FIG. 23 illustrates a two-level sparse voxel tree 2300 in accordance with some embodiments which contains occupied voxels in locations {15,0,3} and {15,0,15} of a particular volume. The upper level-0 of the tree 2301 in this case (which subdivides the particular volume into 64 upper level-0 voxels) contains two voxel entries {3,0,0} and {3,0,3} with corresponding data 2304 that shows two voxels are set (or occupied). The next level of the sparse voxel tree (SVT) is provided as an array of 64-bit integers that contains two sub-cubes 2302 and 2303, one for each voxel set in level 0. In the level 1 sub-array 2305, two voxels are set as occupied, v15 and v63, and all other voxels set as unoccupied and the tree. This format is flexible as 64-entries in the next level of the tree are always allocated in correspondence to each set voxel in the upper layer of the tree. This flexibility can allow dynamically changing scene geometry to be inserted into an existing volumetric data structure in a flexible manner (i.e., rather than in a fixed order, such as randomly), as long as the corresponding voxel in the upper layers have been set. If not, either a table of pointers would be maintained, leading to higher memory requirements, or else the tree would be required to be at least partially rebuilt in order to insert unforeseen geometry.

Figure 24:
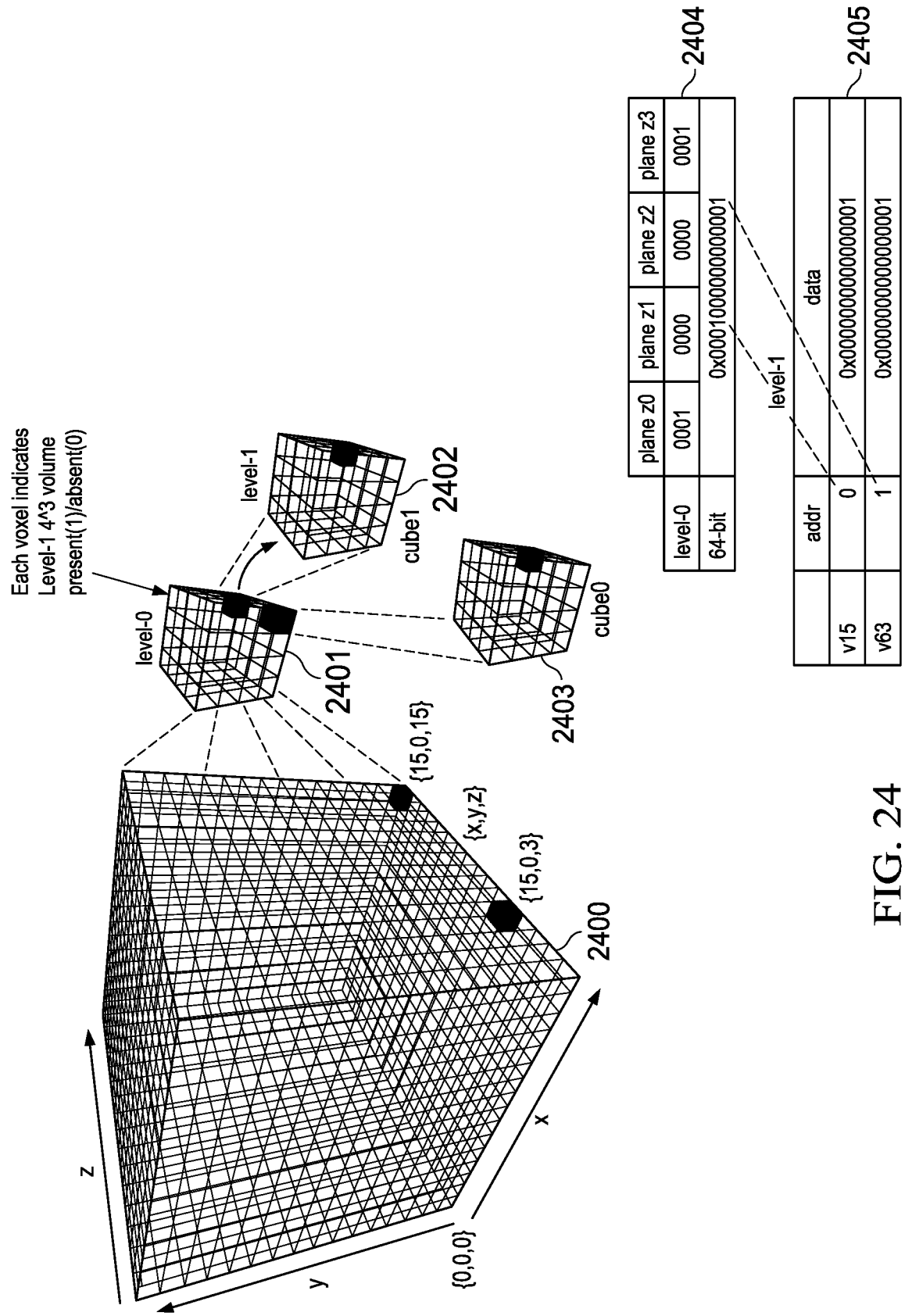
FIG. 24 illustrates storage of example voxel data in accordance with some embodiments.

FIG. 24 illustrates an alternate technique for storing the voxels from FIG. 23 in accordance with some embodiments. In this example, the overall volume 2400 contains two voxels stored at global coordinates {15,0,3} and {15,0,15} as in FIG. 23. In this approach, rather than allocating a 64-entry array to represent all of the sub-cubes in level 1 below level 0, only those elements in level 1, which actually contain geometry (e.g., as indicated by whether or not the corresponding level 0 voxels are occupier or not) are allocated as corresponding 64-bit level 1 records, such that the level 1, in this example, has only two 64-bit entries rather than sixty-four (i.e., for each of the 64 level-1 voxels, whether occupied or empty). Accordingly, in this example, the first level 0 2404 is equivalent to 2304 in FIG. 23 while the next level 2405 is 62 times smaller in terms of memory requirement than the corresponding 2305 in FIG. 23. In some implementations, if new geometry is to be inserted into level 0 for which space has not been allocated in level 1, the tree has to be copied and rearranged.

In the example of FIG. 24, the sub-volumes can be derived by counting the occupied voxels in the layer above the current layer. In this way, the system may determine where, in the voxel data, one higher layer ends and the next lower layer begins. For instance, if three layer-0 voxels are occupied, the system may expect that three corresponding layer-1 entries will following in the voxel data, and that the next entry (after these three) corresponds to the first entry in layer-2, and so on. Such optimal compaction can be very useful where certain parts of the scene do not vary over time or where remote transmission of volumetric data is required in the application, say from a space probe scanning the surface of Pluto where every bit is costly and time-consuming to transmit.

Figure 25:
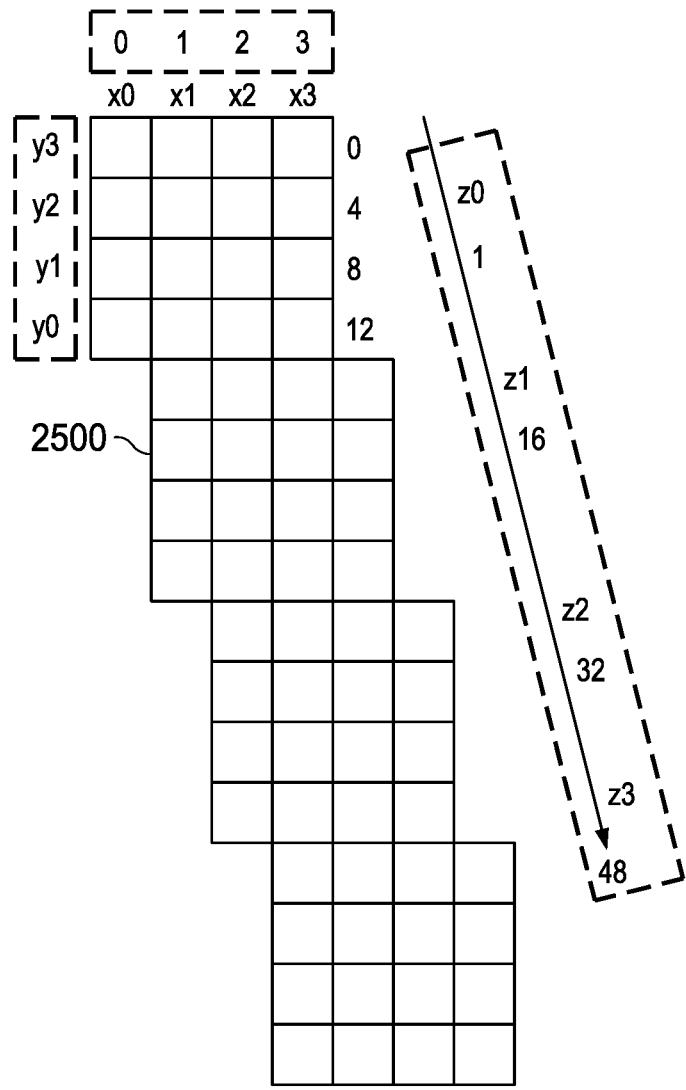
FIG. 25 illustrates insertion of a voxel into an example volumetric data structure in accordance with some embodiments.

FIG. 25 illustrates the manner in which a voxel may be inserted into a 4^3 cube represented as a 64 bit integer volumetric data structure entry, to reflect a change to geometry within the corresponding volume, in accordance with some embodiments. In one example, each voxel cube may be organized as four logical 16-bit planes within a 64-bit integer as shown in 2500. Each of the planes corresponds to Z values 0 through to 3, and within each plane each y-value codes for 4 logical 4-bit displacements 0 through 3, and finally within each 4-bit y-plane each bit codes for 4 possible values of x, 0 through 3, among other example organizations. Thus, in this example, to insert a voxel into a 4^3 volume, first a 1-bit may be shifted by the x-value 0 to 3, then that value may be shifted by 0/4/8/12 bits to encode the y-value, and finally the z-value may be represented by a shift of 0/16/32/48-bits as shown in the C-code expression in 2501. Finally, as each 64-bit integer may be a combination of up to 64 voxels, each of which is written separately, the new bitmap must be logically combined with the old 64-bit value read from the sparse voxel tree by ORing the old and new bitmap values as shown in 2502.

Figure 26:
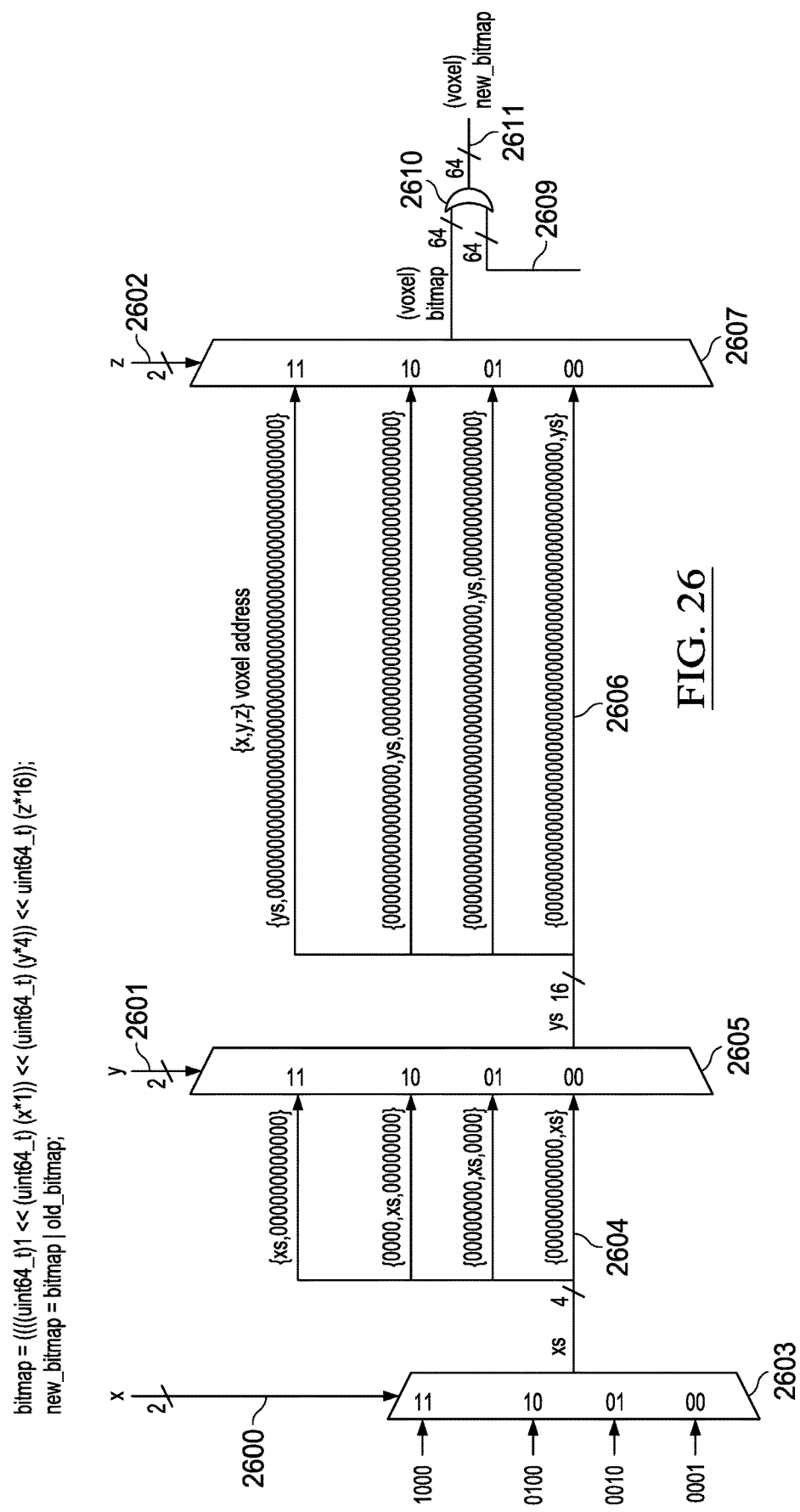
FIG. 26 illustrates logic to insert a voxel into an example volumetric data structure in accordance with some embodiments.

FIG. 26 illustrates logic to insert a voxel into a 4^3 cube represented by a 64-bit integer in accordance with some embodiments. The logic consists of 3 layers of multiplexers. The first multiplexer 2603 may encode the position of the voxel in x according to the 2-bit x input 2600 resulting in an effective shift in x by 0, 1, 2 or 3-bits onto the 4-bit output of the first mux 2604. The second mux 2605 shifts the 4-bit output of the first mux 2604 according to the y-input 2601 by 0, 4, 8 or 12 bits according to the y-input resulting in the 16-bit multiplexer output value 2606. The final multiplexer 2607 shifts the output of the second multiplexer 2606 by 0, 16, 32 or 48-bits according to the z-input 2602 thus encoding the position of the voxel in x, y and z on the 64-bit output of the third multiplexer 2608. The output of the third mux 2608 can be logically ORed by 2610 with the previous value of the bitmap for the 4^3 volume represented by a 64-bit integer 2609 and the 1-bit update to the voxel bitmap 2608 will thus appear at the correct position in the updated 64-bit bitmap for the volume 2611 ready to be written back to the register file, among other example implementations.

Figure 27:
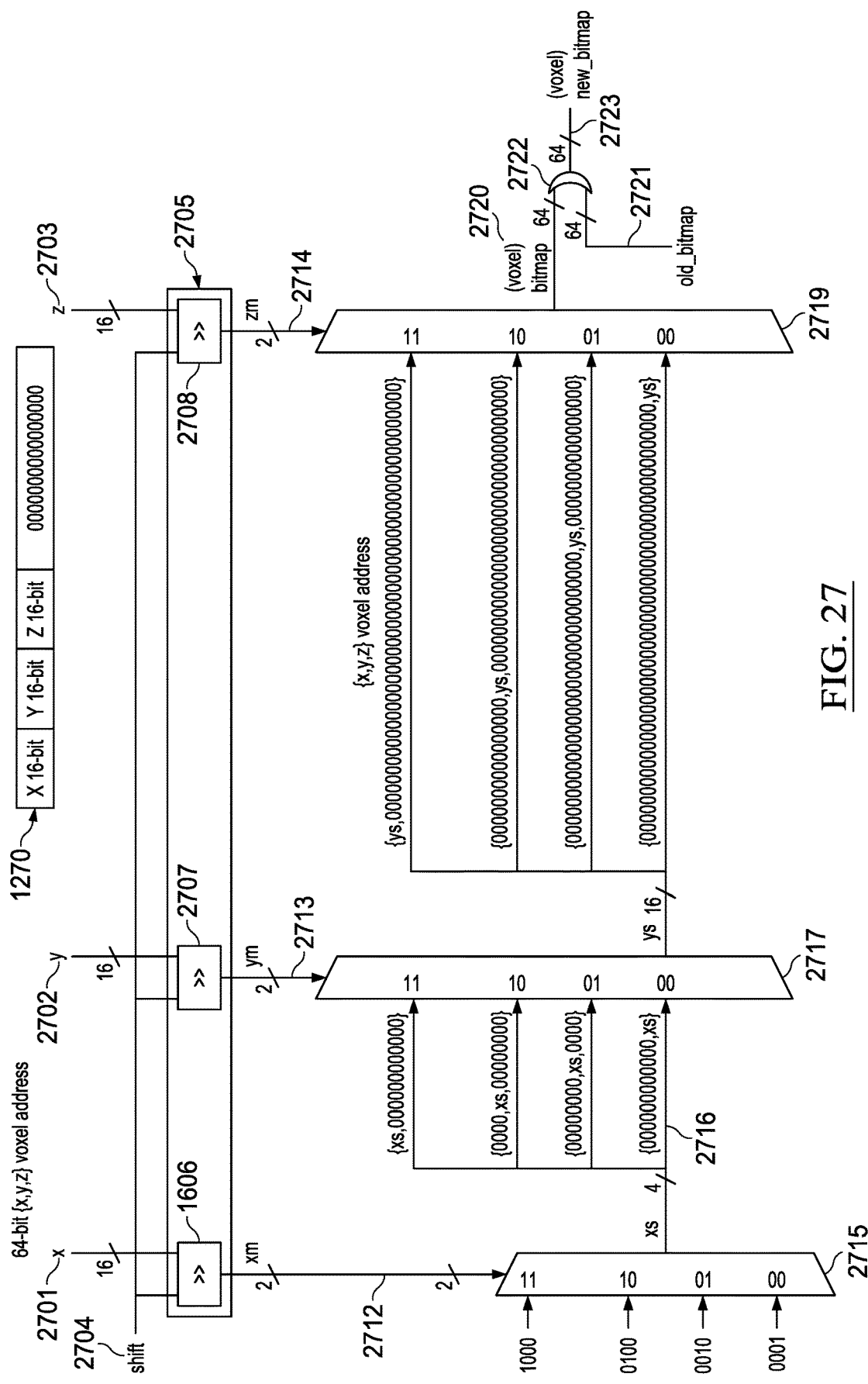
FIG. 27 illustrates logic to generate an address triplet to control the multiplexers in accordance with some embodiments.

FIG. 27 illustrates logic to generate a 6-bit address triplet to control the multiplexers in accordance with some embodiments, which perform voxel insertion, deletion and retrieval (presence detection). In this example the 16-bit x, y and z addresses of the voxel to be inserted, retrieved, tested for, etc. in a sparse voxel tree are presented to the address formatting logic 2705 as a packed 64-bit input value 2700 which consists of three 16-bit addresses for each of x, y and z followed by an unused field of 16 zeroes to pad out to 64-bits. The address formatting logic 1605 consists of 3 identical selection blocks 2706, 2707 and 2708 which select 2-bits from the 16-bit X, Y and Z addresses according to the shift input 2704. The three two-bit addresses xm (2712), ym (2713) and zm (2714) addresses are then applied to the x y and z multiplexer levels 2715, 2717 and 2719 as described in FIG. 27 and the accompanying description in the previous paragraph.

Figure 28:
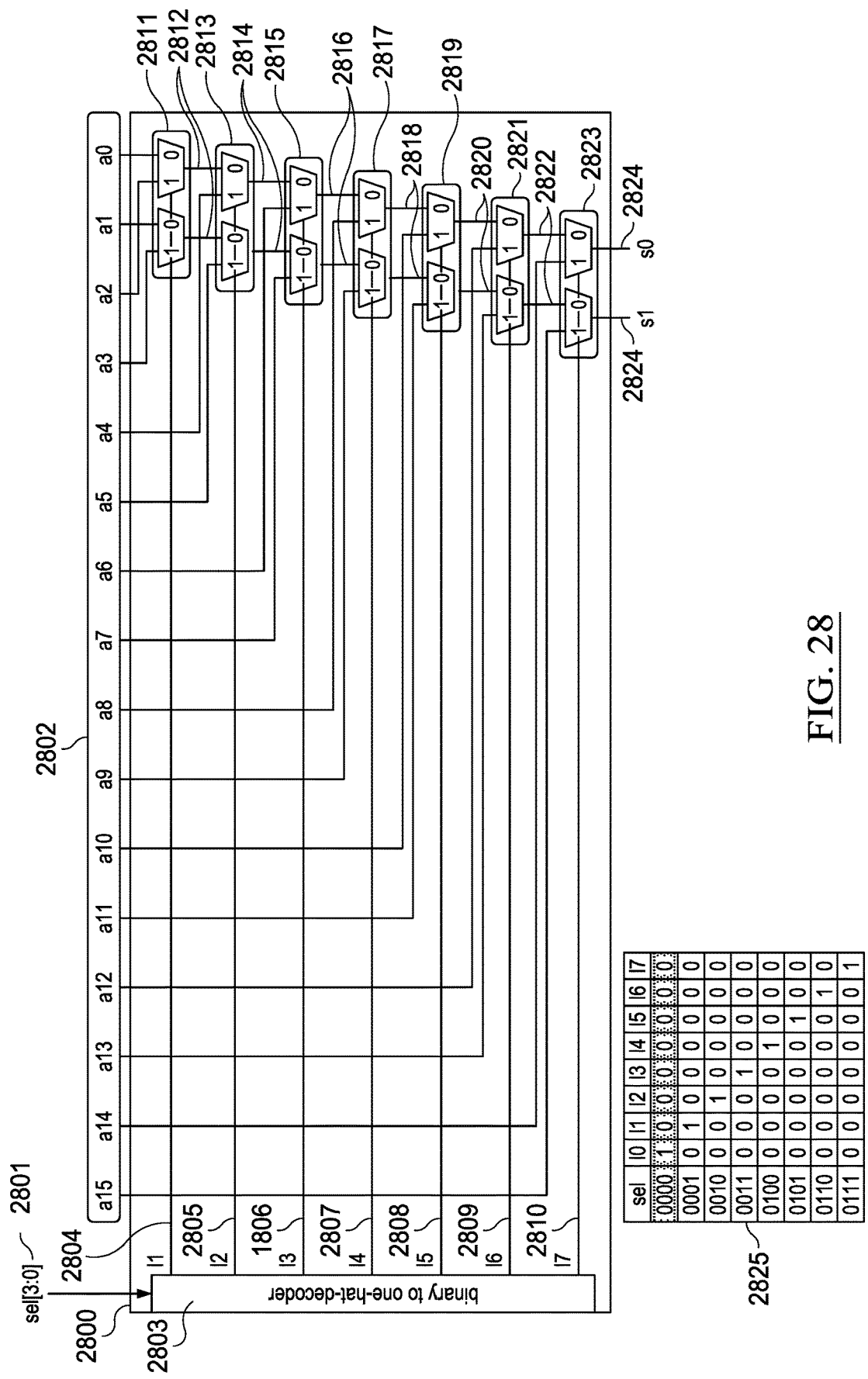
FIG. 28 illustrates address selection logic in accordance with some embodiments.

FIG. 28 illustrates address selection logic in accordance with some embodiments to generate a 2-bit address output address 2824 for the SVT level specified by the sel[3:0] input 2801 from a 16-bit input address 2802. The decoding of the 4-bit sel[3:0] input 2801 may be performed in a binary-to-one-hot-decoder 2803 according to a truth table 2825. In a one hot decoder only one of the output lines l0-l6 (2804-2810) can be high at any one time and all other outputs are zero. If the level from the one-hot-decoder 2803 is high the input address pair to the current multiplexer level is selected, otherwise the output from the previous multiplexer level is selected. In the multiplexer tree the first level is controlled by decoder output l6 2806 which if high controls the multiplexer pair 2811 to select address bit pair a1:a0 if high and a3:a2 if low, with the selected pair of multiplexer inputs appearing on the output pair 2812 which is connected in turn to the l5 mux pair 2813. The second level of multiplexers 2813 is controlled by select line l5 (2805) which selects the output of the previous mux pair 2812 if high, or else if 2805 is low the a5:a4 address pair is selected. The decoding continues in a similar manner until the final multiplexer stage 2823 which produces the 2-bit output address pairs [1:0] 2824.

Figure 29:
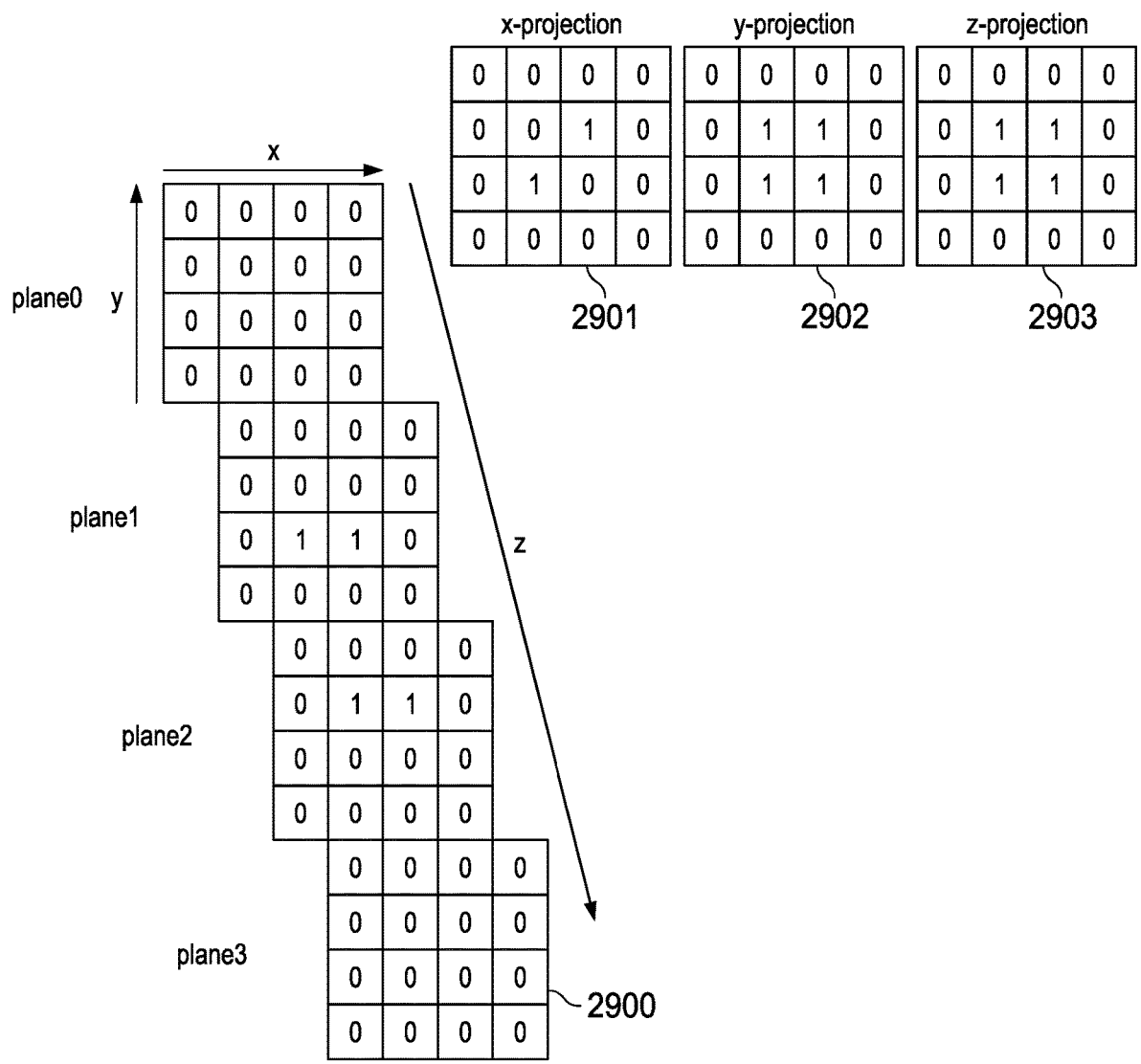
FIG. 29 illustrates projection of an example 3D volumetric object, in accordance with some embodiments.
Figure 30A:
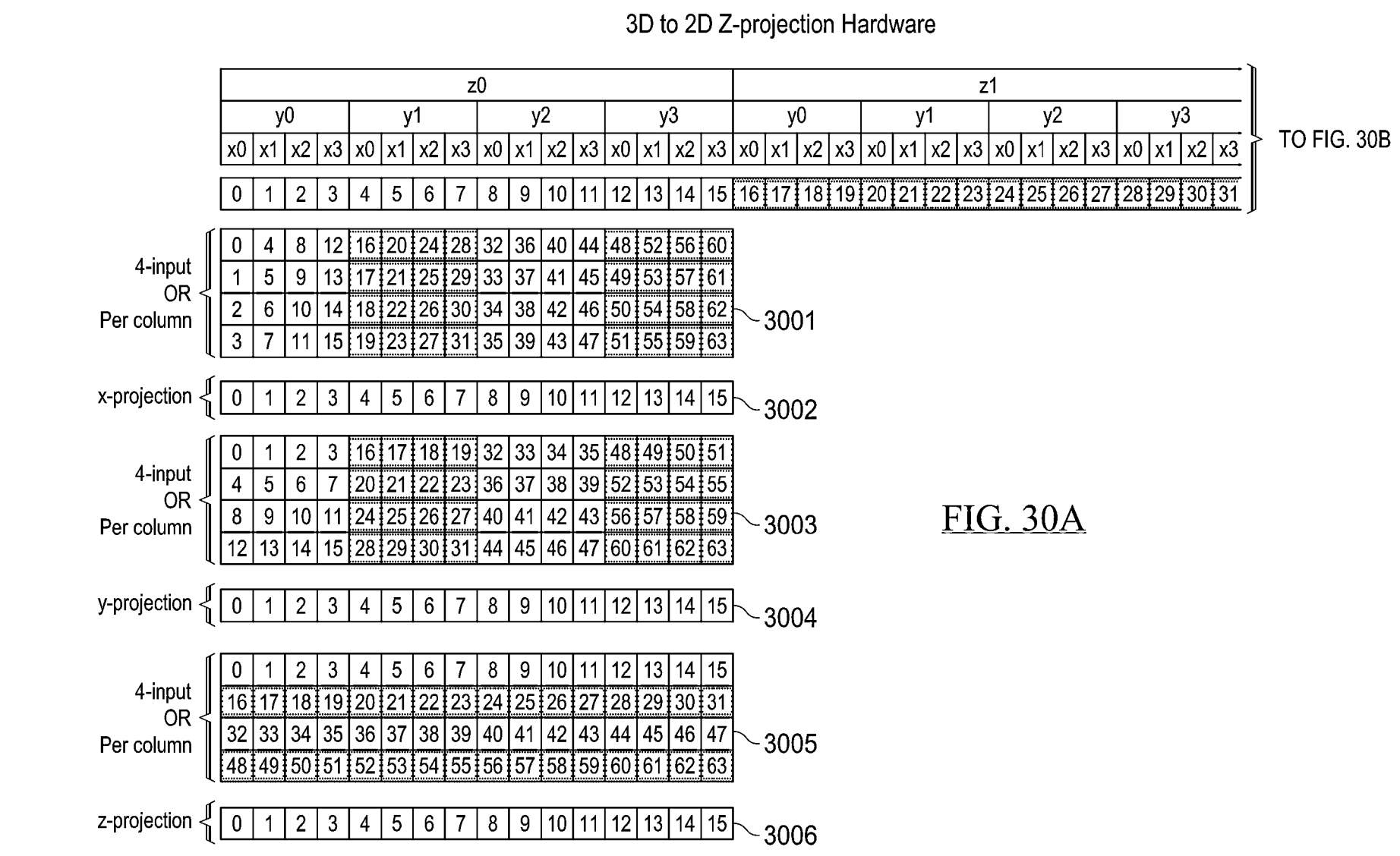
Figure 30B:
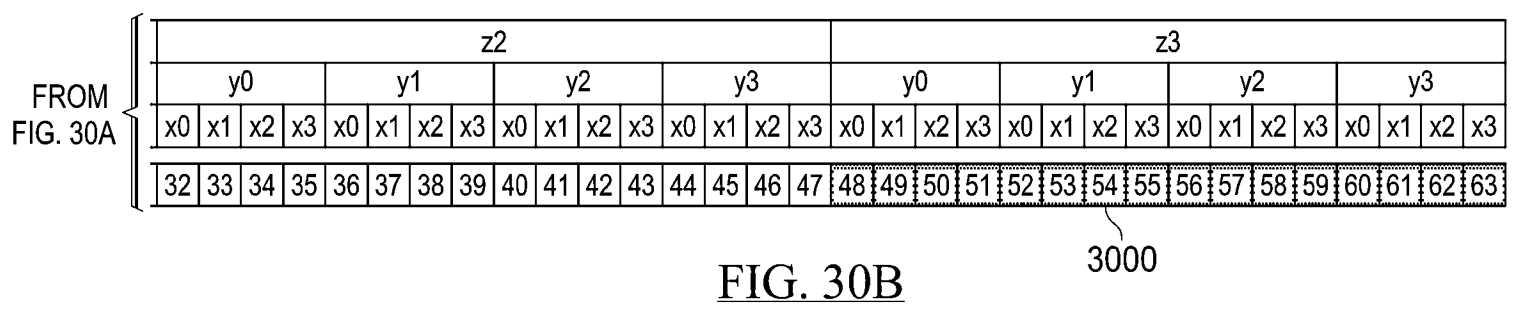

Turning to FIG. 29, a representation is shown to illustrate, in accordance with some embodiments, how a 3D volumetric object stored in a 64-bit integer 2900 can be projected by logical ORing in the X direction to produce the 2D pattern 2901, in the Y-direction to produce the 2D output 2902 and finally in the Z-direction to produce the pattern shown in 2903. FIG. 30 illustrates, in accordance with some embodiments, how bits from the input 64-bit integer are logically ORed to produce the output projections in X, Y and Z. In this example, table 3001 shows column-wise which element indices from the input vector 3000 are ORed to produce the x-projection output vector 3002. Table 3003 shows column-wise which element indices from the input vector 3000 are ORed to produce the y-projection output vector 3004. Finally 3005 shows column-wise which element indices from the input vector 3000 are ORed to produce the z-projection output vector 3006.

The X-projection logically ORs bits 0,1,2,3 from the input data 3000 to produce bit 0 of the X-projection 3001. For instance, bit 1 in 3001 may be produced by ORing bits 4, 5, 6, and 7 from 3000, and so on. Similarly, bit 0 in the Y-projection 3004 may be produced by ORing together bits 0, 4, 8, and 12 of 3000. And bit 1 of 3004 is produced by ORing together bits 1, 5, 9, and 13 of 3000 etc. Finally bit 0 in the Z-projection 3006 is produced by ORing together bits 0, 16, 32, and 48 of 3000. And bit 1 of 3006 may be produced by ORing together bits 1, 17, 33, and 49 of 3000, and so on.

Figure 31A:
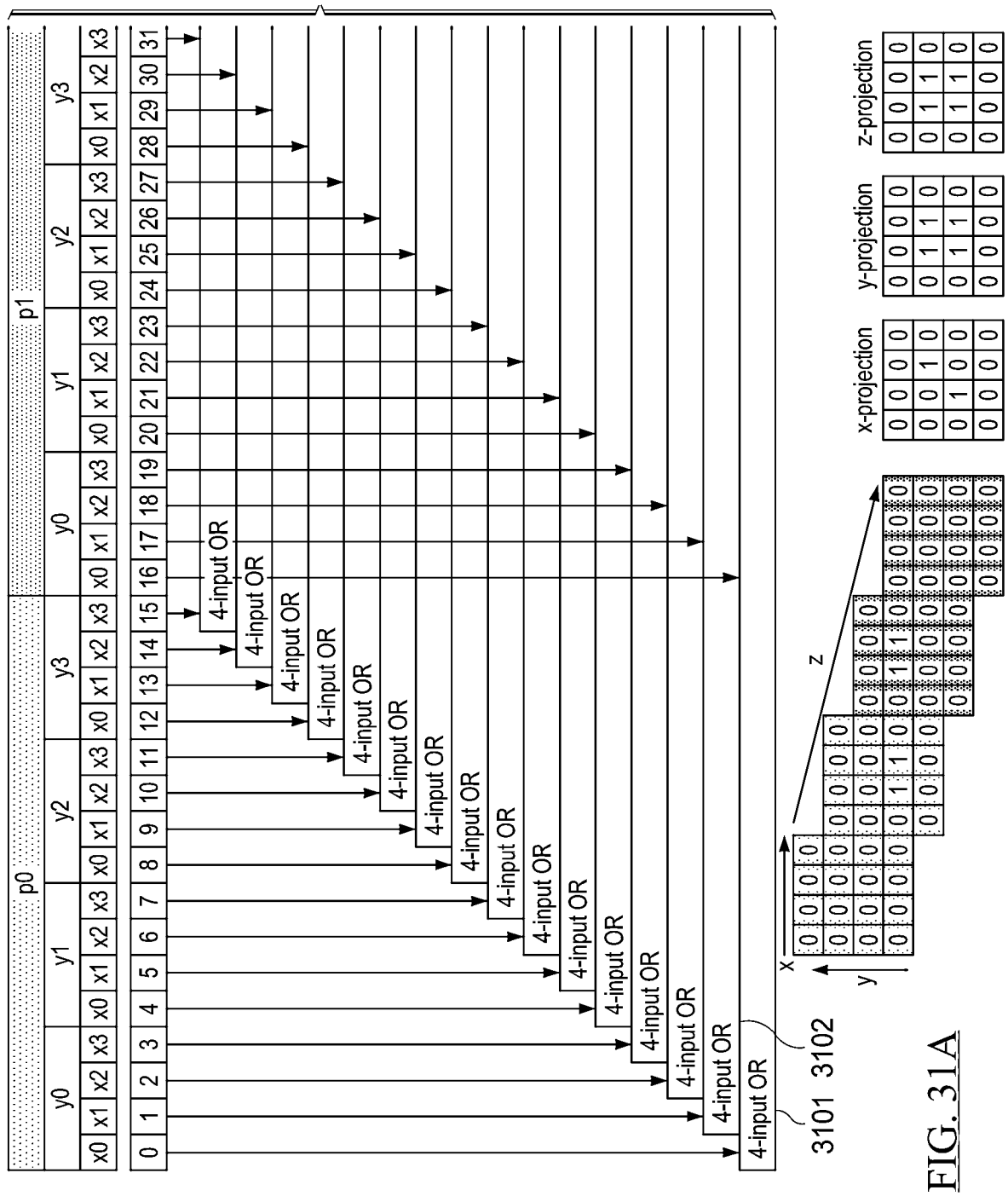
FIG. 31 shows the hardware organization of an example 3D to 2D projection in accordance with some embodiments.
Figure 31B:
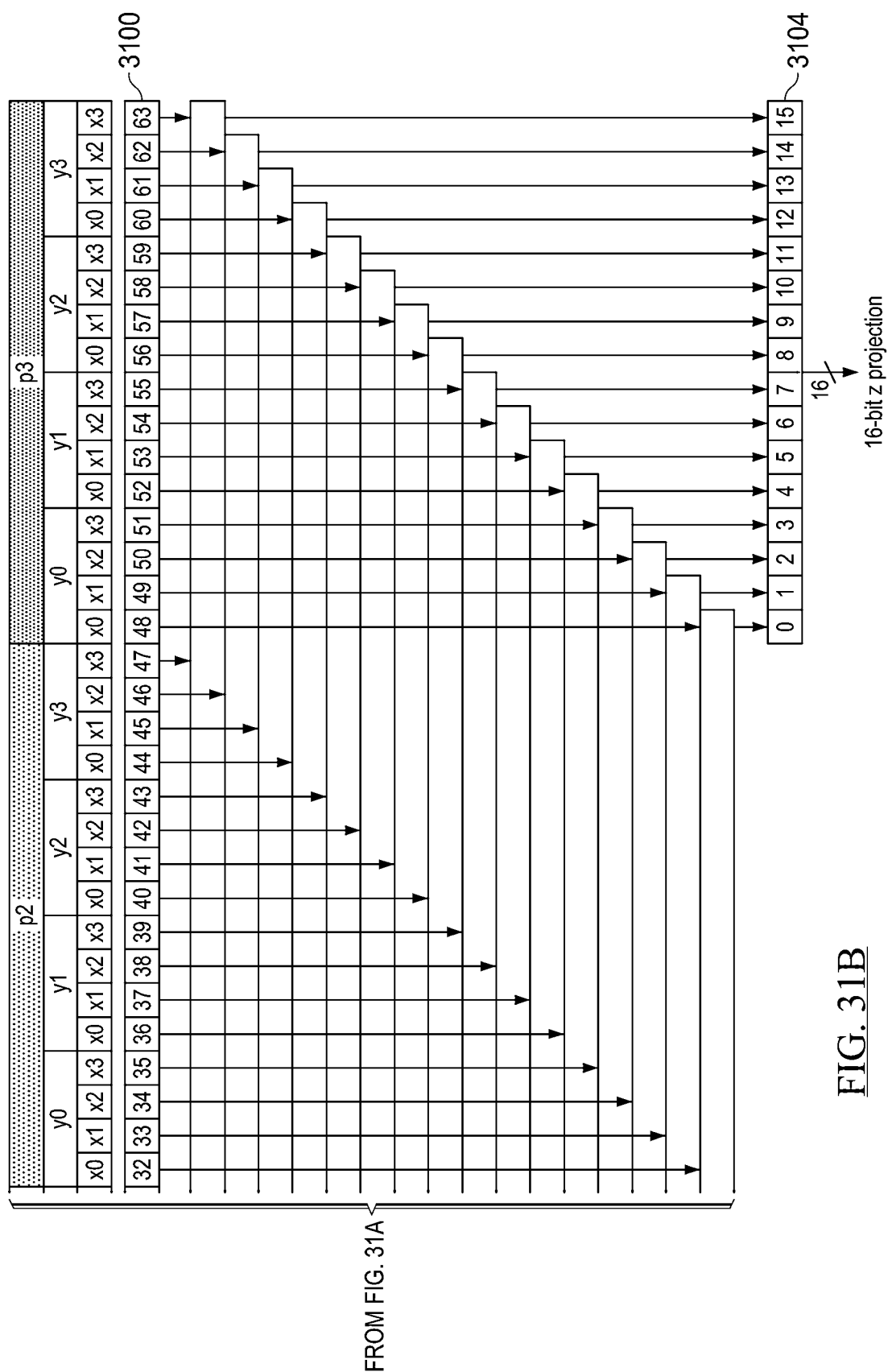

FIG. 31 shows the hardware organization of a 3D to 2D projection in the Z direction in accordance with some embodiments. In this particular example, the hardware may include an input 64-bit register 3100 whose outputs are connected to an array of sixteen 4-input OR gates 3101, 3102 etc., with the output of 3101 connecting to bit 0 in the output Z-projection 3104, the output of 3102 connecting to bit 1 in 3104, and so on. By combining projections across multiple voxel-cubes in X, Y or Z using the projection hardware projections in X, Y or Z, can be generated for complete volumes. Additionally it would be simple to add masking logic to allow 1-4 levels from a 4^3 cube to be masked out from the logical OR if so desired so there is a single voxel granularity in X/Y/Z projections, among other examples.

Figure 32:
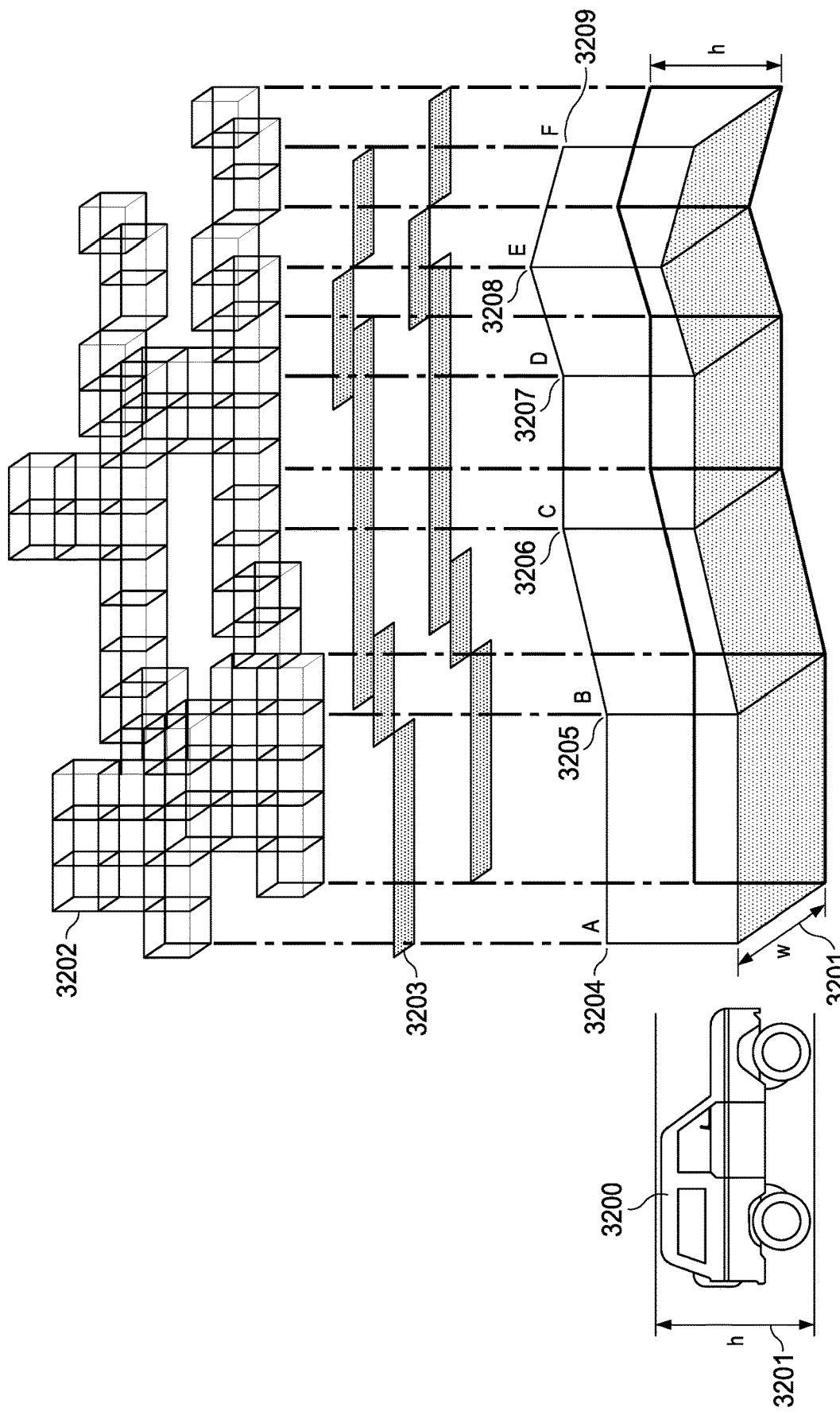
FIG. 32 shows using projections to generate simplified maps in accordance with some embodiments.

FIG. 32 shows an example of how projections can be used to generate simplified maps in accordance with some embodiments. In this scenario, the goal may be to produce a compact 2D map of paths down which a vehicle 3200 of height h 3201 and width w 3201 from a voxel volume 3202. Here the Y-projection logic can be used to generate an initial crude 2D map 3203 from the voxel volume 3202. In some implementations the map may be processed to check whether a particular vehicle (e.g., a car (or autonomous car), drone, etc.) of particular dimensions can pass through the width 3201 and height constraints 3201 of the path. This may be performed in order to ensure the paths are passable by performing projections in Z to check the width constraint 3201 and the projections in Y can be masked to limit calculations to the height of the vehicle 3201. With additional post processing (e.g., in software) it can be seen that for paths which are passable and satisfy the width and height constraints only the X and Z, coordinates of the points A 3204, B 3205, C 3206, D 3207, E 3208 and F 3209 along the path may only be stored or transmitted over a network in order to fully reconstruct the legal paths along which the vehicle can travel. Given that the path can be resolved into such piecewise segments it's possible to fully describe the path with only a byte or two per piecewise linear section of the path. This may assist in the fast transmission and processing of such path data (e.g., by an autonomous vehicle), among other examples.

Figure 33:
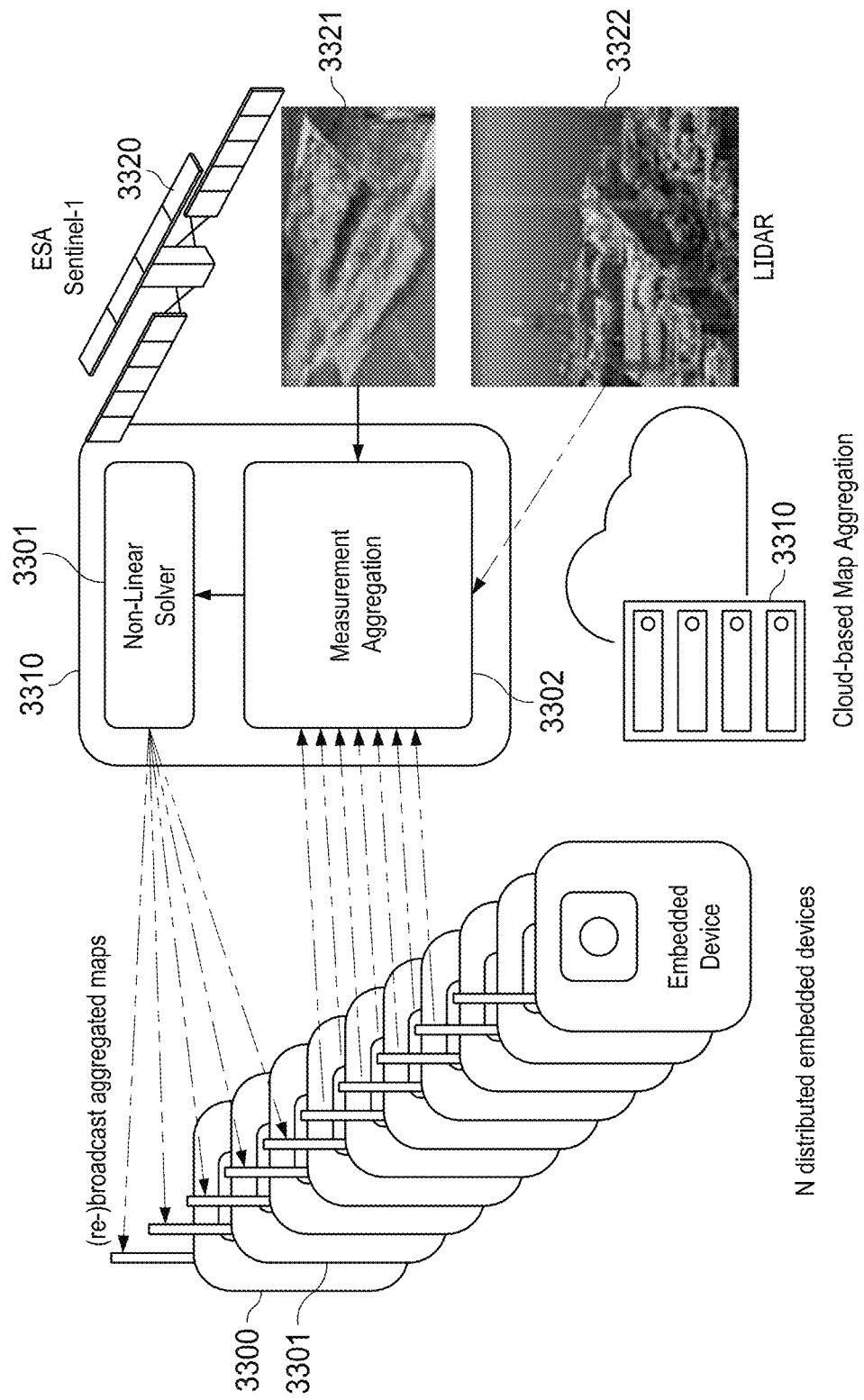
FIG. 33 illustrates example aggregation of example volumetric 3D and/or simple 2D measurements from embedded devices in accordance with some embodiments.

FIG. 33 illustrates how either volumetric 3D or simple 2D measurements from embedded devices can be aggregated in accordance with some embodiments by mathematical means in order to generate high-quality crowd-sourced maps as an alternative to using LIDAR or other expensive means to make precision measurements. In the proposed system a plurality of embedded devices 3300, 3301, etc. may be equipped with various sensors capable of taking measurements, which may be transmitted to a central server 3310. Software running on the server performs aggregation of all of the measurements 3302 and performs a numerical solve by non-linear solver 3303 of the resulting matrix to produce a highly accurate map, which can then be redistributed back to the embedded devices. Indeed the data aggregation can also include high accuracy survey data from satellites 3320, aerial LIDAR surveys 3321 and terrestrial LIDAR measurements 3322 to increase the accuracy of the resulting maps where these high fidelity datasets are available. In some implementations, the map and/or the recorded measurements may be generated in, converted to, or otherwise expressed using sparse voxel data structures with formats such as described herein, among other example implementations.

Figure 34A:
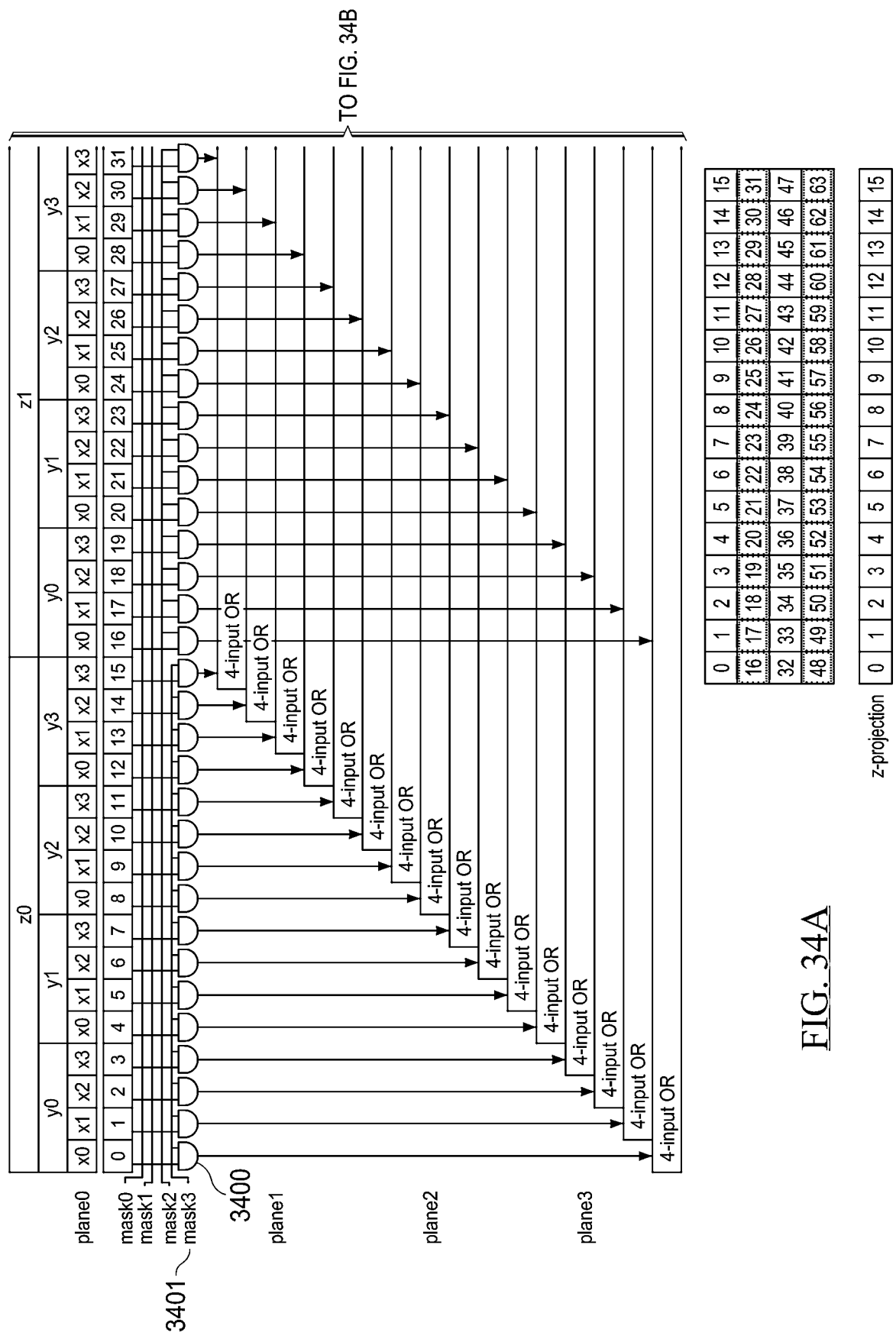
FIG. 34 illustrates example projections in X, Y or Z in some embodiments.
Figure 34B:
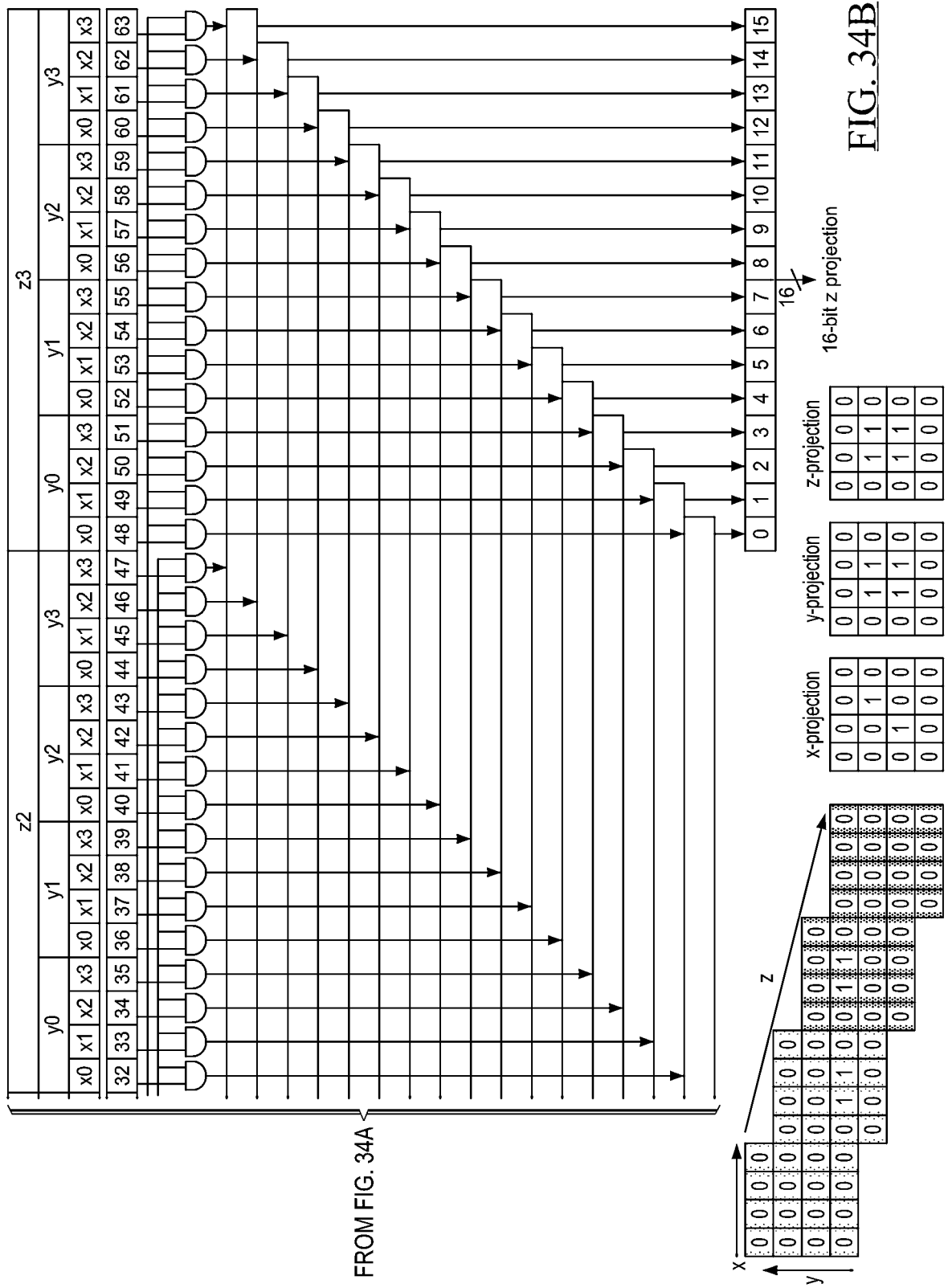

The projection logic in FIG. 31 can be duplicated to produce simultaneous projections in X, Y and Z or alternately when simultaneous projections are not required the diagram in FIG. 34 shows how the logic in FIG. 31 can be extended to produce projections in X, Y or Z in some embodiments under the control of an input multiplexer stage to select the appropriate quads of 4 input bits to route to each of the 16 OR gates in FIG. 31. Additionally a bank of 64 AND gates can be used to mask out bit planes in the event the application requires voxel-level accuracy for X, Y and Z projections. This masking logic can be duplicated in the logic of FIG. 31 for the same fidelity reasons. 3401 is mask, such as mask 0, 1, 2, or 3, and 3400 is an AND gate.

Figure 35A:
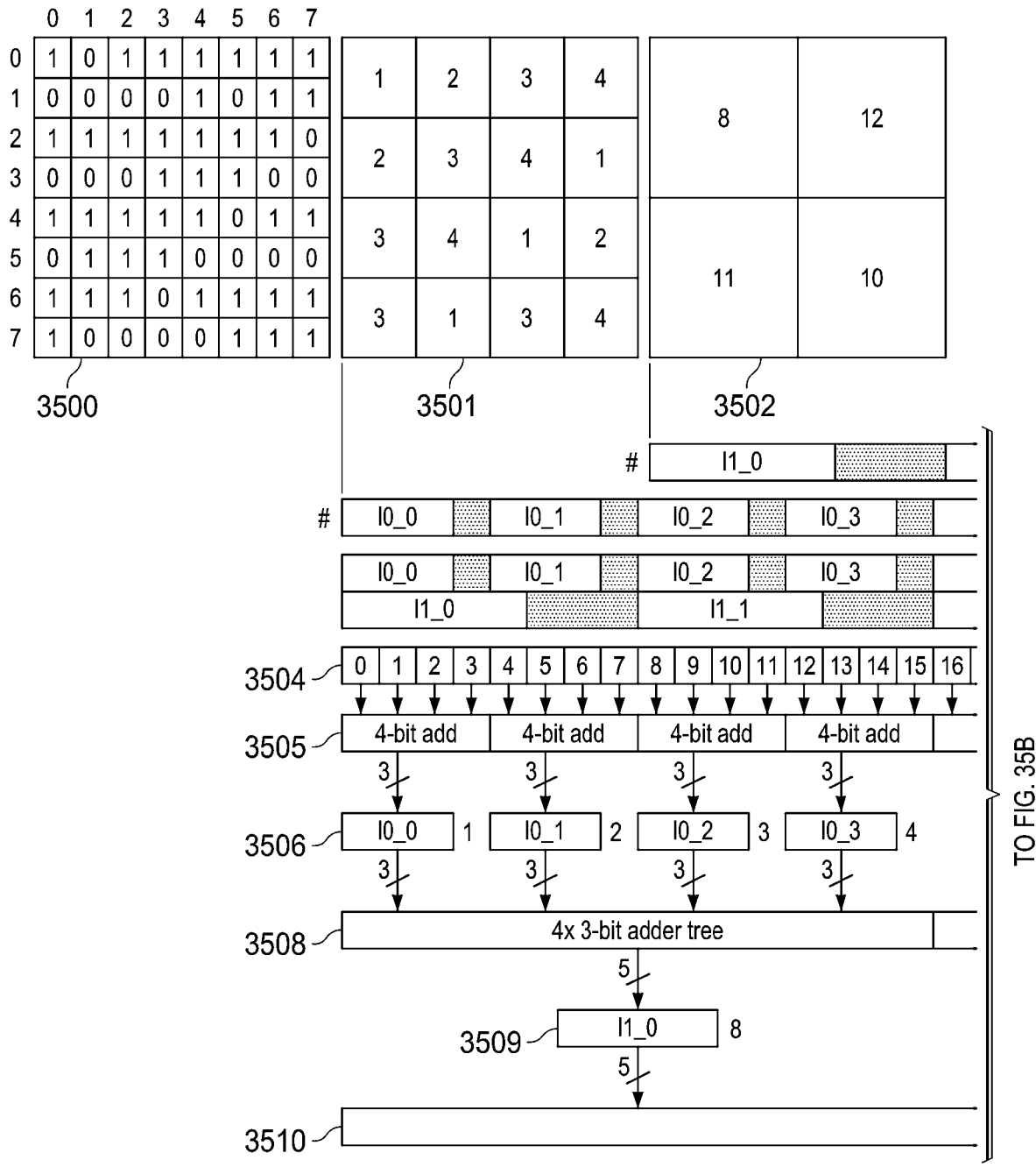
FIG. 35 shows the example acceleration of the generation of histogram pyramids from 2D bitmaps in accordance with some embodiments.
Figure 35B:
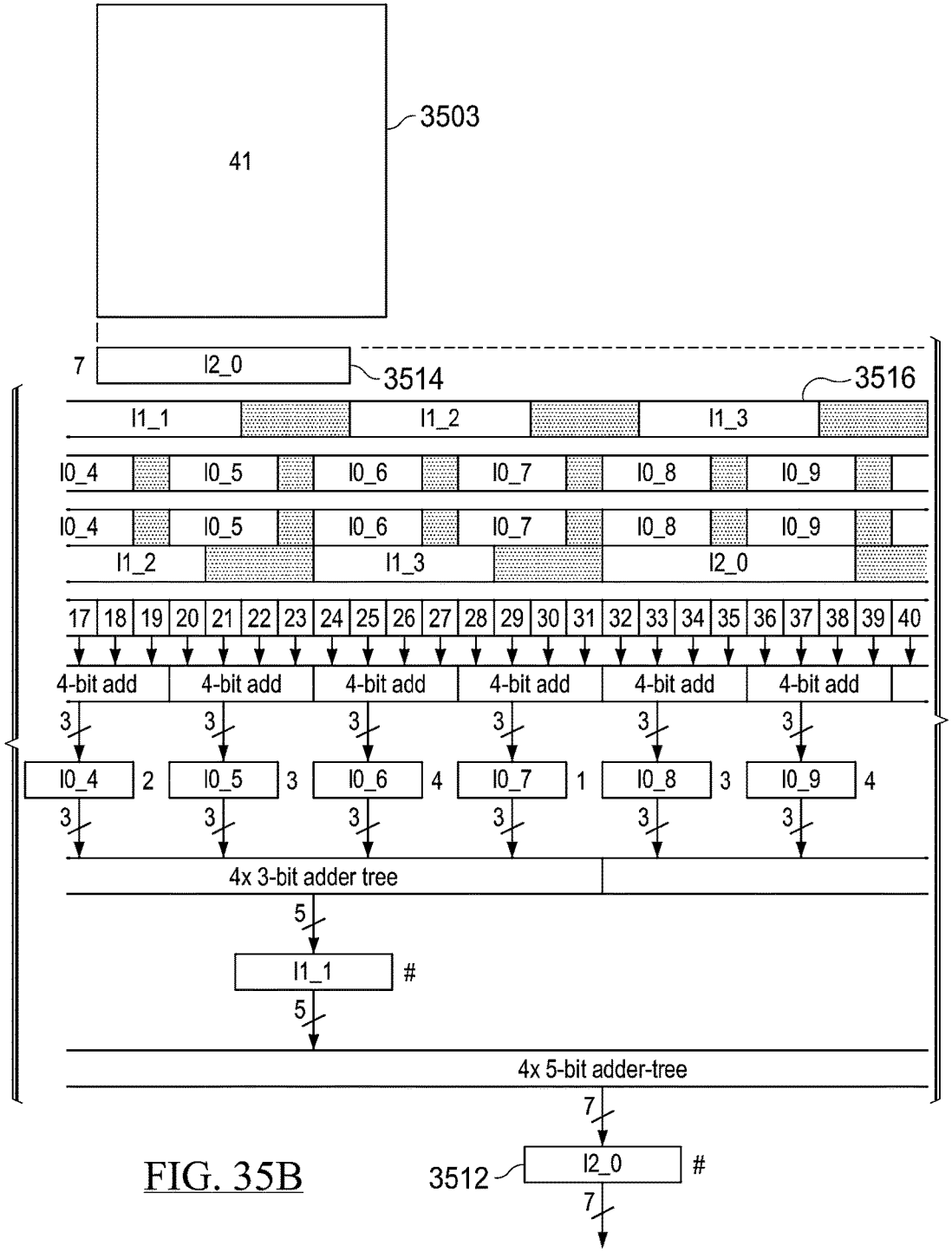
Figure 35C:
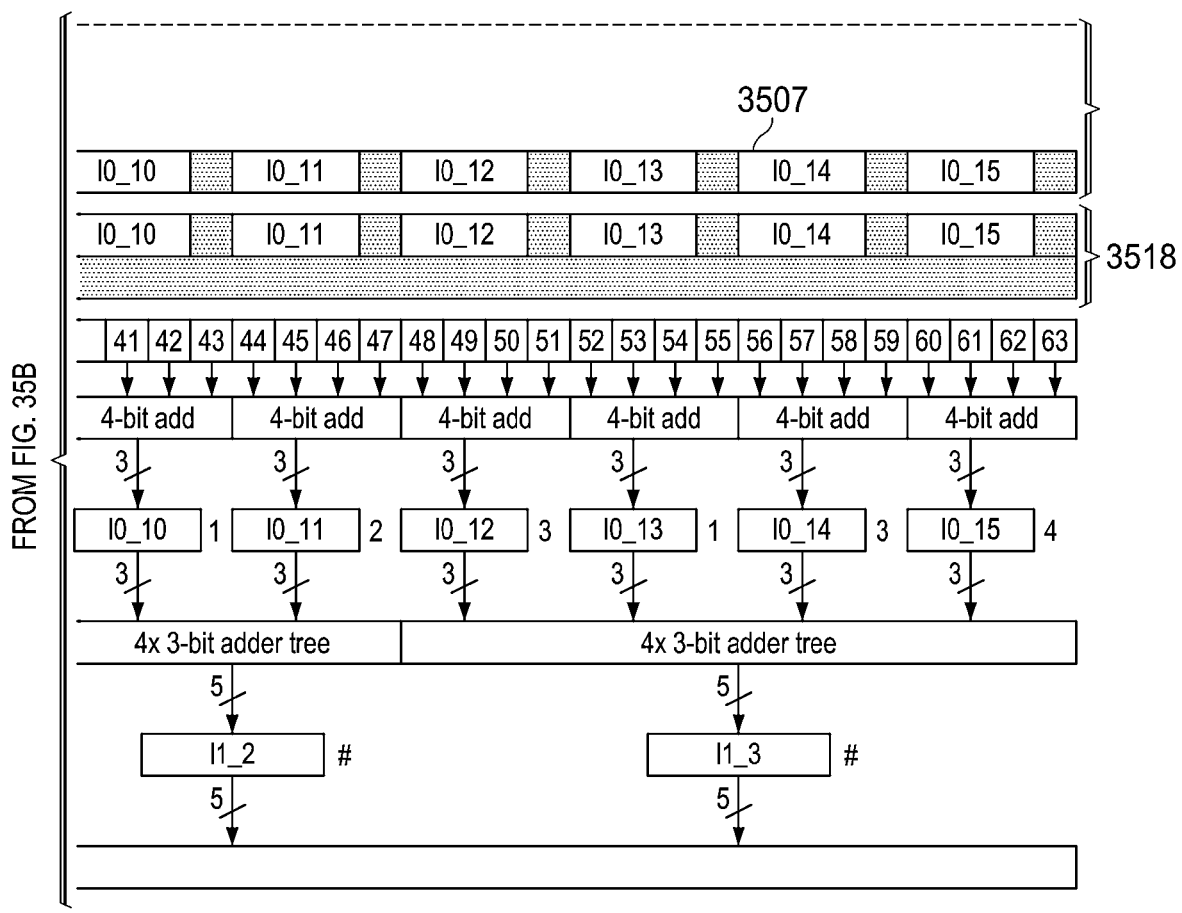
Figure 36A:
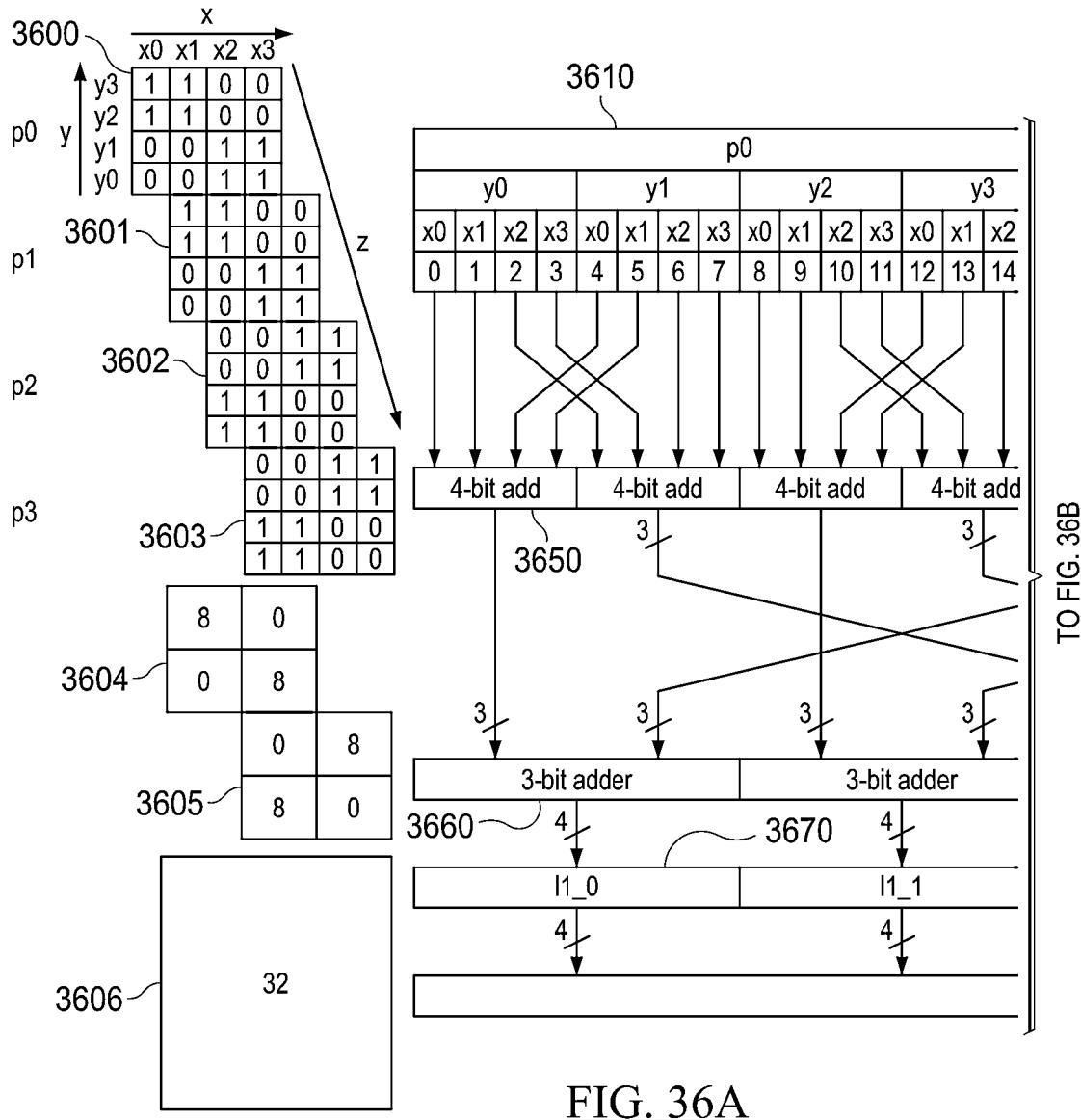
FIG. 36 shows the example acceleration of the generation of histogram pyramids from 3D bitmaps in accordance with some embodiments.
Figure 36B:
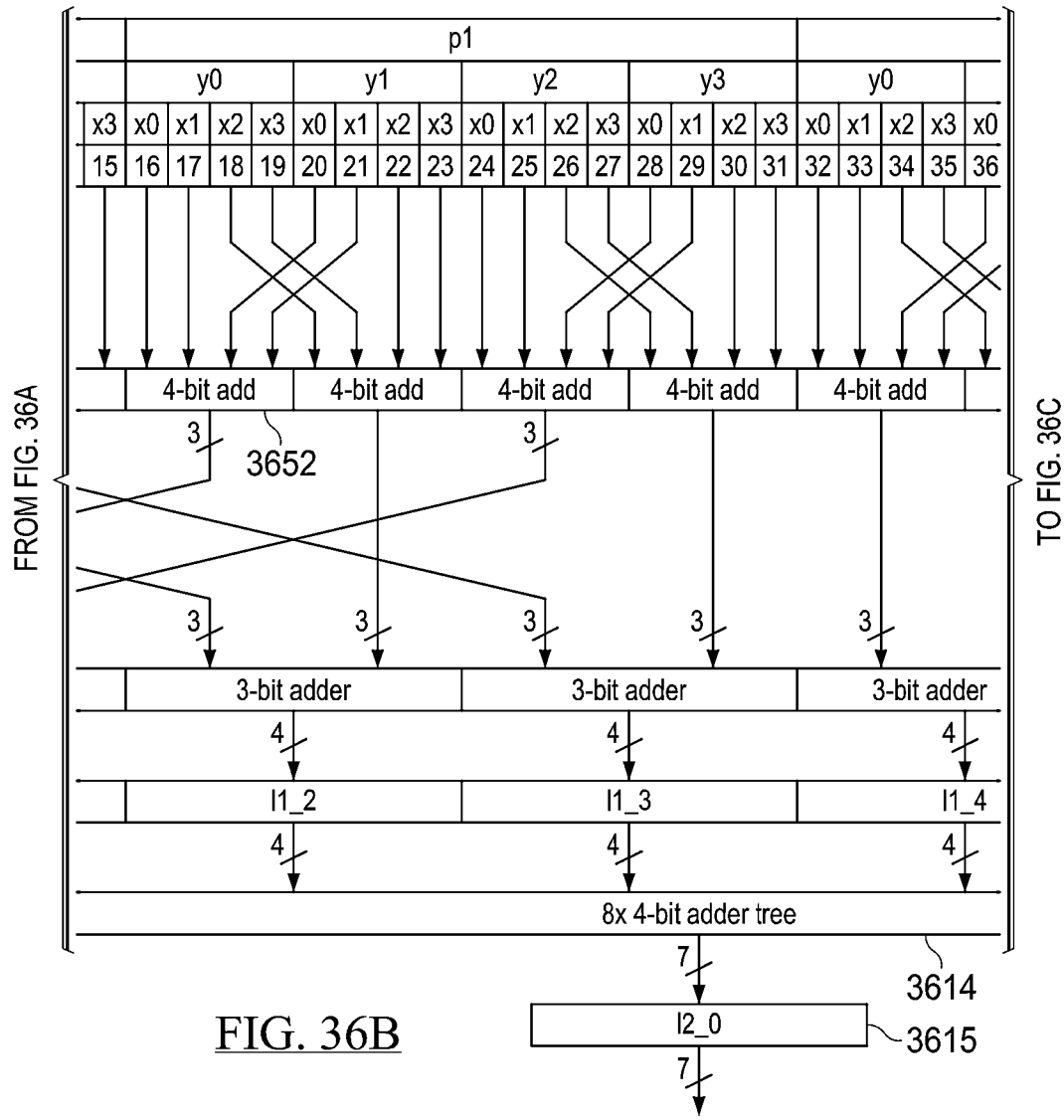
Figure 36C:
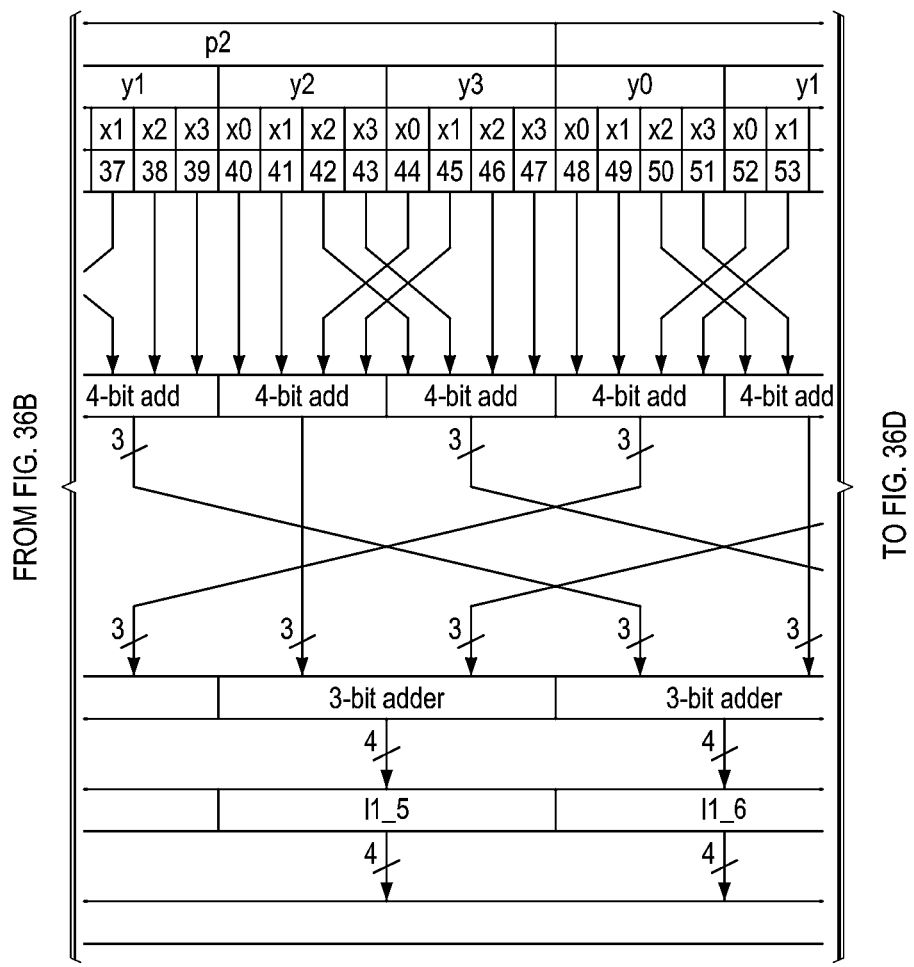
Figure 36D:
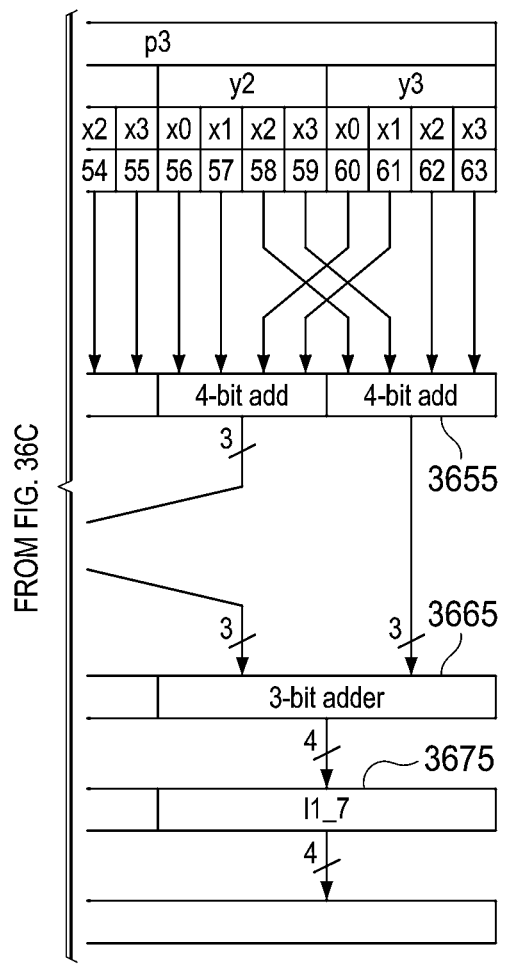

FIG. 35 is a diagram showing how the generation of histogram pyramids from 2D bitmaps can be accelerated in accordance with some embodiments. A histogram pyramid may be computed by successively summing the number of ones in an input 8×8 bit representation of a 2D binary array represented as a 64-bit integer 3500 entry of an example volumetric data structure. The first level of the histogram pyramid is derived by summing the number of ones in each of the 2×2 bit groupings in 3500 to yield the sixteen 3-bit numbers $\{0,1,2,3,4\}$ shown in 3501. For instance, bits 0, 1, 2 and 3 of the 64-bit value 3504 (corresponds to 350) may be summed by a 4×3-bit adder 3505, to produce a partial sum in the l0_$x$ register 3506. The next 4×3-bit adder computes the sum of bits 4, 5, 6 and 7 etc. The output of the first layer of sixteen 4×3-bit adders is packed into a 48-bit register l0_$x$ also denoted as 3507. The next level of the histogram pyramid is computed by summing the partial products in register l0_$x$(3505) using an 8-bit adder to 3508 to sum the four 3-bit partial sums l0_0, l0_1, l0_2 and l0_3 to compute level 1 values l1_$x$(e.g., 3509) the elements of l1_$x$ are concatenated into 3517$x$ which also corresponds to 3507. The final stage sums l1_$x$ elements (e.g., 3509) into a 7-bit result via a 4×5-bit adder tree 3510. The output of 3510 is then stored in a register 3512 as l2_0 which corresponds to 3503 and 3507. From the point of view of ease of use from a memory map perspective, the three elements 3514, 3516 and 3507 can be packed into a 128-bit format shown in 3518, among other example features and implementations.

FIG. 36 shows how the generation of histogram pyramids from 3D bitmaps can be accelerated in accordance with some embodiments. Similar to the example of FIG. 35, a 64-bit integer entry of an example volumetric data structure (e.g., 3600, 3601, 3602, 3603) codes this time for a 4^3 3D volume rather than an 8×8 2D volume. The 3D volume may be reduced to a histogram pyramid consisting of 2 levels 3604 and 3605 followed by 3606. In the case of FIG. 36, the volume is reduced by a factor of 2 in 3 dimensions, rather than only 2 dimensions as in the case of FIG. 35. The bits in the 64-bit integer entry may be laid out as shown in 3610 and are summed by a row of 16 four bit adders 3650 to 3655. The first 4-bit adder 3650 sums bits 0, 1, 4 and 5 through to the sixteenth adder 3655, which sums bits 58, 59, 62 and 63 of 3610. A second row of eight 2×3-bit adders 3660 to 3665 then sums the output of the 4-bit adders 3650 to 3655. For instance, adder 3660 sums the outputs of 3650 and 3652 and the result is stored in l1_0 (3670) etc. Finally an 8×4-bit adder tree 3614 sums the l1_$x$ elements 3670 to 3675 and the result is stored in l2_0 (3615).

Figure 37A:
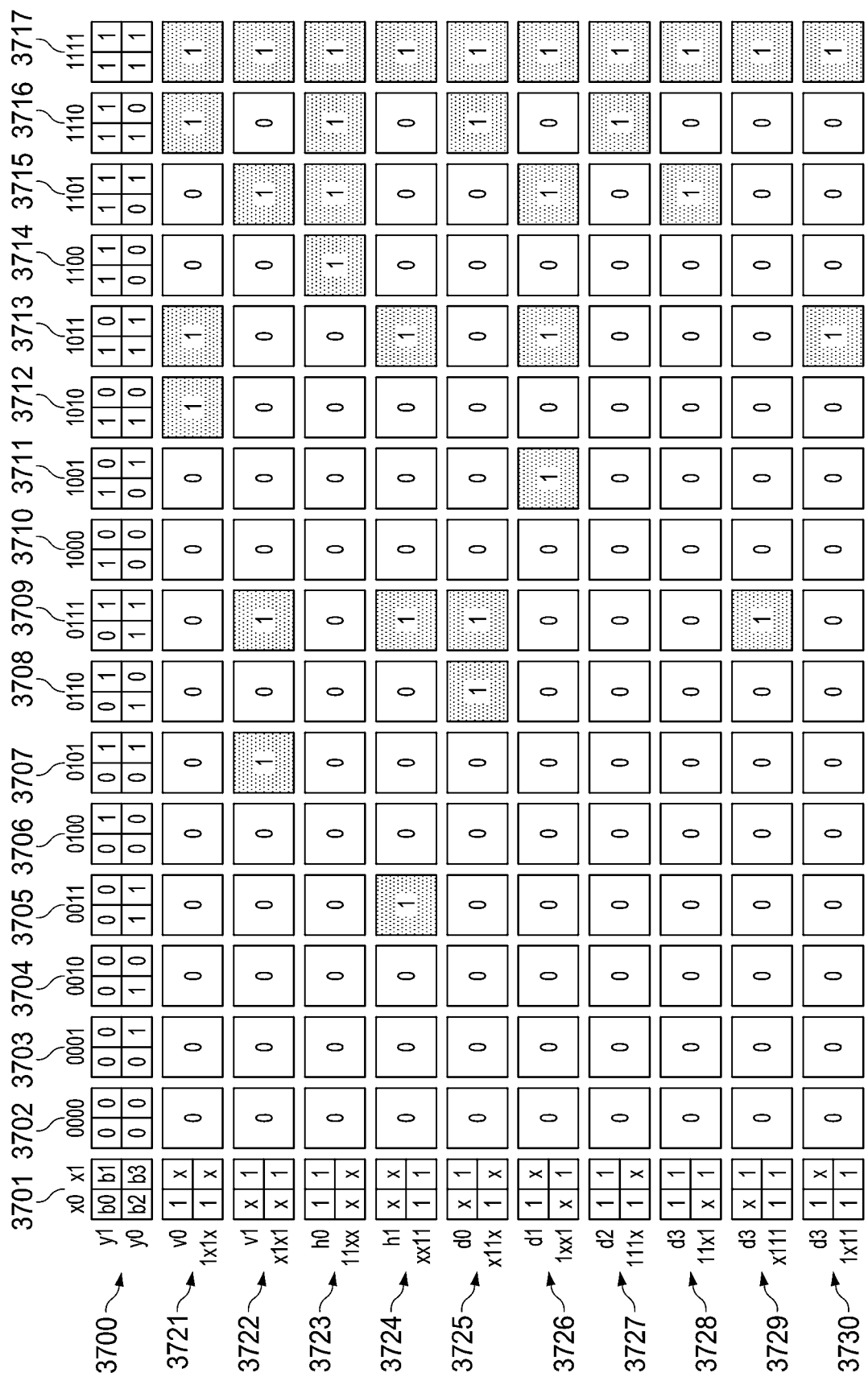
FIG. 37 shows the example acceleration of 2D Path-Finding on a 2D 2×2 bitmap in accordance with some embodiments.
Figure 37B:
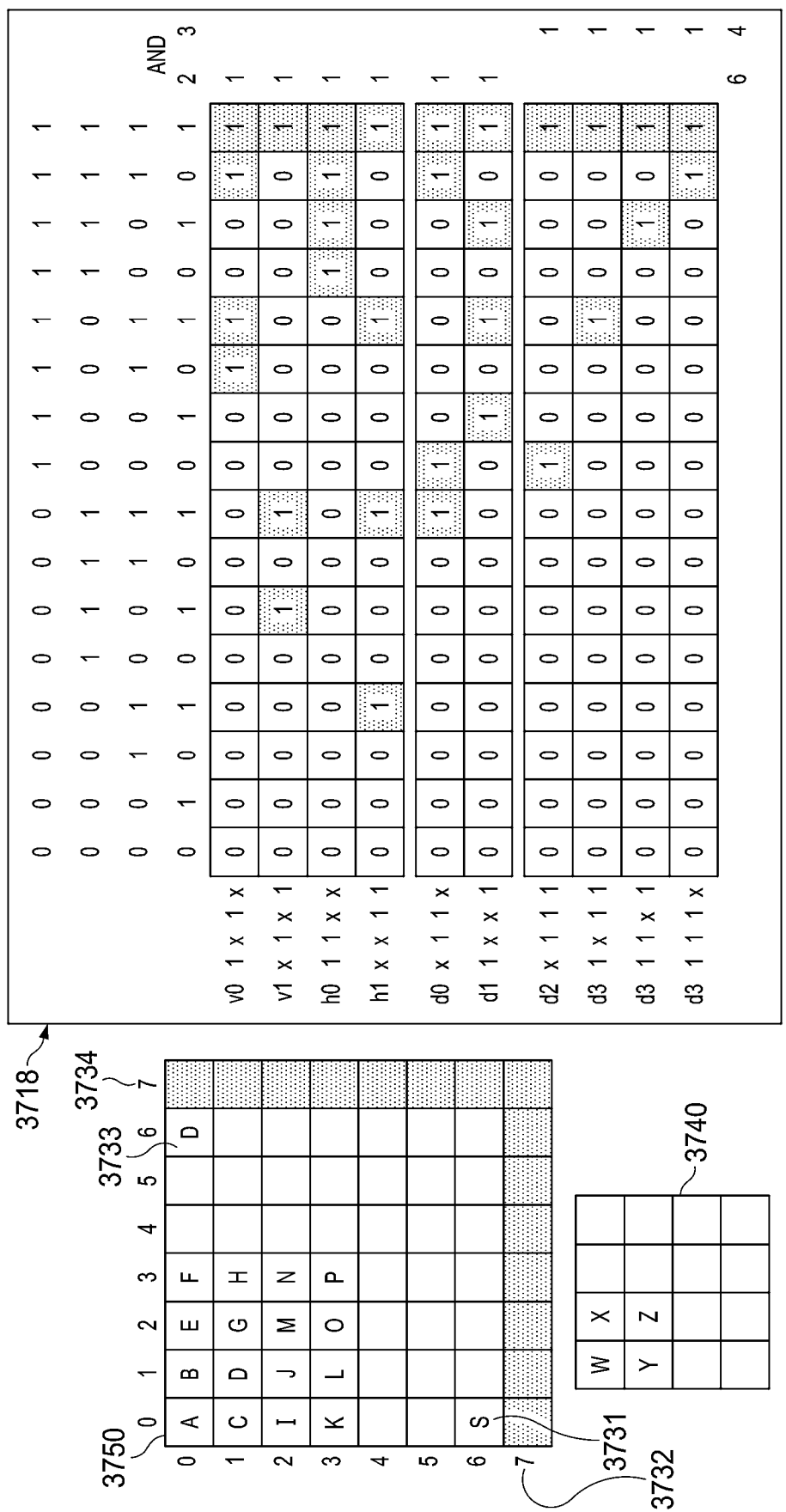

FIG. 37 is a diagram showing how 2D Path-Finding on a 2D 2×2 bitmap can be accelerated in accordance with some embodiments. The principal of operation is that for connectivity to exist between points on a map of identical grid cells the values of a contiguous run of cells in x or y or x and y must all be set to one. So a logical AND of bits drawn from those cells can be instantiated to test the bitmap in the grid for the existence of a valid path, and a different AND gate can be instantiated for each valid path through the N×N grid. In some instances, this approach may introduce combinatorial complexity in that even an 8×8 2D grid could contain $2^{64}-1$ valid paths. Accordingly, in some improved implementations, the grid may be reduced to 2×2 or 4×4 tiles which can be hierarchically tested for connectivity. A 2×2 bitmap 3700, contains 4 bits labeled b0, b1, b2 and b3. The 4 bits can take on the values 0000 through to 1111 with corresponding labels 3701 through to 3717. Each of these bit patterns expresses varying levels of connectivity between faces of the 2×2 grid labelled 3721 through to 3730. For instance 3721 or v0 denoting vertical connectivity between x0 and y0 in 3700 exists when the 2×2 grid 3700 contains bitmaps 1010 (3712), 1011 (3713), 1110 (3716) or 1111 (3717). A 2-input logical AND or b0 and b3 in 3700 as shown in row 1 of table 3718 generates v0 in the connectivity map that can be used in higher level hardware or software to decide on global connectivity through a global grid that has been subdivided into 2×2 sub grids. If the global map contains an odd number of grid points on either x or y axis the top level grid will require padding out to the next highest even number of grid points (e.g., such that 1 extra row of zeroes will need is added to the x- and/or y-axes on the global grid). FIG. 37 further shows an exemplary 7×7 grid 3750 showing how it is padded out to 8×8 by adding an additional row 3732 and column 3734 filled with zeroes. In order to speed up path-finding compared to the other techniques (e.g., depth-first search, breadth-first search or Dijkstra's algorithm, or other graph-based approaches), the present example may sub-sample the N×N map 3750 progressively town to a 2×2 map. For instance in this example cell W in 3740 is populated by ORing the contents of cells A, B, C and D in 3750, and so on. In turn the bits in 2×2 cells in 3740 are ORed to populate the cells in 3742. In terms of path-finding the algorithm starts from the smallest 2×2 representation of the grid 3742 and tests each of the bits. Only the parts of the 4×4 grid in 3740 (composed of four 2×2 grids) corresponding to one bits in the 2×2 grid 3742 need be tested for connectivity as we know that a zero bit means that there is no corresponding 2×2 grid cell in 3740. This approach can also be used in searching the 8×8 grid in 3720, for example if cell W in 3740 contains a zero then we know that there is no path in ABCD in 3720 etc. This approach prunes branches from the graph search algorithm used whether it be A*, Dijkstra, DFS, BFS or variants thereof. In addition to this, the use of a hardware basic path-finder with 2×2 organization 3718 may further limit the associated computations. Indeed, a 4×4 basic hardware element can be composed using a five 2×2 hardware blocks with the same arrangement as 3740 and 3742 further constraining the amount of graph searching that needs to be performed. Furthermore an 8×8 hardware-based search engine can be constructed with twenty one 2×2 HW blocks (3718) with the same arrangement as 3742, 3740, 3700, and so on for potentially any N×N topology.

Figure 38A:
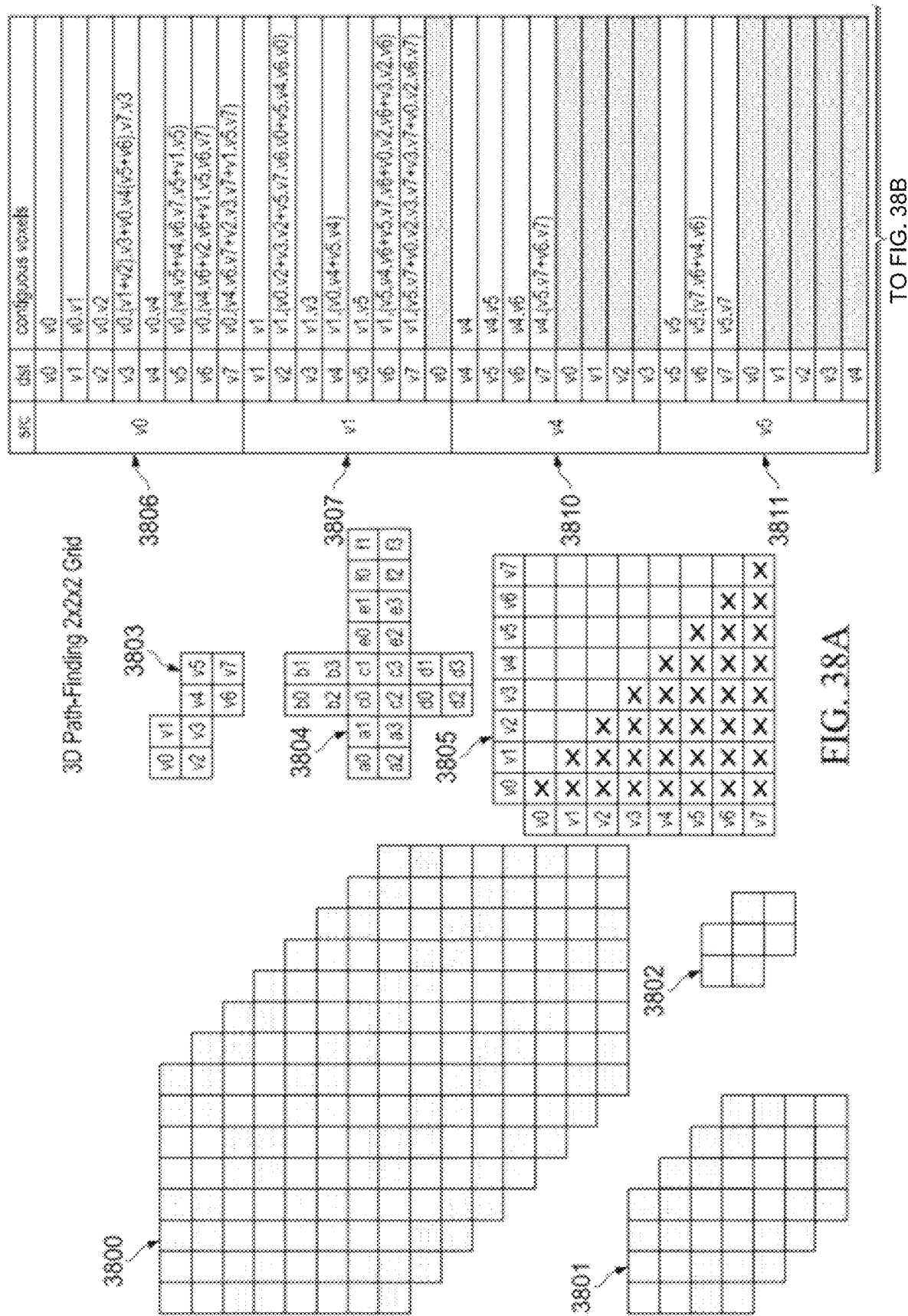
FIG. 38 shows the example acceleration of 2D Path-Finding on a 2D 2×2 bitmap in accordance with some embodiments.
Figure 38B:
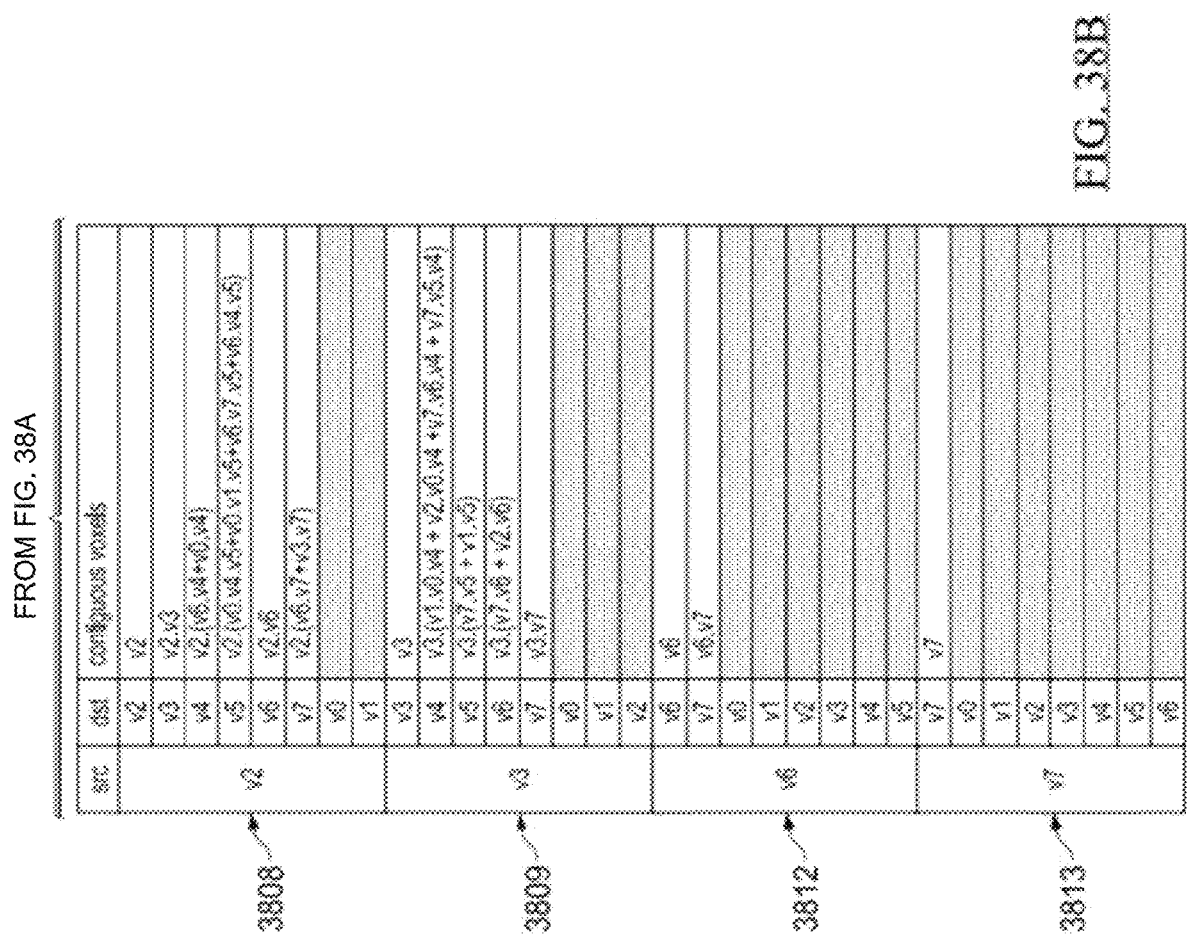

FIG. 38 shows how 3D Path-Finding on a 3D 2×2×2 bitmap can be accelerated in accordance with some embodiments. Similar to the example of FIG. 37, an N×N×N grid can be padded to a multiple of 2 (N must be even) as shown in 3800. This grid can be progressively subsampled to a 4×4×4 grid as shown in 3801 and finally to a 2×2×2 grid in 3802. Similarly to FIG. 37 the presence or absence of ones in the cells in each 2×2×2 grid cell (3802) can be used to determine whether any region of the 4×4×4 grid should be searched, cells in the 4×4×4 grid can be used to prune calculations in the 8×8 grid and so on up to the full N×N grid independently of the graph algorithm used to search the overall N×N×N grid. At the 2×2×2 grid level the 8 bits in the 2×2×2 bitmap are labeled v0-v7 as shown in 3803. The connectivity to the faces of the cube are shown in 3804 using the same color coding. As shown in the connectivity matrix for the path-finder through the 2×2×2 volume shown in 3805 the connectivity is symmetric so only the lower triangle need be represented as connectivity from A to B is the same as from B to A. Furthermore the elements along the diagonal need not necessarily be considered as they are implicit. The equations for the connectivity in 3 dimensions is shown in 3806 to 3813 with the various sections showing the equations for the bits required to be all ones in order for connectivity to exist between voxels in the 2×2×2 volume 3803. For instance for connectivity to exist between v0 and v1 to exist bits v0 AND v1 must both be "1", for connectivity to exist between v0 and v2 to exist both v0 and v2 must both be "1", and for connectivity to exist between v0 and v3 then v0, v1 or v2 AND v3 must all be "1"'s, and so on, as shown in section 3086 of the truth-table. From this organization, the equations shown may be implemented in AND-OR logic circuitry to implement the 2×2×2 path-finding on an 8-bit bitmap 3803 and output the paths between the voxels v0-v7 in a single parallel step. Further, in a manner similar to that shown in FIG. 37, a 4×4×4 primitive HW path-finder can be constructed using five 2×2×2 HW path-finders as per 3805 interconnected in the manner shown between 3802 and 3801. Indeed, an 8×8×8 HW path-finder can be implemented connecting one hundred and 37 2×2×2 HW path-finders as per the connectivity of 3802, 3801 and 3800, among other examples.

Figure 39:
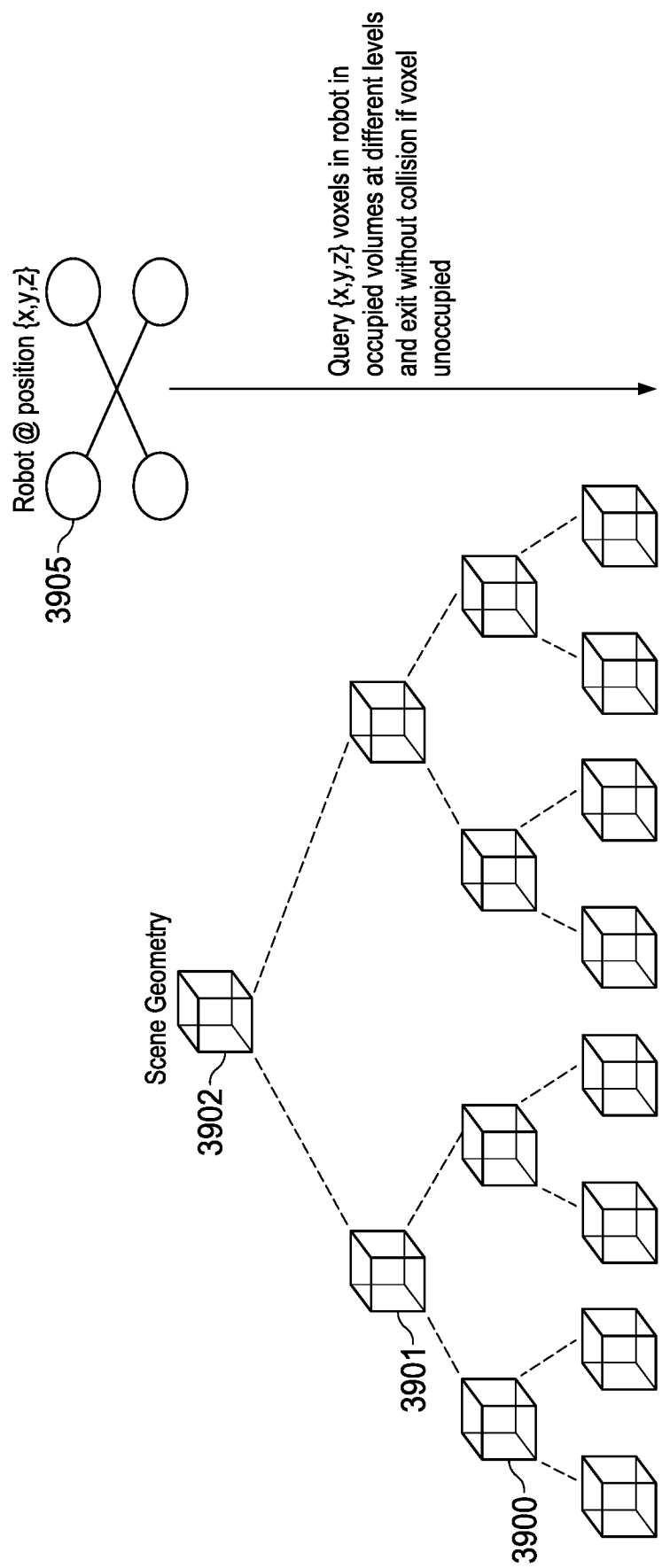
FIG. 39 shows the example acceleration of collision detection using an example volumetric data structure in accordance with some embodiments.

FIG. 39 is a simplified block diagram showing how collision detection can be accelerated using the proposed volumetric data structure in accordance with some embodiments. The 3D N×N×N map of the geometry can be subsampled into a pyramid as previously shown in FIG. 38 consisting of a lowest Level of Detail (LoD) 2×2×2 volume 3802 (3902), a next highest 4×4×4 volume 3801 (3901), an 8×8×8 volume 3800 (3900), and so on all the way up to N×N×N. If the position of the drone, vehicle, or robot 3905 is known in 3D space via either a location means such as GPS, or via relocalization from a 3D map, then it can rapidly be used to test for the presence or absence of geometry in a quadrant of the relevant 2×2×2 sub-volume by scaling the x, y and z positions of the drone/robot appropriately (dividing them by 2 the relevant number of times) and querying 3902 for the presence of geometry (e.g., checking if the corresponding bitmap bit is one indicating a possible collision). If a possible collision exists (e.g., a "1" is found) then further checks in volumes 3901, 3900, etc. may be performed to establish if the drone/robot can move or not. However, if a voxel in 3902 is free (e.g., "0"), then the robot/drone can interpret the same as free space and manipulate directional control to move freely through a large part of the map.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 40-45 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 40-45.

Figure 40:
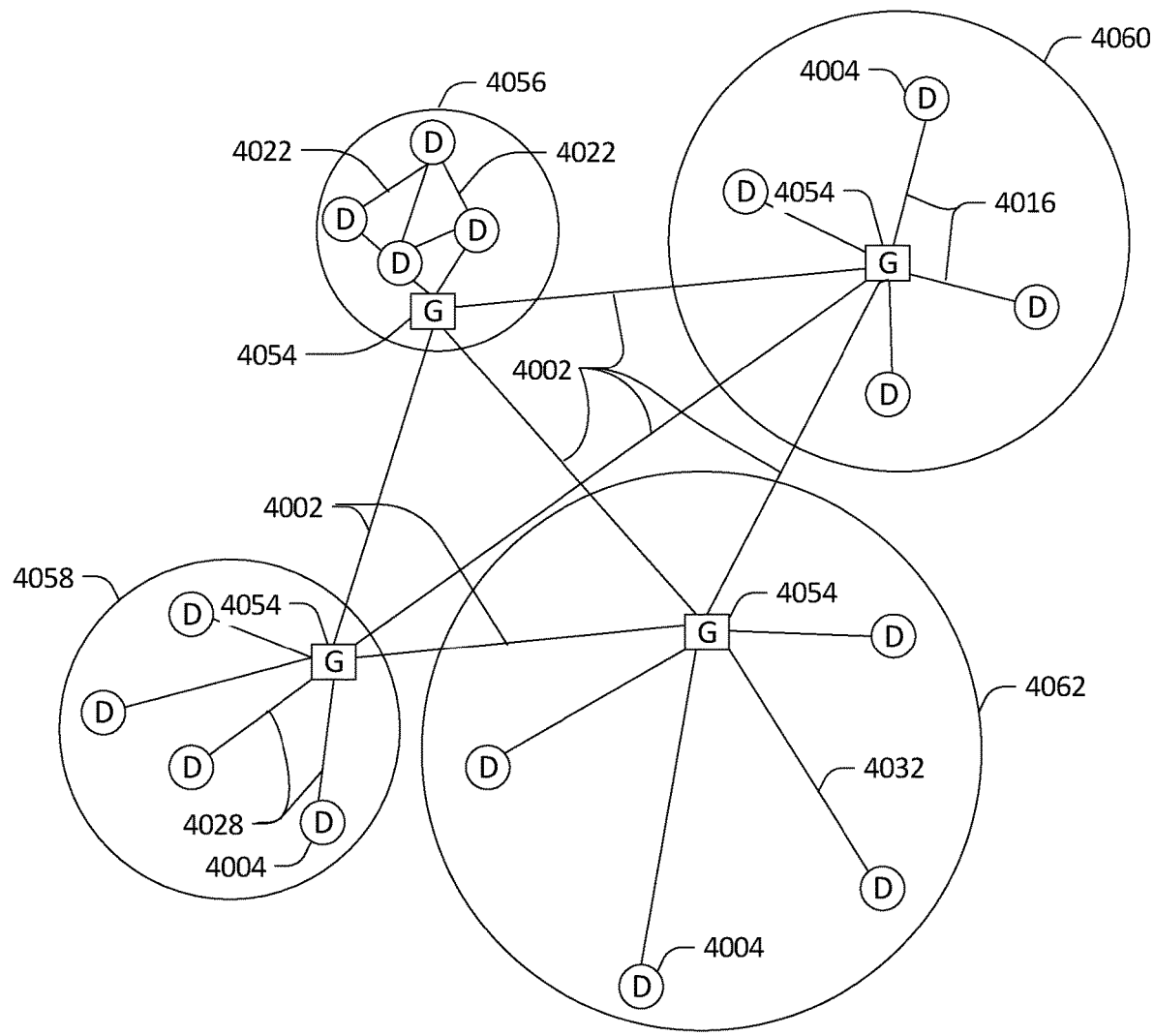
FIG. 40 is a simplified block diagram of an exemplary network with devices in accordance with at least some embodiments.

FIG. 40 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 41:
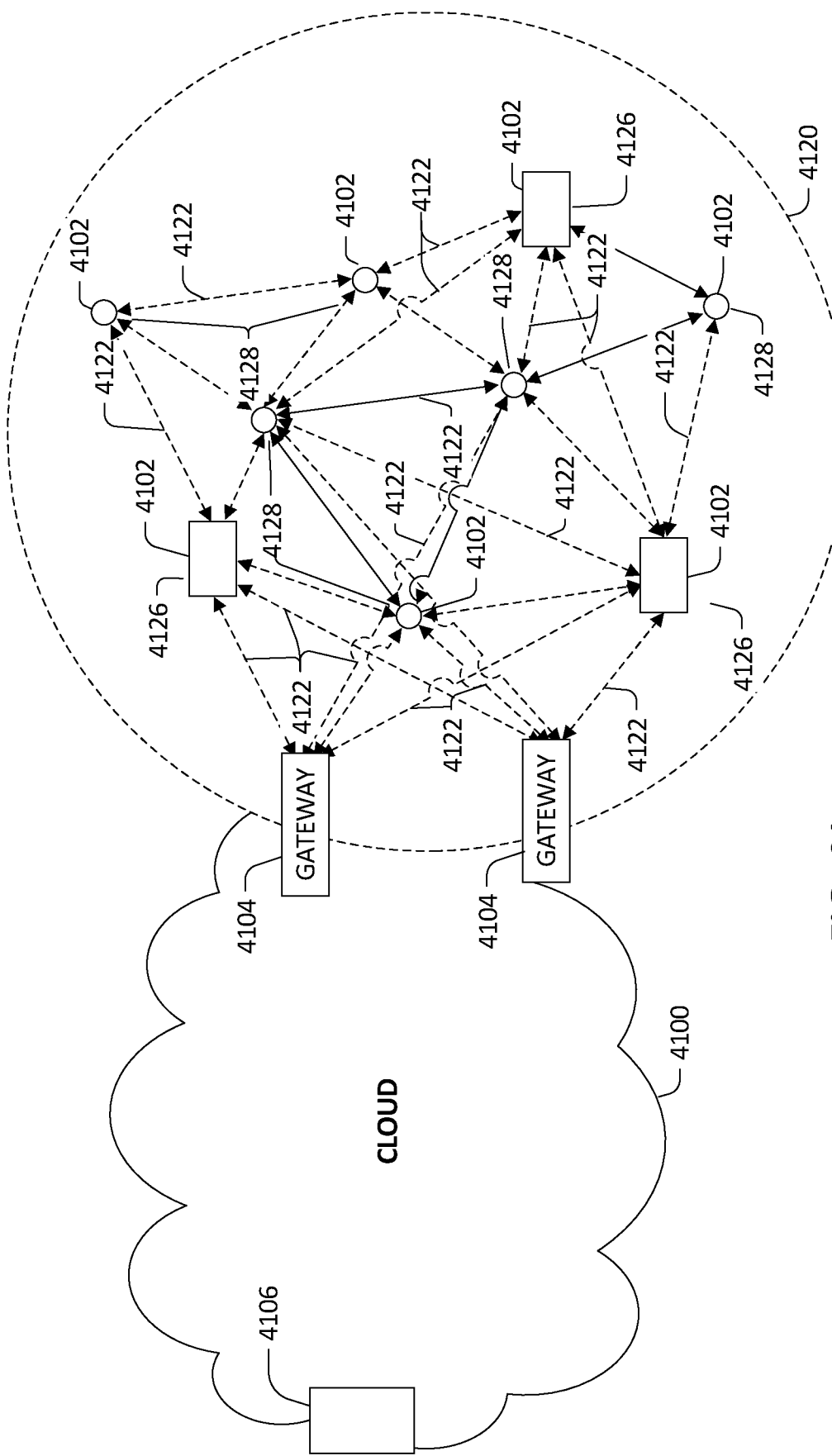
FIG. 41 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 40 and 41, present a number of new challenges in a heterogeneous network of connectivity comprising a combination of wired and wireless technologies.

FIG. 40 specifically provides a simplified drawing of a domain topology that may be used for a number of internet-of-things (IoT) networks comprising IoT devices 4004, with the IoT networks 4056, 4058, 4060, 4062, coupled through backbone links 4002 to respective gateways 4054. For example, a number of IoT devices 4004 may communicate with a gateway 4054, and with each other through the gateway 4054. To simplify the drawing, not every IoT device 4004, or communications link (e.g., link 4016, 4022, 4028, or 4032) is labeled. The backbone links 4002 may include any number of wired or wireless technologies, including optical networks, and may be part of a local area network (LAN), a wide area network (WAN), or the Internet. Additionally, such communication links facilitate optical signal paths among both IoT devices 4004 and gateways 4054, including the use of MUXing/deMUXing components that facilitate interconnection of the various devices.

The network topology may include any number of types of IoT networks, such as a mesh network provided with the network 4056 using Bluetooth low energy (BLE) links 4022. Other types of IoT networks that may be present include a wireless local area network (WLAN) network 4058 used to communicate with IoT devices 4004 through IEEE 802.11 (Wi-Fi®) links 4028, a cellular network 4060 used to communicate with IoT devices 4004 through an LTE/LTE-A (4G) or 5G cellular network, and a low-power wide area (LPWA) network 4062, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 4004, such as over the backbone links 4002, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 4056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 4058, for instance, may use systems that perform standards conversion to provide multi-standard connectivity, enabling IoT devices 4004 using different protocols to communicate. Further systems may provide seamless interconnectivity across a multi-standard infrastructure comprising visible Internet resources and hidden Internet resources.

Communications in the cellular network 4060, for instance, may be enhanced by systems that offload data, extend communications to more remote devices, or both. The LPWA network 4062 may include systems that perform non-Internet protocol (IP) to IP interconnections, addressing, and routing. Further, each of the IoT devices 4004 may include the appropriate transceiver for wide area communications with that device. Further, each IoT device 4004 may include other transceivers for communications using additional protocols and frequencies. This is discussed further with respect to the communication environment and hardware of an IoT processing device depicted in FIGS. 42 and 43.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 41 below.

FIG. 41 illustrates a cloud computing network in communication with a mesh network of IoT devices (devices 4102) operating as a fog device at the edge of the cloud computing network. The mesh network of IoT devices may be termed a fog 4120, operating at the edge of the cloud 4100. To simplify the diagram, not every IoT device 4102 is labeled.

The fog 4120 may be considered to be a massively interconnected network wherein a number of IoT devices 4102 are in communications with each other, for example, by radio links 4122. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 4102 are shown in this example, gateways 4104, data aggregators 4126, and sensors 4128, although any combinations of IoT devices 4102 and functionality may be used. The gateways 4104 may be edge devices that provide communications between the cloud 4100 and the fog 4120, and may also provide the backend process function for data obtained from sensors 4128, such as motion data, flow data, temperature data, and the like. The data aggregators 4126 may collect data from any number of the sensors 4128, and perform the back end processing function for the analysis. The results, raw data, or both may be passed along to the cloud 4100 through the gateways 4104. The sensors 4128 may be full IoT devices 4102, for example, capable of both collecting data and processing the data. In some cases, the sensors 4128 may be more limited in functionality, for example, collecting the data and allowing the data aggregators 4126 or gateways 4104 to process the data.

Communications from any IoT device 4102 may be passed along a convenient path (e.g., a most convenient path) between any of the IoT devices 4102 to reach the gateways 4104. In these networks, the number of interconnections provide substantial redundancy, allowing communications to be maintained, even with the loss of a number of IoT devices 4102. Further, the use of a mesh network may allow IoT devices 4102 that are very low power or located at a distance from infrastructure to be used, as the range to connect to another IoT device 4102 may be much less than the range to connect to the gateways 4104.

The fog 4120 provided from these IoT devices 4102 may be presented to devices in the cloud 4100, such as a server 4106, as a single device located at the edge of the cloud 4100, e.g., a fog device. In this example, the alerts coming from the fog device may be sent without being identified as coming from a specific IoT device 4102 within the fog 4120. In this fashion, the fog 4120 may be considered a distributed platform that provides computing and storage resources to perform processing or data-intensive tasks such as data analytics, data aggregation, and machine-learning, among others.

In some examples, the IoT devices 4102 may be configured using an imperative programming style, e.g., with each IoT device 4102 having a specific function and communication partners. However, the IoT devices 4102 forming the fog device may be configured in a declarative programming style, allowing the IoT devices 4102 to reconfigure their operations and communications, such as to determine needed resources in response to conditions, queries, and device failures. As an example, a query from a user located at a server 4106 about the operations of a subset of equipment monitored by the IoT devices 4102 may result in the fog 4120 device selecting the IoT devices 4102, such as particular sensors 4128, needed to answer the query. The data from these sensors 4128 may then be aggregated and analyzed by any combination of the sensors 4128, data aggregators 4126, or gateways 4104, before being sent on by the fog 4120 device to the server 4106 to answer the query. In this example, IoT devices 4102 in the fog 4120 may select the sensors 4128 used based on the query, such as adding data from flow sensors or temperature sensors. Further, if some of the IoT devices 4102 are not operational, other IoT devices 4102 in the fog 4120 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 42:
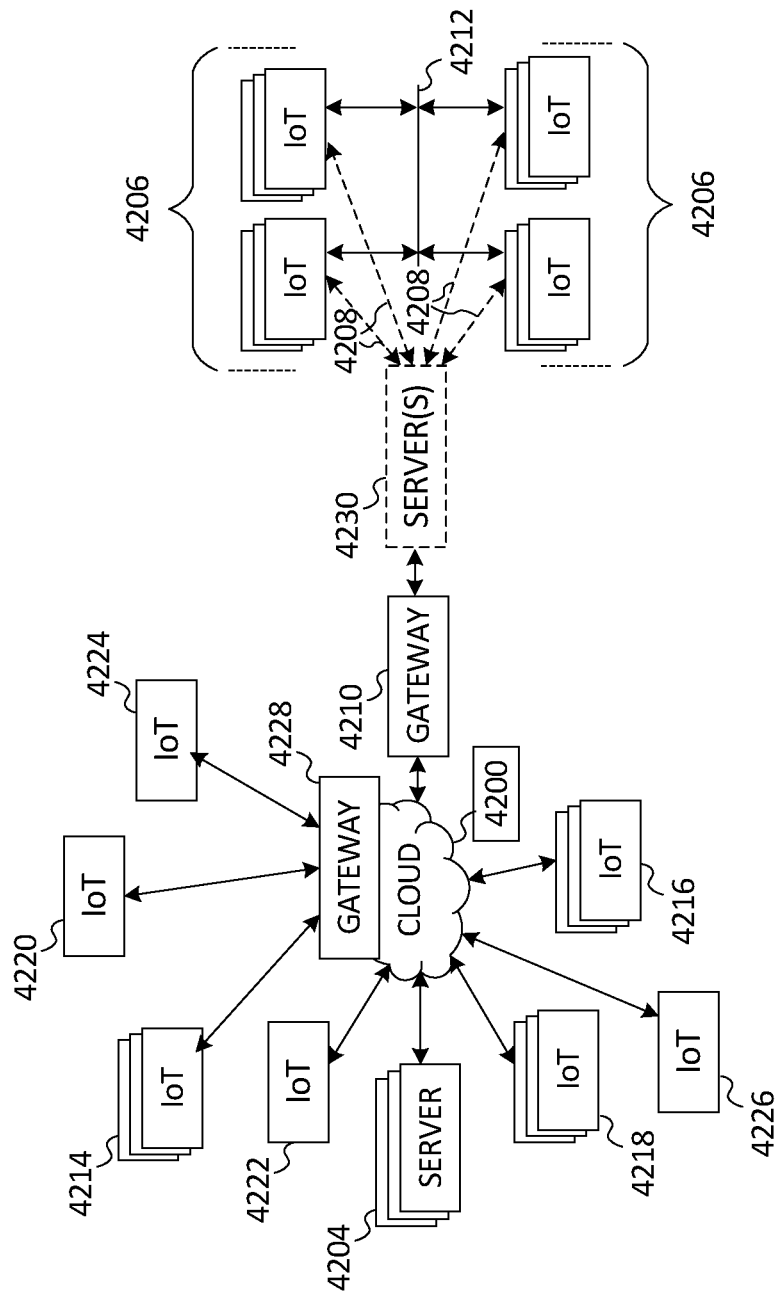
FIG. 42 is a simplified block diagram of a system including example devices in accordance with at least some embodiments.

For instance, FIG. 42 illustrates a drawing of a cloud computing network, or cloud 4200, in communication with a number of Internet of Things (IoT) devices. The cloud 4200 may represent the Internet, or may be a local area network (LAN), or a wide area network (WAN), such as a proprietary network for a company. The IoT devices may include any number of different types of devices, grouped in various combinations. For example, a traffic control group 4206 may include IoT devices along streets in a city. These IoT devices may include stoplights, traffic flow monitors, cameras, weather sensors, and the like. The traffic control group 4206, or other subgroups, may be in communication with the cloud 4200 through wired or wireless links 4208, such as LPWA links, optical links, and the like. Further, a wired or wireless sub-network 4212 may allow the IoT devices to communicate with each other, such as through a local area network, a wireless local area network, and the like. The IoT devices may use another device, such as a gateway 4210 or 4228 to communicate with remote locations such as the cloud 4200; the IoT devices may also use one or more servers 4230 to facilitate communication with the cloud 4200 or with the gateway 4210. For example, the one or more servers 4230 may operate as an intermediate network node to support a local edge cloud or fog implementation among a local area network. Further, the gateway 4228 that is depicted may operate in a cloud-to-gateway-to-many edge devices configuration, such as with the various IoT devices 4214, 4220, 4224 being constrained or dynamic to an assignment and use of resources in the cloud 4200.

Other example groups of IoT devices may include remote weather stations 4214, local information terminals 4216, alarm systems 4218, automated teller machines 4220, alarm panels 4222, or moving vehicles, such as emergency vehicles 4224 or other vehicles 4226, among many others. Each of these IoT devices may be in communication with other IoT devices, with servers 4204, with another IoT fog device or system (not shown, but depicted in FIG. 41), or a combination therein. The groups of IoT devices may be deployed in various residential, commercial, and industrial settings (including in both private or public environments).

As can be seen from FIG. 42, a large number of IoT devices may be communicating through the cloud 4200. This may allow different IoT devices to request or provide information to other devices autonomously. For example, a group of IoT devices (e.g., the traffic control group 4206) may request a current weather forecast from a group of remote weather stations 4214, which may provide the forecast without human intervention. Further, an emergency vehicle 4224 may be alerted by an automated teller machine 4220 that a burglary is in progress. As the emergency vehicle 4224 proceeds towards the automated teller machine 4220, it may access the traffic control group 4206 to request clearance to the location, for example, by lights turning red to block cross traffic at an intersection in sufficient time for the emergency vehicle 4224 to have unimpeded access to the intersection.

Clusters of IoT devices, such as the remote weather stations 4214 or the traffic control group 4206, may be equipped to communicate with other IoT devices as well as with the cloud 4200. This may allow the IoT devices to form an ad-hoc network between the devices, allowing them to function as a single device, which may be termed a fog device or system (e.g., as described above with reference to FIG. 41).

Figure 43:
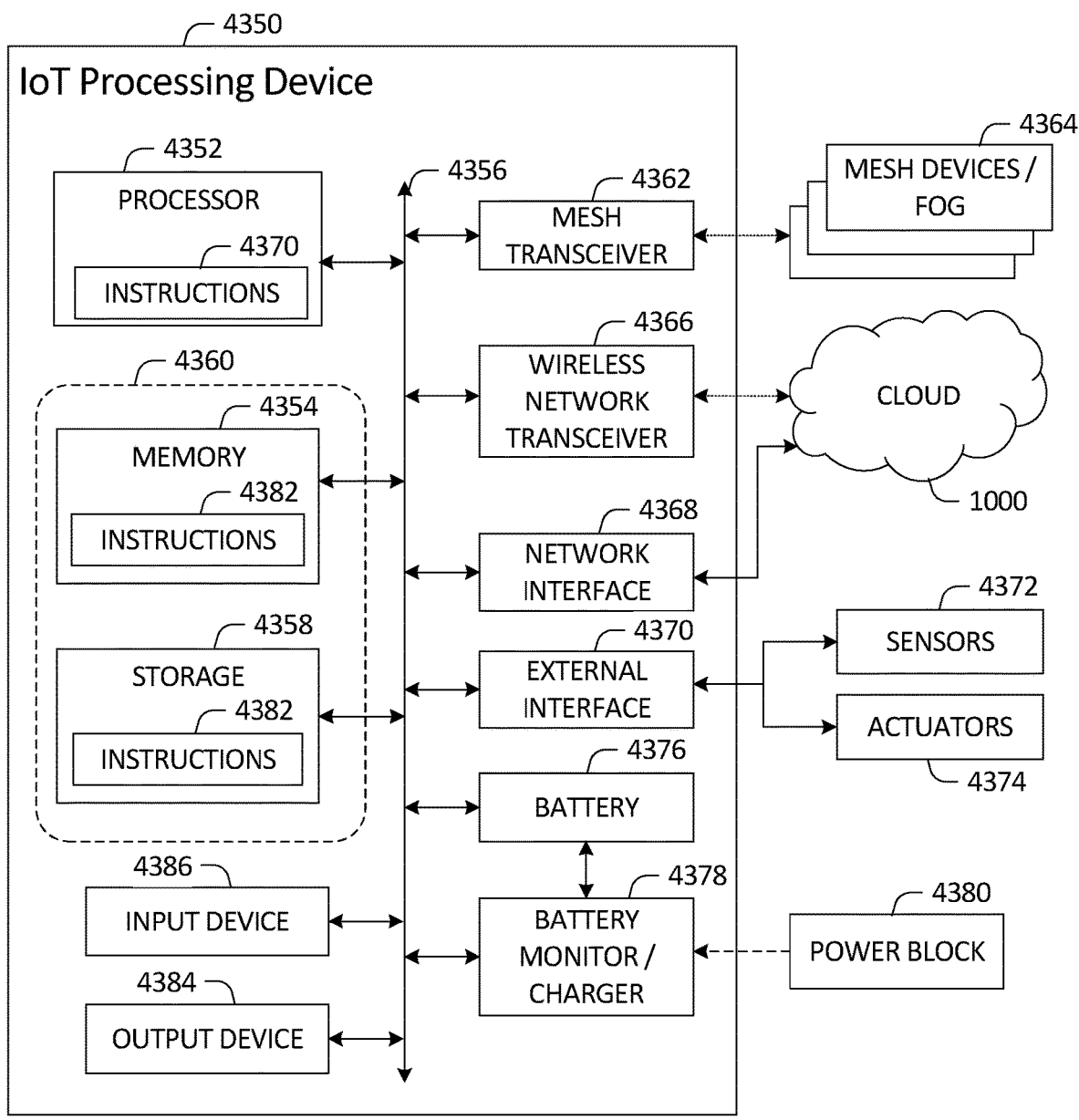
FIG. 43 is a simplified block diagram of an example processing device in accordance with at least some embodiments.

FIG. 43 is a block diagram of an example of components that may be present in an IoT device 4350 for implementing the techniques described herein. The IoT device 4350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 4350, or as components otherwise incorporated within a chassis of a larger system. Additionally, the block diagram of FIG. 43 is intended to depict a high-level view of components of the IoT device 4350. However, some of the components shown may be omitted, additional components may be present, and different arrangement of the components shown may occur in other implementations.

The IoT device 4350 may include a processor 4352, which may be a microprocessor, a multi-core processor, a multithreaded processor, an ultra-low voltage processor, an embedded processor, or other known processing element. The processor 4352 may be a part of a system on a chip (SoC) in which the processor 4352 and other components are formed into a single integrated circuit, or a single package, such as the Edison™ or Galileo™ SoC boards from Intel. As an example, the processor 4352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 4352 may communicate with a system memory 4354 over an interconnect 4356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 4358 may also couple to the processor 4352 via the interconnect 4356. In an example the storage 4358 may be implemented via a solid state disk drive (SSDD). Other devices that may be used for the storage 4358 include flash memory cards, such as SD cards, microSD cards, xD picture cards, and the like, and USB flash drives. In low power implementations, the storage 4358 may be on-die memory or registers associated with the processor 4352. However, in some examples, the storage 4358 may be implemented using a micro hard disk drive (HDD). Further, any number of new technologies may be used for the storage 4358 in addition to, or instead of, the technologies described, such resistance change memories, phase change memories, holographic memories, or chemical memories, among others.

The components may communicate over the interconnect 4356. The interconnect 4356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 4356 may be a proprietary bus, for example, used in a SoC based system. Other bus systems may be included, such as an I2C interface, an SPI interface, point to point interfaces, and a power bus, among others.

The interconnect 4356 may couple the processor 4352 to a mesh transceiver 4362, for communications with other mesh devices 4364. The mesh transceiver 4362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 4364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 4362 may communicate using multiple standards or radios for communications at different range. For example, the IoT device 4350 may communicate with close devices, e.g., within about 10 meters, using a local transceiver based on BLE, or another low power radio, to save power. More distant mesh devices 4364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 4366 may be included to communicate with devices or services in the cloud 4300 via local or wide area network protocols. The wireless network transceiver 4366 may be a LPWA transceiver that follows the IEEE 802.15.4, or IEEE 802.15.4g standards, among others. The IoT device 4350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 4362 and wireless network transceiver 4366, as described herein. For example, the radio transceivers 4362 and 4366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 4362 and 4366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 4366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 4368 may be included to provide a wired communication to the cloud 4300 or to other devices, such as the mesh devices 4364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 4368 may be included to allow connect to a second network, for example, a NIC 4368 providing communications to the cloud over Ethernet, and a second NIC 4368 providing communications to other devices over another type of network.

The interconnect 4356 may couple the processor 4352 to an external interface 4370 that is used to connect external devices or subsystems. The external devices may include sensors 4372, such as accelerometers, level sensors, flow sensors, optical light sensors, camera sensors, temperature sensors, a global positioning system (GPS) sensors, pressure sensors, barometric pressure sensors, and the like. The external interface 4370 further may be used to connect the IoT device 4350 to actuators 4374, such as power switches, valve actuators, an audible sound generator, a visual warning device, and the like.

In some optional examples, various input/output (I/O) devices may be present within, or connected to, the IoT device 4350. For example, a display or other output device 4384 may be included to show information, such as sensor readings or actuator position. An input device 4386, such as a touch screen or keypad may be included to accept input. An output device 4384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 4350.

A battery 4376 may power the IoT device 4350, although in examples in which the IoT device 4350 is mounted in a fixed location, it may have a power supply coupled to an electrical grid. The battery 4376 may be a lithium ion battery, or a metal-air battery, such as a zinc-air battery, an aluminum-air battery, a lithium-air battery, and the like.

A battery monitor/charger 4378 may be included in the IoT device 4350 to track the state of charge (SoCh) of the battery 4376. The battery monitor/charger 4378 may be used to monitor other parameters of the battery 4376 to provide failure predictions, such as the state of health (SoH) and the state of function (SoF) of the battery 4376. The battery monitor/charger 4378 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 4378 may communicate the information on the battery 4376 to the processor 4352 over the interconnect 4356. The battery monitor/charger 4378 may also include an analog-to-digital (ADC) convertor that allows the processor 4352 to directly monitor the voltage of the battery 4376 or the current flow from the battery 4376. The battery parameters may be used to determine actions that the IoT device 4350 may perform, such as transmission frequency, mesh network operation, sensing frequency, and the like.

A power block 4380, or other power supply coupled to a grid, may be coupled with the battery monitor/charger 4378 to charge the battery 4376. In some examples, the power block 4380 may be replaced with a wireless power receiver to obtain the power wirelessly, for example, through a loop antenna in the IoT device 4350. A wireless battery charging circuit, such as an LTC4020 chip from Linear Technologies of Milpitas, Calif., among others, may be included in the battery monitor/charger 4378. The specific charging circuits chosen depend on the size of the battery 4376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 4358 may include instructions 4382 in the form of software, firmware, or hardware commands to implement the techniques described herein. Although such instructions 4382 are shown as code blocks included in the memory 4354 and the storage 4358, it may be understood that any of the code blocks may be replaced with hardwired circuits, for example, built into an application specific integrated circuit (ASIC).

In an example, the instructions 4382 provided via the memory 4354, the storage 4358, or the processor 4352 may be embodied as a non-transitory, machine readable medium 4360 including code to direct the processor 4352 to perform electronic operations in the IoT device 4350. The processor 4352 may access the non-transitory, machine readable medium 4360 over the interconnect 4356. For instance, the non-transitory, machine readable medium 4360 may be embodied by devices described for the storage 4358 of FIG. 43 or may include specific storage units such as optical disks, flash drives, or any number of other hardware devices. The non-transitory, machine readable medium 4360 may include instructions to direct the processor 4352 to perform a specific sequence or flow of actions, for example, as described with respect to the flowchart(s) and block diagram(s) of operations and functionality depicted above.

Figure 44:
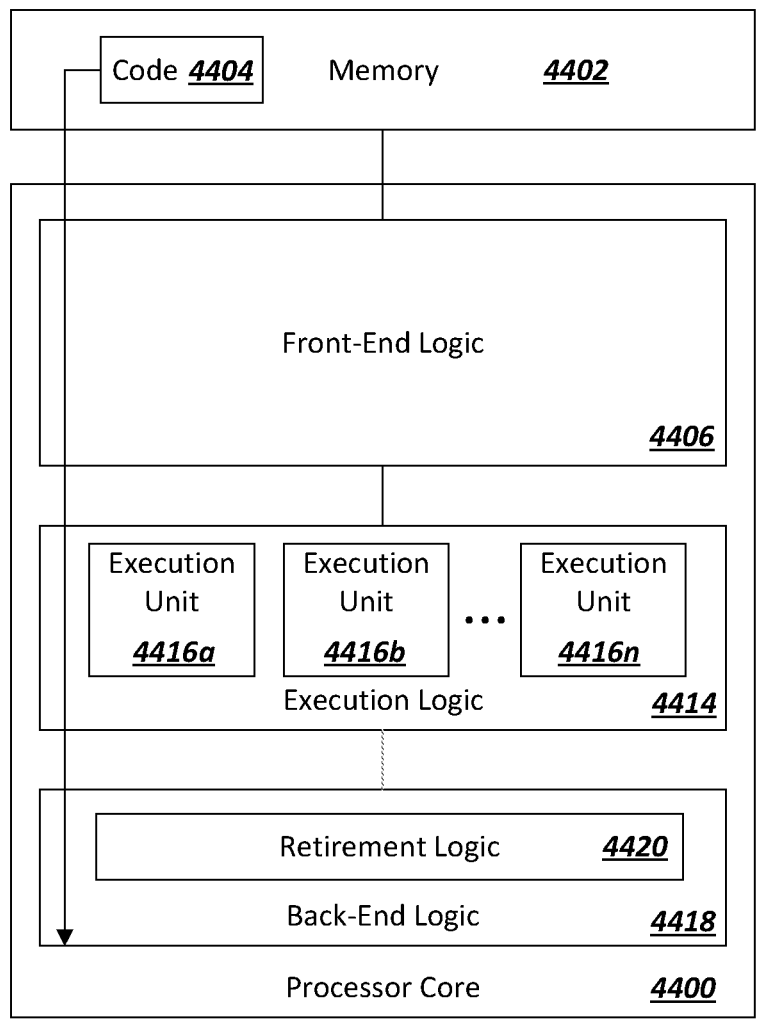
FIG. 44 is a block diagram of an exemplary processor in accordance with at least some embodiments.

FIG. 44 is an example illustration of a processor according to an embodiment. Processor 4400 is an example of a type of hardware device that can be used in connection with the implementations above. Processor 4400 may be any type of processor, such as a microprocessor, an embedded processor, a digital signal processor (DSP), a network processor, a multi-core processor, a single core processor, or other device to execute code. Although only one processor 4400 is illustrated in FIG. 44, a processing element may alternatively include more than one of processor 4400 illustrated in FIG. 44. Processor 4400 may be a single-threaded core or, for at least one embodiment, the processor 4400 may be multi-threaded in that it may include more than one hardware thread context (or "logical processor") per core.

FIG. 44 also illustrates a memory 4402 coupled to processor 4400 in accordance with an embodiment. Memory 4402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 4400 can execute any type of instructions associated with algorithms, processes, or operations detailed herein. Generally, processor 4400 can transform an element or an article (e.g., data) from one state or thing to another state or thing.

Code 4404, which may be one or more instructions to be executed by processor 4400, may be stored in memory 4402, or may be stored in software, hardware, firmware, or any suitable combination thereof, or in any other internal or external component, device, element, or object where appropriate and based on particular needs. In one example, processor 4400 can follow a program sequence of instructions indicated by code 4404. Each instruction enters a front-end logic 4406 and is processed by one or more decoders 4408. The decoder may generate, as its output, a micro operation such as a fixed width micro operation in a predefined format, or may generate other instructions, microinstructions, or control signals that reflect the original code instruction. Front-end logic 4406 also includes register renaming logic 4410 and scheduling logic 4412, which generally allocate resources and queue the operation corresponding to the instruction for execution.

Processor 4400 can also include execution logic 4414 having a set of execution units 4416a, 4416b, 4416n, etc. Some embodiments may include a number of execution units dedicated to specific functions or sets of functions. Other embodiments may include only one execution unit or one execution unit that can perform a particular function. Execution logic 4414 performs the operations specified by code instructions.

After completion of execution of the operations specified by the code instructions, back-end logic 4418 can retire the instructions of code 4404. In one embodiment, processor 4400 allows out of order execution but requires in order retirement of instructions. Retirement logic 4420 may take a variety of known forms (e.g., re-order buffers or the like). In this manner, processor 4400 is transformed during execution of code 4404, at least in terms of the output generated by the decoder, hardware registers and tables utilized by register renaming logic 4410, and any registers (not shown) modified by execution logic 4414.

Although not shown in FIG. 44, a processing element may include other elements on a chip with processor 4400. For example, a processing element may include memory control logic along with processor 4400. The processing element may include I/O control logic and/or may include I/O control logic integrated with memory control logic. The processing element may also include one or more caches. In some embodiments, non-volatile memory (such as flash memory or fuses) may also be included on the chip with processor 4400.

Figure 45:
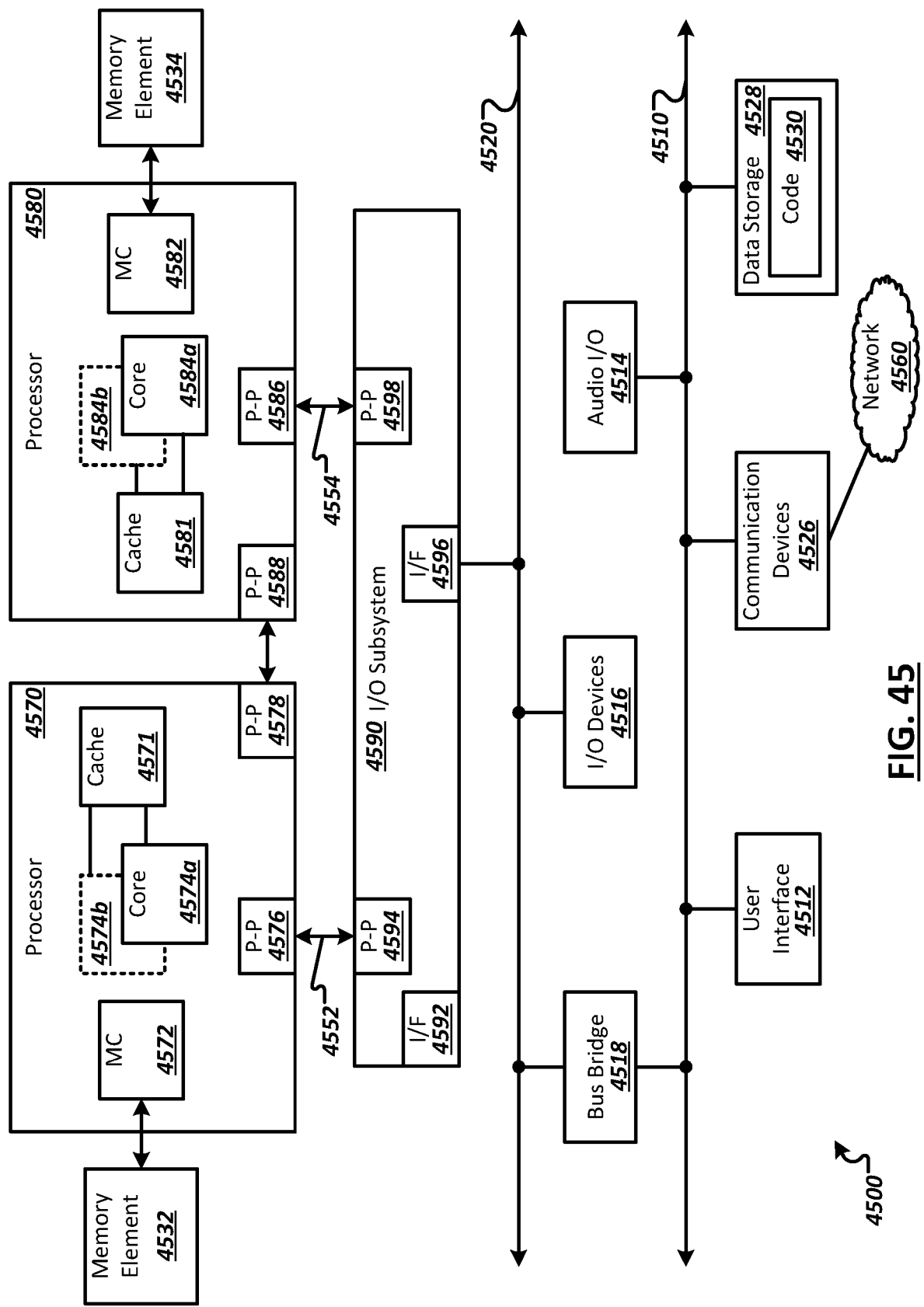
FIG. 45 is a block diagram of an exemplary computing system in accordance with at least some embodiments.

FIG. 45 illustrates a computing system 4500 that is arranged in a point-to-point (PtP) configuration according to an embodiment. In particular, FIG. 45 shows a system where processors, memory, and input/output devices are interconnected by a number of point-to-point interfaces. Generally, one or more of the computing systems described herein may be configured in the same or similar manner as computing system 4500.

Processors 4570 and 4580 may also each include integrated memory controller logic (MC) 4572 and 4582 to communicate with memory elements 4532 and 4534. In alternative embodiments, memory controller logic 4572 and 4582 may be discrete logic separate from processors 4570 and 4580. Memory elements 4532 and/or 4534 may store various data to be used by processors 4570 and 4580 in achieving operations and functionality outlined herein.

Processors 4570 and 4580 may be any type of processor, such as those discussed in connection with other figures. Processors 4570 and 4580 may exchange data via a point-to-point (PtP) interface 4550 using point-to-point interface circuits 4578 and 4588, respectively. Processors 4570 and 4580 may each exchange data with a chipset 4590 via individual point-to-point interfaces 4552 and 4554 using point-to-point interface circuits 4576, 4586, 4594, and 4598. Chipset 4590 may also exchange data with a high-performance graphics circuit 4538 via a high-performance graphics interface 4539, using an interface circuit 4592, which could be a PtP interface circuit. In alternative embodiments, any or all of the PtP links illustrated in FIG. 45 could be implemented as a multi-drop bus rather than a PtP link.

Chipset 4590 may be in communication with a bus 4520 via an interface circuit 4596. Bus 4520 may have one or more devices that communicate over it, such as a bus bridge 4518 and I/O devices 4516. Via a bus 4510, bus bridge 4518 may be in communication with other devices such as a user interface 4512 (such as a keyboard, mouse, touchscreen, or other input devices), communication devices 4526 (such as modems, network interface devices, or other types of communication devices that may communicate through a computer network 4560), audio I/O devices 4514, and/or a data storage device 4528. Data storage device 4528 may store code 4530, which may be executed by processors 4570 and/or 4580. In alternative embodiments, any portions of the bus architectures could be implemented with one or more PtP links.

The computer system depicted in FIG. 45 is a schematic illustration of an embodiment of a computing system that may be utilized to implement various embodiments discussed herein. It will be appreciated that various components of the system depicted in FIG. 45 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a machine accessible storage medium having instructions stored thereon, the instructions when executed on a machine, cause the machine to: obtain a volumetric data structure from memory, where the volumetric data structure is to model a particular volume, the volumetric data structure represents the particular volume at a plurality of levels of detail, a first entry in the volumetric data structure includes a first set of bits representing voxels at a first level of detail, the first level of detail includes the lowest level of detail in the volumetric data structure, values of the first set of bits indicate whether a corresponding one of the voxels is at least partially occupied by respective geometry, where the volumetric data structure further includes a number of second entries representing voxels at a second level of detail higher than the first level of detail, the voxels at the second level of detail represent subvolumes of volumes represented by voxels at the first level of detail, and the number of second entries corresponds to a number of bits in the first set of bits with values indicating that a corresponding voxel volume is occupied; and process the volumetric data structure to perform one or more operations, where the operations correspond to identification of the geometry within the particular volume.

Example 2 may include at least a portion of the subject matter of example 1, where the first entry and the one or more second entries include contiguous entries within the volumetric data structure.

Example 3 may include at least a portion of the subject matter of example 2, where subvolumes include first subvolumes, the second entries include values to indicate whether a corresponding voxel at the second level of detail is occupied with geometry, the volumetric data structure further includes one or more third entries representing voxels at a third level of detail higher than the second level of detail, the voxels at the third level of detail represent subvolumes of the first subvolumes represented by voxels at the second level of detail, and the number of third entries corresponds to a number of bits in the second set of bits with values indicating that a corresponding voxel volume is occupied, where the third entries are contiguous with a last of the second entries in the volumetric data structure.

Example 4 may include at least a portion of the subject matter of example 3, where the instructions, when executed, further cause a machine to determine a beginning of the third level based on the number of bits in the first set of bits with values indicating that a corresponding voxel volume at the first level of detail is occupied.

Example 5 may include at least a portion of the subject matter of any one of examples 1-4, where each voxel in the first level of detail is represented by two or more respective bits in the first entry.

Example 6 may include at least a portion of the subject matter of any one of examples 1-5, where the instructions, when executed, further cause a machine to determine a ray intersecting the particular volume; determine a subset of the voxels at the first level of detail through which the ray passes; and determine that the ray meets a particular voxel in the subset of voxels representing occupied space based on a value of a corresponding bit in the first entry indicating that the particular voxel is occupied with geometry.

Example 7 may include at least a portion of the subject matter of example 6, where the instructions, when executed, further cause a machine to: identify a particular one of the second entries corresponding to the particular voxel, based on determining that the ray meets the particular voxel; determine that the ray passes through a subset of voxels at the second level of detail; and determine, from values of bits in the particular second entry, whether the ray meets a voxel at the second level of detail occupied with geometry.

Example 8 may include at least a portion of the subject matter of example 6, where the operation includes detecting a potential collision of a moving device based at least in part on determining that the ray meets the particular voxel.

Example 9 may include at least a portion of the subject matter of example 6, where the operation includes determining an audio reflection corresponding to the ray meeting the particular voxel.

Example 10 may include at least a portion of the subject matter of example 9, where the volumetric data structure further includes data indicating a reflection coefficient of the geometry occupying the particular voxel, and the audio reflection is based at least in part on the reflection coefficient.

Example 11 may include at least a portion of the subject matter of any one of examples 9-10, where the instructions, when executed, further cause a machine to generate a finite impulse response (FIR) filter based at least in part on determining the audio reflection.

Example 12 may include at least a portion of the subject matter of any one of examples 1-11, where the operation includes identifying a set of empty voxels in the particular volume, and the instructions, when executed, further cause the machine to determine a free path through the particular volume corresponding to the set of empty voxels.

Example 13 may include at least a portion of the subject matter of example 12, where the free path includes a three-dimensional (3D) free path, and the instructions, when executed, further cause the machine to: convert the 3D free path to a two-dimensional (2D) free path representation; and generate 2D path map data describing the 2D free path representation.

Example 14 may include at least a portion of the subject matter of any one of examples 1-13, where the operation includes an operation defined in a convolutional neural network (CNN), and the instructions, when executed, further cause the machine to provide the volumetric data structure as an input to a particular layer of the CNN, where the operation includes one or more arithmetic operations associated with the particular layer.

Example 15 may include at least a portion of the subject matter of example 14, where a binary "0" value is to indicate an empty voxel in the entries of the volumetric data structure, and the instructions, when executed, further cause the machine to: determine a subset of voxels of empty space in the particular volume represented as empty space in the volumetric data structure; and omit the arithmetic operations corresponding to bits representing the subset of voxels in the volumetric data structure.

Example 16 may include at least a portion of the subject matter of example 15, where the instructions, when executed, further cause the machine to omit fetches of weight values to be multiplied with the bits representing the subset of voxels.

Example 17 may include at least a portion of the subject matter of any one of examples 15-16, where the instructions, when executed, further cause the machine to generate a bitmap based on the binary "0" values in the volumetric data structure, and the arithmetic operations are omitted based on the bitmap.

Example 18 may include at least a portion of the subject matter of any one of examples 1-17, where the instructions, when executed, further cause the machine to: identify a change in geometry within the particular volume; and modify corresponding bits of the entries to reflect the change in geometry.

Example 19 may include at least a portion of the subject matter of any one of examples 1-18, where each entry in the volumetric data structure includes an entry 64 bits in length.

Example 20 may include at least a portion of the subject matter of example 19, where the voxels at the first level of detail include sixty-four voxels, the voxels at the second level of detail include sixty-four voxels for each voxel in the first level of detail.

Example 21 may include at least a portion of the subject matter of any one of examples 1-20, where the operation includes rendering the geometry of the particular volume in a two-dimensional graphical presentation for display on a display device.

Example 22 is a machine accessible storage medium having instructions stored thereon, the instructions when executed on a machine, cause the machine to: obtain data describing at least a portion of a three-dimensional geometry present within a particular volume; and convert the data into a volumetric data structure, where the volumetric data structure is to model the particular volume, the volumetric data structure represents the particular volume at a plurality of levels of detail, a first entry in the volumetric data structure includes a first set of bits representing all voxels at a first level of detail within the particular volume, the first level of detail includes the lowest level in the plurality of levels of detail, values of each of the first set of bits indicate whether a corresponding one of the voxels at the first level of detail is at least partially occupied by at least a portion of the geometry, where the volumetric data structure further includes a number of second entries representing voxels at a second level of detail higher than the first level of detail, the voxels at the second level of detail represent subvolumes of the voxels at the first level of detail, and the number of second entries corresponds to the number of bits in the first set of bits with values indicating that a corresponding voxel is occupied.

Example 23 may include at least a portion of the subject matter of example 22, where the data is generated using one or more image sensors.

Example 24 may include at least a portion of the subject matter of any one of examples 22-23, where the data includes a depth image.

Example 25 may include at least a portion of the subject matter of any one of examples 22-24, where converting the data into the volumetric data structure includes processing the data using a simultaneous localization and mapping (SLAM) algorithm.

Example 26 may include at least a portion of the subject matter of any one of examples 22-25, where the volumetric data structure further includes information to identify a physical characteristic of the geometry.

Example 27 is a system including one or more data processing apparatus, a memory, and volumetric processing logic. The memory is to store a volumetric data structure, where the volumetric data structure is to model a particular volume, the volumetric data structure represents the particular volume at a plurality of levels of detail, a first entry in the volumetric data structure includes a first set of bits representing voxels at a first level of detail, the first level of detail includes the lowest level of detail in the volumetric data structure, values of the first set of bits indicate whether a corresponding one of the voxels is at least partially occupied by respective geometry, where the volumetric data structure further includes a number of second entries representing voxels at a second level of detail higher than the first level of detail, the voxels at the second level of detail represent subvolumes of volumes represented by voxels at the first level of detail, and the number of second entries corresponds to a number of bits in the first set of bits with values indicating that a corresponding voxel volume is occupied. The volumetric processing logic is executable by the data processing apparatus to obtain the volumetric data structure, and determine the geometry of the particular volume at any one of the plurality of levels of detail using the volumetric data structure.

Example 28 may include at least a portion of the subject matter of example 27, further including a display device and display logic executable by the data processing apparatus to render the geometry for presentation on the display device.

Example 29 may include at least a portion of the subject matter of example 28, where the display device includes a display device of one of a virtual reality (VR), augmented reality (AR), and mixed reality (MR) system.

Example 30 may include at least a portion of the subject matter of any one of examples 27-29, further including speakers and audio processing logic executable by the data processing apparatus to generate a finite impulse response (FIR) filter based on the volumetric data structure and apply the FIR filter in an audio presentation to be output on the speakers.

Example 31 is a machine accessible storage medium having instructions stored thereon, the instructions when executed on a machine, cause the machine to: identify an input to a particular one of a plurality of layers within a convolutional neural network (CNN), where the plurality of layers includes a rectified linear unit (ReLU) layer; determine, from the input, that an output vector of the ReLU layer will include a number of zeros; generate a bitmap based on the number of zeros; and use the bitmap to determine a subset of operations in the CNN to eliminate corresponding to the input.

Example 32 may include at least a portion of the subject matter of example 31, where determining that the output vector of the ReLU layer will include the number of zeros includes performing the ReLU layer on the input to derive the output vector.

Example 33 may include at least a portion of the subject matter of example 31, where determining that the output vector of the ReLU layer will include the number of zeros includes predicting the output vector based on signs of operands in a preceding layer of the CNN.

Example 34 may include at least a portion of the subject matter of example 33, where the preceding layer includes one of a convolution layer or a maxpooling layer.

Example 35 may include at least a portion of the subject matter of any one of examples 31-34, where the subset of operations include arithmetic operations of a layer following the ReLU layer in the plurality of layers.

Example 36 may include at least a portion of the subject matter of any one of examples 31-35, where the subset of operations include fetch operations corresponding to a layer following the ReLU layer in the plurality of layers, and the fetch operations are to fetch operands from memory for use in operations of the layer following the ReLU layer.

Example 37 is a system including one or more data processing apparatus, memory, a bitmap generator, and a scheduler. The bitmap generator is executable by the data processing apparatus to: identify an input to a particular one of a plurality of layers within a convolutional neural network (CNN), where the plurality of layers includes a rectified linear unit (ReLU) layer; determine, from the input, that an output vector of the ReLU layer will include a number of zeros; and generate a bitmap based on the number of zeros. The scheduler to obtain the bitmap from memory and schedule performance of operations in the CNN, where the scheduler is to cause a subset of the operations to be skipped based on the bitmap.

Example 38 may include at least a portion of the subject matter of example 37, where determining that the output vector of the ReLU layer will include the number of zeros includes performing the ReLU layer on the input to derive the output vector.

Example 39 may include at least a portion of the subject matter of example 37, where determining that the output vector of the ReLU layer will include the number of zeros includes predicting the output vector based on signs of operands in a preceding layer of the CNN.

Example 40 may include at least a portion of the subject matter of example 39, where the preceding layer includes one of a convolution layer or a maxpooling layer.

Example 41 may include at least a portion of the subject matter of any one of examples 37-40, where the subset of operations include arithmetic operations of a layer following the ReLU layer in the plurality of layers.

Example 42 may include at least a portion of the subject matter of any one of examples 37-41, where the subset of operations include fetch operations corresponding to a layer following the ReLU layer in the plurality of layers, and the fetch operations are to fetch operands from memory for use in operations of the layer following the ReLU layer.

Example 43 is a method including: obtaining a volumetric data structure from memory, where the volumetric data structure is to model a particular volume, the volumetric data structure represents the particular volume at a plurality of levels of detail, a first entry in the volumetric data structure includes a first set of bits representing voxels at a first level of detail, the first level of detail includes the lowest level of detail in the volumetric data structure, values of the first set of bits indicate whether a corresponding one of the voxels is at least partially occupied by respective geometry, where the volumetric data structure further includes a number of second entries representing voxels at a second level of detail higher than the first level of detail, the voxels at the second level of detail represent subvolumes of volumes represented by voxels at the first level of detail, and the number of second entries corresponds to a number of bits in the first set of bits with values indicating that a corresponding voxel volume is occupied; and processing the volumetric data structure to perform one or more operations, where the operations correspond to identification of the geometry within the particular volume.

Example 44 may include at least a portion of the subject matter of example 43, where the first entry and the one or more second entries include contiguous entries within the volumetric data structure.

Example 45 may include at least a portion of the subject matter of example 44, where subvolumes include first subvolumes, the second entries include values to indicate whether a corresponding voxel at the second level of detail is occupied with geometry, the volumetric data structure further includes one or more third entries representing voxels at a third level of detail higher than the second level of detail, the voxels at the third level of detail represent subvolumes of the first subvolumes represented by voxels at the second level of detail, and the number of third entries corresponds to a number of bits in the second set of bits with values indicating that a corresponding voxel volume is occupied, where the third entries are contiguous with a last of the second entries in the volumetric data structure.

Example 46 may include at least a portion of the subject matter of example 45, further including determining a beginning of the third level based on the number of bits in the first set of bits with values indicating that a corresponding voxel volume at the first level of detail is occupied.

Example 47 may include at least a portion of the subject matter of any one of examples 43-46, where each voxel in the first level of detail is represented by two or more respective bits in the first entry.

Example 48 may include at least a portion of the subject matter of any one of examples 43-47, further including: determining a ray intersecting the particular volume; determining a subset of the voxels at the first level of detail through which the ray passes; and determining that the ray meets a particular voxel in the subset of voxels representing occupied space based on a value of a corresponding bit in the first entry indicating that the particular voxel is occupied with geometry.

Example 49 may include at least a portion of the subject matter of example 48, further including: identifying a particular one of the second entries corresponding to the particular voxel, based on determining that the ray meets the particular voxel; determining that the ray passes through a subset of voxels at the second level of detail; and determining, from values of bits in the particular second entry, whether the ray meets a voxel at the second level of detail occupied with geometry.

Example 50 may include at least a portion of the subject matter of example 48, where the operation includes detecting a potential collision of a moving device based at least in part on determining that the ray meets the particular voxel.

Example 51 may include at least a portion of the subject matter of example 48, where the operation includes determining an audio reflection corresponding to the ray meeting the particular voxel.

Example 52 may include at least a portion of the subject matter of example 51, where the volumetric data structure further includes data indicating a reflection coefficient of the geometry occupying the particular voxel, and the audio reflection is based at least in part on the reflection coefficient.

Example 53 may include at least a portion of the subject matter of example 51, further including generating a finite impulse response (FIR) filter based at least in part on determining the audio reflection.

Example 54 may include at least a portion of the subject matter of any one of examples 43-53, where the operation includes identifying a set of empty voxels in the particular volume, and the method further includes determining a free path through the particular volume corresponding to the set of empty voxels.

Example 55 may include at least a portion of the subject matter of example 54, where the free path includes a three-dimensional (3D) free path, and the method further includes: converting the 3D free path to a two-dimensional (2D) free path representation; and generating 2D path map data describing the 2D free path representation.

Example 56 may include at least a portion of the subject matter of any one of examples 43-55, where the operation includes an operation defined in a convolutional neural network (CNN), and the method further includes providing the volumetric data structure as an input to a particular layer of the CNN, where the operation includes one or more arithmetic operations associated with the particular layer.

Example 57 may include at least a portion of the subject matter of example 56, where a binary "0" value is to indicate an empty voxel in the entries of the volumetric data structure, and the method further includes: determining a subset of voxels of empty space in the particular volume represented as empty space in the volumetric data structure; and omitting the arithmetic operations corresponding to bits representing the subset of voxels in the volumetric data structure.

Example 58 may include at least a portion of the subject matter of example 57, further including omitting fetches of weight values to be multiplied with the bits representing the subset of voxels.

Example 59 may include at least a portion of the subject matter of example 57, further including generating a bitmap based on the binary "0" values in the volumetric data structure, and the arithmetic operations are omitted based on the bitmap.

Example 60 may include at least a portion of the subject matter of any one of examples 43-59, further including: identifying a change in geometry within the particular volume; and modifying corresponding bits of the entries to reflect the change in geometry.

Example 61 may include at least a portion of the subject matter of any one of examples 43-60, where each entry in the volumetric data structure includes an entry 64 bits in length.

Example 62 may include at least a portion of the subject matter of example 61, where the voxels at the first level of detail include sixty-four voxels, the voxels at the second level of detail include sixty-four voxels for each voxel in the first level of detail.

Example 63 may include at least a portion of the subject matter of any one of examples 43-62, where the operation includes rendering the geometry of the particular volume in a two-dimensional graphical presentation for display on a display device.

Example 64 is a system including means to perform the method of any one of examples 43-63.

Example 65 is a method including: obtaining data describing at least a portion of a three-dimensional geometry present within a particular volume; and converting the data into a volumetric data structure, where the volumetric data structure is to model the particular volume, the volumetric data structure represents the particular volume at a plurality of levels of detail, a first entry in the volumetric data structure includes a first set of bits representing all voxels at a first level of detail within the particular volume, the first level of detail includes the lowest level in the plurality of levels of detail, values of each of the first set of bits indicate whether a corresponding one of the voxels at the first level of detail is at least partially occupied by at least a portion of the geometry, where the volumetric data structure further includes a number of second entries representing voxels at a second level of detail higher than the first level of detail, the voxels at the second level of detail represent subvolumes of the voxels at the first level of detail, and the number of second entries corresponds to the number of bits in the first set of bits with values indicating that a corresponding voxel is occupied.

Example 66 may include at least a portion of the subject matter of example 65, where the data is generated using one or more image sensors.

Example 67 may include at least a portion of the subject matter of any one of examples 65-66, where the data includes a depth image.

Example 68 may include at least a portion of the subject matter of any one of examples 65-67, where converting the data into the volumetric data structure includes processing the data using a simultaneous localization and mapping (SLAM) algorithm.

Example 69 may include at least a portion of the subject matter of any one of examples 65-68, where the volumetric data structure further includes information to identify a physical characteristic of the geometry.

Example 70 is a system including means to perform the method of any one of examples 65-69.

Example 71 is a method including: identifying an input to a particular one of a plurality of layers within a convolutional neural network (CNN), where the plurality of layers includes a rectified linear unit (ReLU) layer; determining, from the input, that an output vector of the ReLU layer will include a number of zeros; generating a bitmap based on the number of zeros; and using the bitmap to determine a subset of operations in the CNN to eliminate corresponding to the input.

Example 72 may include at least a portion of the subject matter of example 71, where determining that the output vector of the ReLU layer will include the number of zeros includes performing the ReLU layer on the input to derive the output vector.

Example 73 may include at least a portion of the subject matter of example 71, where determining that the output vector of the ReLU layer will include the number of zeros includes predicting the output vector based on signs of operands in a preceding layer of the CNN.

Example 74 may include at least a portion of the subject matter of example 73, where the preceding layer includes one of a convolution layer or a maxpooling layer.

Example 75 may include at least a portion of the subject matter of any one of examples 71-74, where the subset of operations include arithmetic operations of a layer following the ReLU layer in the plurality of layers.

Example 76 may include at least a portion of the subject matter of any one of examples 71-75, where the subset of operations include fetch operations corresponding to a layer following the ReLU layer in the plurality of layers, and the fetch operations are to fetch operands from memory for use in operations of the layer following the ReLU layer.

Example 77 is a system including means to perform the method of any one of examples 71-76.

Example 78 may include at least a portion of the subject matter of example 1, where the operation includes performing a 3D inference using the volumetric data structure as an input to a convolutional neural network to identify an object within the geometry.

Example 79 may include at least a portion of the subject matter of example 43, where the operation includes performing a 3D inference using the volumetric data structure as an input to a convolutional neural network to identify an object within the geometry.

Example 80 is an apparatus including: a data processing apparatus; a memory; and circuitry. The memory is to store a volumetric data structure from memory, where the volumetric data structure is to model a particular volume, the volumetric data structure represents the particular volume at a plurality of levels of detail, a first entry in the volumetric data structure includes a first set of bits representing voxels at a first level of detail, the first level of detail includes the lowest level of detail in the volumetric data structure, values of the first set of bits indicate whether a corresponding one of the voxels is at least partially occupied by respective geometry, where the volumetric data structure further includes a number of second entries representing voxels at a second level of detail higher than the first level of detail, the voxels at the second level of detail represent subvolumes of volumes represented by voxels at the first level of detail, and the number of second entries corresponds to a number of bits in the first set of bits with values indicating that a corresponding voxel volume is occupied. The circuitry is to use the volumetric data structure to perform one or more operations, where the operations correspond to identification of the geometry within the particular volume.

Example 81 may include at least a portion of the subject matter of example 80, where the first entry and the one or more second entries include contiguous entries within the volumetric data structure.

Example 82 may include at least a portion of the subject matter of example 81, where subvolumes include first subvolumes, the second entries include values to indicate whether a corresponding voxel at the second level of detail is occupied with geometry, the volumetric data structure further includes one or more third entries representing voxels at a third level of detail higher than the second level of detail, the voxels at the third level of detail represent subvolumes of the first subvolumes represented by voxels at the second level of detail, and the number of third entries corresponds to a number of bits in the second set of bits with values indicating that a corresponding voxel volume is occupied, where the third entries are contiguous with a last of the second entries in the volumetric data structure.

Example 83 may include at least a portion of the subject matter of example 82, further including logic to determine a beginning of the third level based on the number of bits in the first set of bits with values indicating that a corresponding voxel volume at the first level of detail is occupied.

Example 84 may include at least a portion of the subject matter of any one of examples 80-83, where each voxel in the first level of detail is represented by two or more respective bits in the first entry.

Example 85 may include at least a portion of the subject matter of any one of examples 80-84, further including logic to: determine a ray intersecting the particular volume; determine a subset of the voxels at the first level of detail through which the ray passes; and determine that the ray meets a particular voxel in the subset of voxels representing occupied space based on a value of a corresponding bit in the first entry indicating that the particular voxel is occupied with geometry.

Example 86 may include at least a portion of the subject matter of example 85, where the logic is further to: identify a particular one of the second entries corresponding to the particular voxel, based on determining that the ray meets the particular voxel; determine that the ray passes through a subset of voxels at the second level of detail; and determine, from values of bits in the particular second entry, whether the ray meets a voxel at the second level of detail occupied with geometry.

Example 87 may include at least a portion of the subject matter of example 85, where the operation includes detecting a potential collision of a moving device based at least in part on determining that the ray meets the particular voxel.

Example 88 may include at least a portion of the subject matter of example 85, where the operation includes determining an audio reflection corresponding to the ray meeting the particular voxel.

Example 89 may include at least a portion of the subject matter of example 88, where the volumetric data structure further includes data indicating a reflection coefficient of the geometry occupying the particular voxel, and the audio reflection is based at least in part on the reflection coefficient.

Example 90 may include at least a portion of the subject matter of any one of examples 88-89, further including filter generation logic to generate a finite impulse response (FIR) filter based at least in part on determining the audio reflection.

Example 91 may include at least a portion of the subject matter of any one of examples 80-90, where the operation includes identifying a set of empty voxels in the particular volume, and the apparatus further includes path finding logic to determine a free path through the particular volume corresponding to the set of empty voxels.

Example 92 may include at least a portion of the subject matter of example 91, where the free path includes a three-dimensional (3D) free path, and the path finding logic is further to: convert the 3D free path to a two-dimensional (2D) free path representation; and generate 2D path map data describing the 2D free path representation.

Example 93 may include at least a portion of the subject matter of any one of examples 80-92, where the operation includes an operation defined in a convolutional neural network (CNN), and apparatus further includes machine learning logic to: provide the volumetric data structure as an input to a particular layer of the CNN, where the operation includes one or more arithmetic operations associated with the particular layer.

Example 94 may include at least a portion of the subject matter of example 93, where a binary "0" value is to indicate an empty voxel in the entries of the volumetric data structure, and the apparatus further includes a controller to: determine a subset of voxels of empty space in the particular volume represented as empty space in the volumetric data structure; and omit the arithmetic operations corresponding to bits representing the subset of voxels in the volumetric data structure.

Example 95 may include at least a portion of the subject matter of example 94, where the controller is further to omit fetches of weight values to be multiplied with the bits representing the subset of voxels.

Example 96 may include at least a portion of the subject matter of any one of examples 94-95, further including bitmap generator to generate a bitmap based on the binary "0" values in the volumetric data structure, and the arithmetic operations are omitted based on the bitmap.

Example 97 may include at least a portion of the subject matter of any one of examples 80-96, further including logic to: identify a change in geometry within the particular volume; and modify corresponding bits of the entries to reflect the change in geometry.

Example 98 may include at least a portion of the subject matter of any one of examples 80-97, where each entry in the volumetric data structure includes an entry 64 bits in length.

Example 99 may include at least a portion of the subject matter of example 98, where the voxels at the first level of detail include sixty-four voxels, the voxels at the second level of detail include sixty-four voxels for each voxel in the first level of detail.

Example 100 may include at least a portion of the subject matter of any one of examples 80-99, where the operation includes rendering the geometry of the particular volume in a two-dimensional graphical presentation for display on a display device.

Example 101 may include at least a portion of the subject matter of any one of examples 80-100, where the operation includes performing a 3D inference using the volumetric data structure as an input to a convolutional neural network to identify an object within the geometry.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. An apparatus comprising:
   a data processing apparatus;
   a memory to store a volumetric data structure in a block of contiguous memory, wherein the volumetric data structure is to model a particular volume, the volumetric data structure represents the particular volume at a plurality of levels of detail, a first entry in the volumetric data structure comprises a first set of bits in the block of contiguous memory representing voxels at a first level of detail, the first level of detail comprises the lowest level of detail in the volumetric data structure, values of the first set of bits indicate whether a corresponding one of the voxels is at least partially occupied by respective geometry, wherein the volumetric data structure further comprises a number of second entries in the block of contiguous memory, each of the number of second entries comprises a respective second set of bits representing voxels at a second level of detail higher than the first level of detail, the voxels at the second level of detail represent subvolumes of volumes represented by voxels at the first level of detail, and the number of second entries corresponds to a number of bits in the first set of bits with values indicating that a corresponding voxel volume is occupied, wherein the first entry and the one or more second entries comprise contiguous entries within the volumetric data structure such that a final bit in the first set of bits immediately precedes a first bit in a first one of the second entries, wherein the final bit in the first set of bits indicates whether a final one of the voxels at the first level of detail is occupied, and the first bit in the first one of the second entries indicates whether a first one of the voxels at the second level of detail in the subvolume represented by the first one of the second entries is occupied; and
   circuitry to:
      identify a first occupied bit in the first set of bits, wherein the first occupied bit represents that a corresponding particular voxel at the first level of detail is occupied;
      determine, based on the first occupied bit, that the first one of the second entries immediately succeeds the final bit in the first set of bits in the contiguous memory;
      use the volumetric data structure to identify the geometry within the particular volume; and
      determine a path for physical navigation through the particular volume based on the identified geometry.

2. The apparatus of claim 1, wherein subvolumes comprise first subvolumes, the second entries comprise values to indicate whether a corresponding voxel at the second level of detail is occupied with geometry, the volumetric data structure further comprises one or more third entries representing voxels at a third level of detail higher than the second level of detail, the voxels at the third level of detail represent subvolumes of the first subvolumes represented by voxels at the second level of detail, and the number of third entries corresponds to a number of bits in the second set of bits with values indicating that a corresponding voxel volume is occupied, wherein the third entries are contiguous with a last of the second entries in the volumetric data structure.

3. The apparatus of claim 2, further comprising logic to determine a beginning of the third level based on the number of bits in the first set of bits with values indicating that a corresponding voxel volume at the first level of detail is occupied.

4. The apparatus of claim 1, wherein each voxel in the first level of detail is represented by two or more respective bits in the first entry.

5. The apparatus of claim 1, wherein determining the path comprises:
   determining a ray intersecting the particular volume;
   determining a subset of the voxels at the first level of detail through which the ray passes;
   determining that the ray meets a particular voxel in the subset of voxels representing occupied space based on a value of a corresponding bit in the first entry indicating that the particular voxel is occupied with geometry.

6. The apparatus of claim 5, wherein the logic is further to:
   identify a particular one of the second entries corresponding to the particular voxel, based on determining that the ray meets the particular voxel;
   determine that the ray passes through a subset of voxels at the second level of detail; and
   determine, from values of bits in the particular second entry, whether the ray meets a voxel at the second level of detail occupied with geometry.

7. The apparatus of claim 1, wherein determining the path comprises identifying a set of empty voxels in the particular volume, and the path corresponds to a free path through the particular volume corresponding to the set of empty voxels.

8. The apparatus of claim 7, wherein the free path comprises a three-dimensional (3D) free path, and the path finding logic is further to:
convert the 3D free path to a two-dimensional (2D) free path representation; and
generate 2D path map data describing the 2D free path representation.

9. The apparatus of claim 1, wherein the operation comprises an operation defined in a convolutional neural network (CNN), and apparatus further comprises:
machine learning logic to provide the volumetric data structure as an input to a particular layer of the CNN, wherein the operation comprises one or more arithmetic operations associated with the particular layer; and
a controller to:
determine a subset of voxels of empty space in the particular volume represented as empty space in the volumetric data structure; and
omit the arithmetic operations corresponding to bits representing the subset of voxels in the volumetric data structure.

10. The apparatus of claim 1, further comprising logic to:
identify a change in geometry within the particular volume; and
modify corresponding bits of the entries to reflect the change in geometry.

11. The apparatus of claim 1, wherein each entry in the volumetric data structure comprises an entry 64 bits in length.

12. The apparatus of claim 11, wherein the voxels at the first level of detail comprise sixty-four voxels, the voxels at the second level of detail comprise sixty-four voxels for each voxel in the first level of detail.

13. The apparatus of claim 1, wherein the operation comprises rendering the geometry of the particular volume in a two-dimensional graphical presentation for display on a display device.

14. The apparatus of claim 1, wherein determining the path comprises performing a 3D inference using the volumetric data structure as an input to a convolutional neural network to identify an object within the geometry and the path is determined to avoid the object.

15. The apparatus of claim 1, wherein values of each second set of bits indicate whether a corresponding one of the voxels at the second level of details is at least partially occupied by respective geometry.

16. The apparatus of claim 15, wherein the first entry consists of the first set of bits and each of the one or more second entries consists of the corresponding second set of bits.

17. The apparatus of claim 1, wherein the first entry does not include a separate index bits to point to entries in the one or more second entries.

* * * * *